US009008445B2

(12) United States Patent
Murata et al.

(10) Patent No.: US 9,008,445 B2
(45) Date of Patent: Apr. 14, 2015

(54) SOLID-STATE IMAGE CAPTURING ELEMENT AND METHOD FOR DRIVING SOLID-STATE IMAGE CAPTURING ELEMENT

(71) Applicant: Panasonic Corporation, Osaka (JP)

(72) Inventors: Takahiko Murata, Osaka (JP); Takayoshi Yamada, Hyogo (JP); Yutaka Hirose, Kyoto (JP); Yoshihisa Kato, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 276 days.

(21) Appl. No.: 13/685,407

(22) Filed: Nov. 26, 2012

(65) Prior Publication Data

US 2013/0083227 A1 Apr. 4, 2013

Related U.S. Application Data

(63) Continuation of application No. PCT/JP2011/000643, filed on Feb. 4, 2011.

(30) Foreign Application Priority Data

May 27, 2010 (JP) ................................ 2010-122019
May 27, 2010 (JP) ................................ 2010-122098
May 27, 2010 (JP) ................................ 2010-122110

(51) Int. Cl.
G06K 9/62 (2006.01)
H04N 5/361 (2011.01)
H04N 5/353 (2011.01)

(Continued)

(52) U.S. Cl.
CPC ............ H04N 5/361 (2013.01); H04N 5/3532 (2013.01); H04N 5/3745 (2013.01); H04N 5/378 (2013.01)

(58) Field of Classification Search
None
See application file for complete search history.

(56) References Cited

U.S. PATENT DOCUMENTS 5,909,026 A    6/1999  Zhou et al.
6,858,827 B2   2/2005  Sugiyama et al.
7,521,656 B2   4/2009  Sugiyama et al.

(Continued)

FOREIGN PATENT DOCUMENTS

JP   05-268533 A    10/1993
JP   2003-169251 A   6/2003

(Continued)

OTHER PUBLICATIONS

International Search Report issued in International Patent Application No. PCT/JP2011/000643 dated Mar. 8, 2011.

Primary Examiner — Sean Motsinger
(74) Attorney, Agent, or Firm — McDermott Will & Emery LLP

(57) ABSTRACT

A solid-state image capturing element includes: a plurality of pixels arranged in rows and columns, each of which outputs an electric signal corresponding to an amount of received light; a plurality of column signal lines each of which is disposed for a corresponding one of columns of the pixels and sequentially transfers the electric signal provided from the corresponding one of the columns of the pixels; and a plurality of holding circuits each of which is disposed for a corresponding one of the column signal lines and holds the electric signal transferred via the corresponding one of the column signal lines. Each of the holding circuits includes a circuit element including an input capacitance, and holds the electric signal in the input capacitance.

3 Claims, 32 Drawing Sheets

(51) Int. Cl.
*H04N 5/3745* (2011.01)
*H04N 5/378* (2011.01)

(56) References Cited

U.S. PATENT DOCUMENTS

| | | | |
|---|---|---|---|
| 7,579,576 B2 | 8/2009 | Sugiyama et al. | |
| 2003/0052252 A1 | 3/2003 | Sugiyama et al. | |
| 2004/0085465 A1* | 5/2004 | Inui et al. | 348/241 |
| 2005/0173618 A1 | 8/2005 | Sugiyama et al. | |
| 2005/0174612 A1 | 8/2005 | Sugiyama et al. | |
| 2007/0285544 A1* | 12/2007 | Yamada et al. | 348/294 |
| 2008/0068471 A1 | 3/2008 | Kondo et al. | |
| 2013/0083227 A1* | 4/2013 | Murata et al. | 348/308 |
| 2013/0155304 A1* | 6/2013 | Yamauchi | 348/302 |
| 2013/0201372 A1* | 8/2013 | Ryoki et al. | 348/294 |
| 2014/0145686 A1* | 5/2014 | Dielacher et al. | 320/166 |

FOREIGN PATENT DOCUMENTS

| | | |
|---|---|---|
| JP | 2006-093816 A | 4/2006 |
| JP | 2006-333493 A | 12/2006 |
| JP | 2008-042825 A | 2/2008 |
| JP | 2008-072188 A | 3/2008 |
| JP | 2009-100313 A | 5/2009 |

* cited by examiner

SOLID-STATE IMAGE CAPTURING ELEMENT AND METHOD FOR DRIVING SOLID-STATE IMAGE CAPTURING ELEMENT

CROSS REFERENCE TO RELATED APPLICATIONS

This is a continuation application of PCT International Patent Application No. PCT/JP2011/000643 filed on Feb. 4, 2011, designating the United States of America, which is based on and claims priorities of Japanese Patent Applications No. 2010-122019 filed on May 27, 2010, No. 2010-122098 filed on May 27, 2010, and No. 2010-122110 filed on May 27, 2010. The entire disclosures of the above-identified applications, including the specifications, drawings and claims are incorporated herein by reference in their entirety.

FIELD

The present invention relates to a solid-state image capturing element that is a CMOS (complementary metal oxide semiconductor) area image sensor incorporated in a digital camera or the like, and a method for driving the solid-state image capturing element.

BACKGROUND

In recent years, techniques such as those disclosed by Patent Literature 1 are proposed for implementing global shutter operation by a CMOS image sensor.

FIG. 28 illustrates the shutter operations of the CCD image sensor and the MOS image sensor. As illustrated in the diagram, the CCD image sensor performs the global shutter operation with which all of the pixels are exposed simultaneously. In contrast, the MOS image sensor generally performs the rolling shutter operation with which the pixels in the same row are exposed simultaneously. With the rolling shutter, there is a time lag between the shutter timing for the pixels in the first read-out row and the shutter timing for the pixels in the last read-out row, leading to a problem of distortion occurring in the shape of an object that moves at high speed.

In view of the foregoing, the conventional technique illustrated in FIG. 29 is disclosed (Patent Literature 1).

FIG. 29 is a block diagram which illustrates a configuration of a conventional solid-state image capturing element 200. As illustrated in FIG. 29, the solid-state image capturing element 200 includes: pixel cells 201 each of which converts a light signal into an electric signal; a pixel circuit unit 202 in which the pixel cells 201 are arranged in a matrix; a vertical scanning unit 203 which selects a vertical line (row) of the pixel circuit unit 202; a noise suppression unit 231 which suppresses noise of a pixel signal transmitted from the selected row; a memory unit 222 in which storage cells 221 for accumulating an output signal from the noise suppression unit 231 are arranged in a matrix; a vertical memory scanning unit 223 which selects a vertical line (memory row) of the memory unit 222; a horizontal selecting unit 205 which selects a signal of the selected memory row; a horizontal scanning unit 206 which sequentially selects the horizontal selecting unit 205 in a horizontal direction; and an output amplifier 212.

FIG. 30 is a circuit diagram which illustrates the configuration of the noise suppression unit 231 and the memory unit 222 illustrated in FIG. 29. The storage cell 221 provided in the memory unit 222 includes: a memory capacitor C31 which accumulates the output signal from the noise suppression unit 231; a memory write transistor M31 for writing the output signal into the memory capacitor C31; a memory amplifier A31 which amplifies the signal accumulated in the memory capacitor C31; and a memory read transistor M32 which reads an output from the memory amplifier A31.

CITATION LIST

Patent Literature

[PTL] Japanese Unexamined Patent Application Publication No. 2008-072188

SUMMARY

Technical Problem

However, according to the technique disclosed by Patent Literature 1, each of the storage cells independently includes the memory capacitor and the memory amplifier (transistor for amplification), which leads to an increase in the circuit area of each of the storage cells. The increase in the circuit area poses the problem of a decrease in an aperture of a light receiving unit in the pixel cell.

In addition, since the conventional technique has no means for reducing the power consumption, a huge amount of power is consumed for writing and reading data to and from the memory for all of the pixels, posing a risk of: an increase in a dark current accompanying an increase in the temperature of an element; the latch-up phenomenon occurring in a parasitic circuit; or even damaging an element.

In addition, since a signal is held by applying a high voltage to a capacitor that is used in the memory unit according to the conventional technique, the property of holding a signal for a long period of time is poor, and there is a serious practical issue that noise caused by variation in a leak current is overlapped on an image after reading all of the large number of pixels.

The first object of the present invention is to provide a solid-state image capturing element capable of implementing, with a small area, a circuit for holding a signal transmitted from a pixel.

The second object of the present invention is to provide a solid-state image capturing element which reduces power consumption to reduce a dark current.

The third object of the present invention is to provide a solid-state image capturing element which reduces noise caused by variation in a leak current.

Solution to Problem

In order to achieve the above-described first object, a solid-state image capturing element according to an embodiment of the present invention includes: a plurality of pixels arranged in rows and columns, each of the pixels outputting an electric signal corresponding to an amount of received light; a plurality of column signal lines each of which is disposed for a corresponding one of columns of the pixels and sequentially transfers the electric signal provided from the corresponding one of the columns of the pixels; and a plurality of holding circuits each of which is disposed for a corresponding one of the column signal lines and holds the electric signal transferred via the corresponding one of the column signal lines, wherein each of the holding circuits includes a circuit element including an input capacitance, and holds the electric signal in the input capacitance.

According to the above-described configuration, since the input capacitance of the element provided in the holding circuit is used as a capacitance for holding electric signals provided from the pixels, it is not necessary to separately provide a capacitance for holding the electric signals. Accordingly, it is possible to reduce an area for the circuit.

In addition, it is preferable that the circuit element is a holding transistor, and the input capacitance is a gate capacitance of the holding transistor.

According to the above-described configuration, since the gate capacitance of the holding transistor is used as a capacitance for holding electric signals provided from the pixels, it is not necessary to separately provide a capacitance for holding the electric signals and an amplifier (a transistor for amplification). More specifically, the holding transistor serves as the capacitance for holding the electric signals and also as the amplifier, and thus it is possible to reduce the area for circuit compared to the conventional techniques in which the capacitance for holding is provided separately from the amplifier.

In addition, it is preferable that each of the holding circuits includes: a first transistor which receives the electric signal from the corresponding one of the column signal lines; the holding transistor which holds the electric signal; and a second transistor which reads the electric signal from the holding transistor, the first transistor is connected to the corresponding one of the column signal lines at one of a source and a drain of the first transistor, and to a gate of the holding transistor at the other, the holding transistor is connected, at one of a source and a drain of the holding transistor, to one of a source and a drain of the second transistor, the solid-state image capturing element further comprises a plurality of reading column signal lines, and the second transistor is connected to a corresponding one of the reading column signal lines at the other of the source and the drain of the second transistor.

According to the above-described configuration, since the gate capacitance of the holding transistor provided in the holding circuit is used as a capacitance for holding electric signals provided from the pixels, it is possible to reduce an area for the circuit without significantly changing the configuration of the holding circuit.

In addition, it is preferable that each of the holding circuits, when holding the electric signal in the holding transistor, holds the electric signal while amplifying the electric signal, by bringing the first transistor and the second transistor into conduction.

According to the above-described configuration, since the second transistor is in the conducting state when the first transistor is in the conducting state, the holding transistor and the second transistor, together with the current supply, operate as a source follower, in other words, as an amplifier. Accordingly, it is possible to amplify and efficiently provide the reading column signal line with an output signal according to a corresponding one of the electric signals accumulated in the gate capacitance of the holding transistor.

In addition, when holding an electric signal in the holding circuit, the holding transistor and the second transistor are brought into conduction as with the time when reading an electric signal held in the holding circuit. More specifically, the state when holding an electric signal in the holding circuit is the same as the state when reading an electric signal held in the holding circuit, and thus it is possible to accurately hold and read a signal value that is held.

In addition, it is preferable that the solid-state image capturing element further includes a plurality of difference circuits each of which is connected to a corresponding one of the column signal lines and outputs a difference signal between the electric signal and a reset signal at a time when light is not received by the pixels.

According to the above-described configuration, it is possible to suppress noise included in an electric signal, by combining the difference circuit and the solid-state image capturing element having the above-described configuration.

In addition, a method of driving a solid-state image capturing element according to an embodiment of the present invention is a method of driving a solid-state image capturing element, the solid-state image capturing element including: a plurality of pixels arranged in rows and columns, each of the pixels outputting an electric signal corresponding to an amount of received light; a plurality of column signal lines each of which is disposed for a corresponding one of columns of the pixels and sequentially transfers the electric signal provided from the corresponding one of the columns of the pixels; and a plurality of holding circuits each of which is disposed for a corresponding one of the column signal lines, holds the electric signal transferred via the corresponding one of the column signal lines, and includes a first transistor which receives the electric signal from the corresponding one of the column signal lines; a holding transistor which holds the electric signal; and a second transistor which reads the electric signal from the holding transistor, the first transistor being connected to the corresponding one of the column signal lines at one of a source and a drain of the first transistor, and to a gate of the holding transistor at the other, the holding transistor being connected, at one of a source and a drain of the holding transistor, to one of a source and a drain of the second transistor, and the second transistor being connected to a corresponding one of reading column signal lines at the other of the source and the drain of the second transistor, the method of driving the solid-state image capturing element including causing each of the holding circuits, when holding the electric signal in the holding transistor, to hold the electric signal while amplifying the electric signal, by bringing the first transistor and the second transistor into conduction.

According to the above-described configuration, since the second transistor is in the conducting state when the first transistor is in the conducting state, the holding transistor and the second transistor, together with the current supply, operate as a source follower, in other words, as an amplifier. Accordingly, it is possible to amplify and efficiently provide the reading column signal line with an output signal according to a corresponding one of the electric signals accumulated in the gate capacitance of the holding transistor.

In addition, when holding an electric signal in the holding circuit, the holding transistor and the second transistor are brought into conduction as with the time when reading an electric signal held in the holding circuit. More specifically, the state when holding an electric signal in the holding circuit is the same as the state when reading an electric signal held in the holding circuit, and thus it is possible to accurately hold and read a signal value that is held.

In order to achieve the above-described second object, a solid-state image capturing device according an embodiment of the present invention includes: a plurality of pixel units which are arranged in rows and columns and output electric signals according to the amount of received light; column signal lines each of which is provided to a corresponding one of columns of the plurality of pixel units; and a first storage unit having a plurality of storage cells which are arranged in rows and columns and which store the electric signals transmitted from the column signal lines. Each of the storage cells has a depletion mode field-effect transistor and stores the electric signals transmitted from the column signal lines into a gate capacitance of the depletion mode field-effect transistor.

According to the above-described configuration, the electric signals are stored in the gate capacitance with less variation with respect to the variation of the gate voltage at the time of writing and reading, and thus it is possible to lower the power consumption and reduce a dark current.

Here, the first storage unit may include: the storage cells; a plurality of output signal lines each of which corresponds to different one of columns of the pixel units; and current supply transistors connected to the respective output signal lines, and each of the storage cells may include: the depletion mode field-effect transistor of which one of the drain and the source is connected to a power line or a ground line; a write switch transistor which is disposed between a corresponding one of the column signal lines and the gate of the depletion mode field-effect transistor; and a read switch transistor which is disposed between a corresponding one of the output signal lines and the other of the drain and the source of the depletion mode field-effect transistor.

According to the above-described configuration, the depletion mode field-effect transistor has the function as a storage cell for holding an analogue signal in the gate capacitance and the function as the source follower amplifier which outputs a voltage according to the analogue signal held in the gate capacitance, and thus it is possible to simplify the circuit configuration of the first storage unit, reduce the number of components and wiring resistance, and significantly reduce the power consumption for the entire chip. As a result, it is possible to reduce the amount of heat generation and reduce the dark current.

Here, the storage cell may, when the electric signal is transmitted from a corresponding one of the column signal lines, cause the gate capacitance to store the electric signal by turning the write switch transistor temporarily ON in the state where the read switch transistor is OFF.

According to the above-described configuration, when writing the electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing the reference signal, and thus the power consumption can be significantly reduced.

Here, the electric signal may include a reference signal which indicates a reference voltage provided from the pixel unit in the reset state and a pixel signal according to the amount of received light, and the storage cell, when the reference signal is transmitted from a corresponding one of the column signal lines, may cause the gate capacitance to store the reference signal by temporarily turning ON the write switch transistor in the state where the read switch transistor is OFF.

According to the above-described configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing the reference signal, and thus the power consumption can be significantly reduced.

Here, the storage cell may further output the reference signal stored in the gate capacitance to a corresponding one of the output signal lines, from the other of the drain and the source of the depletion mode field-effect transistor, by temporarily turning the read switch transistor ON in the state where the write switch transistor is OFF.

Here, the storage cell, when the pixel signals is transmitted from a corresponding one of the column signal lines, may output the pixel signal from the other of the drain and the source of the depletion mode field-effect transistor, to the corresponding one of the output signal lines, by turning the write switch transistor temporarily ON in the state where the read switch transistor is OFF.

Here, the electric signal may include a reference signal which indicates a reference voltage and a pixel signal according to the amount of received light, and when the pixel signal is transmitted from a corresponding one of the column signal lines, the storage cell may cause the gate capacitance to store the pixel signal, by temporarily turning ON the write switch transistor in the state where the read switch transistor is OFF.

Here, the storage cell may further output the pixel signal stored in the gate capacitance from the other of the drain and the source of the depletion mode field-effect transistor, to a corresponding one of the output signal lines, by temporarily turning the read switch transistor ON in the state where the write switch transistor is OFF.

In addition, a method of driving the solid-state image capturing device according to an embodiment of the present invention includes: outputting the electric signals from the pixel units to the column signal lines; and temporarily turning ON the write switch transistor in the state where the read switch transistor is OFF, so that the electric signals are stored in the gate capacitance.

In order to achieve the above-described third object, a solid-state image capturing device according to an embodiment of the present invention includes: a plurality of pixel units which are arranged in rows and columns and output electric signals according to the amount of received light; column signal lines each of which is provided to a corresponding one of columns of the plurality of pixel units; inverting amplifiers which are provided for the respective column signal lines and invert the polarity of electric signals provided from the respective column signal lines; and a first storage unit which includes a plurality of storage cells arranged in rows and columns and store the inverted electric signals provided from the inverting amplifiers. According to the above-described configuration, an electric signal with a higher voltage is more likely to be written into a memory with a low voltage. Since leak of the storage cell is proportional to an electric field intensity, writing with a lower voltage causes less leak and less deterioration in signals. Noise in images is more noticeable where the luminance is lower, and thus it is possible, with an image in which the electric signal is higher where the luminance is lower, to obtain a better image with less variation noise, by reducing the deterioration in signals due to the leak current in a portion with the low luminance.

Here, the first storage unit may include: the plurality of storage cells; a plurality of output signal lines corresponding to the columns of the pixel units; and current supply transistors connected to the output signal lines, and each of the storage cells may include: the depletion mode field-effect transistor of which one of the drain and the source is connected to a power line or a ground line; a write switch transistor which is disposed between an output terminal of a corresponding one of the inverting amplifiers and the gate of the depletion mode field-effect transistor; and a read switch transistor which is disposed between a corresponding one of the output signal lines and the other of the drain and the source of the depletion mode field-effect transistor.

According to the above-described configuration, the depletion mode field-effect transistor has the function as a storage cell for holding an analogue signal in the gate capacitance and the function as the source follower amplifier which outputs a voltage according to the analogue signal held in the gate capacitance, and thus it is possible to simplify the circuit configuration of the first storage unit, reduce the number of components and wiring resistance, and significantly reduce the power consumption for the entire chip. As a result, it is possible to reduce the amount of heat generation and reduce the dark current.

Here, when the inverted electric signals are transmitted from a corresponding one of the inverting amplifiers, the storage cell may turn the write switch transistor temporarily ON in the state where the read switch transistor is OFF, so as to cause the gate capacitance to store the electric signals.

According to the above-described configuration, when writing the electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing the reference signal, and thus the power consumption can be significantly reduced.

Here, the electric signal may include a reference signal provided from the pixel unit which is reset to a power supply voltage and a pixel signal according to the amount of received light, the inverted electric signal may include an inverted reference signal and an inverted pixel signal, and the storage cell, when the inverted reference signal is provided from a corresponding one of the inverting amplifiers, may cause the gate capacitance to store the inverted reference signal, by temporarily turning ON the write switch transistor in the state where the read switch transistor is OFF.

According to the above-described configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing the reference signal, and thus the power consumption can be significantly reduced.

Here, the storage cell may further output the inverted reference signal stored in the gate capacitance from the other of the drain and the source of the depletion mode field-effect transistor, to a corresponding one of the output signal lines, by temporarily turning the read switch transistor ON in the state where the write switch transistor is OFF.

Here, when the inverted pixel signal is provided from a corresponding one of the inverting amplifiers, the storage cell may output the inverted pixel signal from the other of the drain and the source of the depletion mode field-effect transistor, to the corresponding one of the output signal lines, by turning the write switch transistor temporarily ON in the state where the read switch transistor is OFF.

Here, the electric signal may include a reference signal provided from the pixel unit that is reset to a power supply voltage and a pixel signal according to the amount of received light, the inverted electric signal may include the inverted reference signal and the inverted pixel signal, and the storage cell, when the inverted pixel signal is provided from a corresponding one of the inverting amplifiers, may cause the gate capacitance to store the inverted pixel signal by temporarily turning ON the write switch transistor in the state where the read switch transistor is OFF.

Here, the storage cell may further output the inverted pixel signal stored in the gate capacitance from the other of the drain and the source of the depletion mode field-effect transistor, to a corresponding one of the output signal lines, by temporarily turning the read switch transistor ON in the state where the write switch transistor is OFF.

It is to be noted that the depletion mode field-effect transistor may be a P channel type.

In addition, a method of driving the solid-state image capturing device according to an embodiment of the present invention is a method for the solid-state image capturing device which includes: a plurality of pixel units which are arranged in rows and columns and output electric signals according to the amount of received light; column signal lines each of which is provided to a corresponding one of columns of the plurality of pixel units; and a first storage unit which includes a plurality of storage cells arranged in rows and columns and stores inverted electric signals provided from the inverting amplifiers. Each of the storage cells includes: the depletion mode field-effect transistor of which one of the drain and the source is connected to a power line or a ground line; a write switch transistor which is disposed between a corresponding one of the column signal lines and the gate of the depletion mode field-effect transistor; and a read switch transistor which is disposed between a corresponding one of the output signal lines and the other of the drain and the source of the depletion mode field-effect transistor. The method of driving the solid-state image capturing device includes: providing the electric signal from the pixel units to the column signal lines; inverting the polarity of the electric signal by the inverting amplifier; and storing the inverted electric signal into the gate capacitance by turning the write switch transistor temporarily ON in the state where the read switch transistor is OFF when a corresponding one of the inverting amplifiers outputs the inverted electric signal.

Advantageous Effects

According to an aspect of the present invention which achieves the above described first object, it is possible to provide a solid-state image capturing element capable of implementing, with a small area, a circuit for holding a signal provided from a pixel.

According to an aspect of the present invention which achieves the above described second object, it is possible, in a solid-state image capturing element for storing an output electric signal provided from each of the pixel signals into a storage device in an element, to reduce power consumption so as to reduce a dark current.

According to an aspect of the present invention which achieves the above described third object, it is possible, in a solid-state image capturing element for storing an output electric signal provided from each of the pixel signals into a storage device in the element, to significantly reduce noise due to capacitance leak so as to achieve image capturing with high image quality.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Embodiments according to the present invention will be described below with reference to the drawings. It is to be noted that, although the present invention will be described with following embodiments and the drawings, they are intended not for the purpose of limitation but for exemplification only.

Embodiment 1

The following describes Embodiment 1 according to the present invention.

A solid-state image capturing element according to the present embodiment includes: a plurality of pixels arranged in rows and columns, each of the pixels outputting an electric signal corresponding to an amount of received light; a plurality of column signal lines each of which is disposed for a corresponding one of columns of the pixels and sequentially transfers the electric signal provided from the corresponding one of the columns of the pixels; and a plurality of holding circuits each of which is disposed for a corresponding one of the column signal lines and holds the electric signal transferred via the corresponding one of the column signal lines, wherein each of the holding circuits includes a circuit element including an input capacitance, and holds the electric signal in the input capacitance. According to the configuration described above, it is possible to implement, with a small area, a circuit for holding a signal provided from a pixel.

Figure 1:
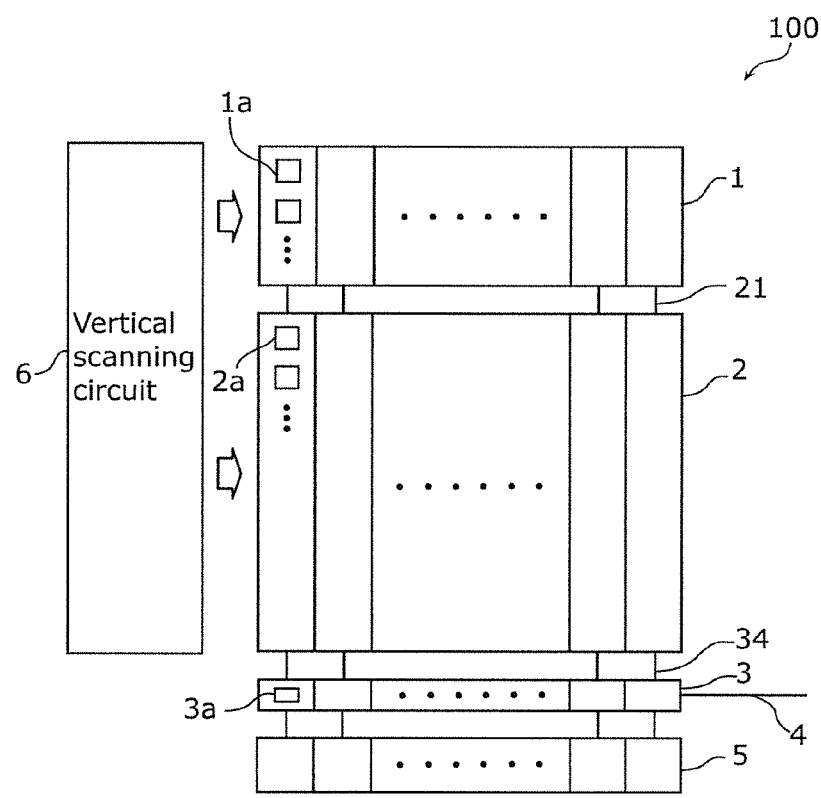
FIG. 1 is a block diagram which illustrates a configuration of a solid-state image capturing element according to Embodiment 1 of the present invention.

FIG. 1 is a block diagram which illustrates a configuration of a solid-state image capturing element 100 according to the present embodiment.

The solid-state image capturing element 100 illustrated in FIG. 1 includes: a pixel circuit unit 1; a holding circuit unit 2; a difference circuit unit 3; an output line 4, a horizontal scanning circuit 5; and a vertical scanning circuit 6.

The pixel circuit unit 1 includes a plurality of unit pixels in rows and columns. The holding circuit unit 2 includes a plurality of holding circuits each of which is a unit holding circuit, in rows and columns. The pixel circuit unit 1 and the holding circuit unit 2 are connected via column signal lines 21 each provided for a corresponding one of the columns. In addition, the difference circuit unit 3 includes a plurality of difference circuits each of which is a unit difference circuit, in rows and columns. The holding circuit unit 2 and the difference unit 3 are connected via reading column signal lines 34 each provided for a corresponding one of the columns.

A reference output and a signal output are provided from the pixel circuit unit 1. The reference output refers to an electric signal that is provided from the pixel circuit unit 1 when light is not irradiated onto the pixel circuit unit 1; that is, an electric signal in an initial state. The signal output refers to an electric signal that is provided from the pixel circuit unit 1 when light is irradiated onto the pixel circuit unit 1, according to the amount of light received by the pixel circuit unit 1. The holding circuit unit 2 holds the reference output and the signal output which are outputted from the pixel circuit unit 1. The difference circuit unit 3 outputs a difference output signal that is the difference between the reference output and the signal output which are held in the holding circuit unit 2. The difference output signal is outputted to the output line 4 in synchronization with an output signal provided from the horizontal scanning circuit 5. The vertical scanning circuit 6 applies, to the pixel circuit unit 1 and the holding circuit unit 2, a pulse signal for reading out a signal and providing the signal to the column signal lines 21 and the reading column signal lines 34.

It is to be noted that, the vertical scanning circuit 6 can be configured of a circuit such as a shift register and decoder. More specifically, any circuit can be used as long as the circuit is capable of scanning. The same applies to the horizontal scanning circuit 5. For example, the vertical scanning circuit 6 may include a decoder circuit Y which decodes a row address indicating a row of the holding circuit unit 2 and outputs a row selecting signal to the holding circuit unit 2, and the horizontal scanning circuit 5 may includes a decoder circuit X which decodes a column address indicating a column of the holding circuit unit 2 and outputs a column selecting signal to the holding circuit unit 2 or the difference circuit unit 3. This configuration facilitates random access to the holding circuit unit 2. For example, it is possible to easily implement reading an arbitrary pixel or region, or reading an arbitrary rectangular region, in an image represented by electric signals held in the holding circuit unit 2. In addition, it is possible to easily implement reading every K rows (K is an integer greater than or equal to two), reading every L columns (L is an integer greater than or equal to two), and skip reading (reduced reading) with a combination of the foregoing.

Figure 2:
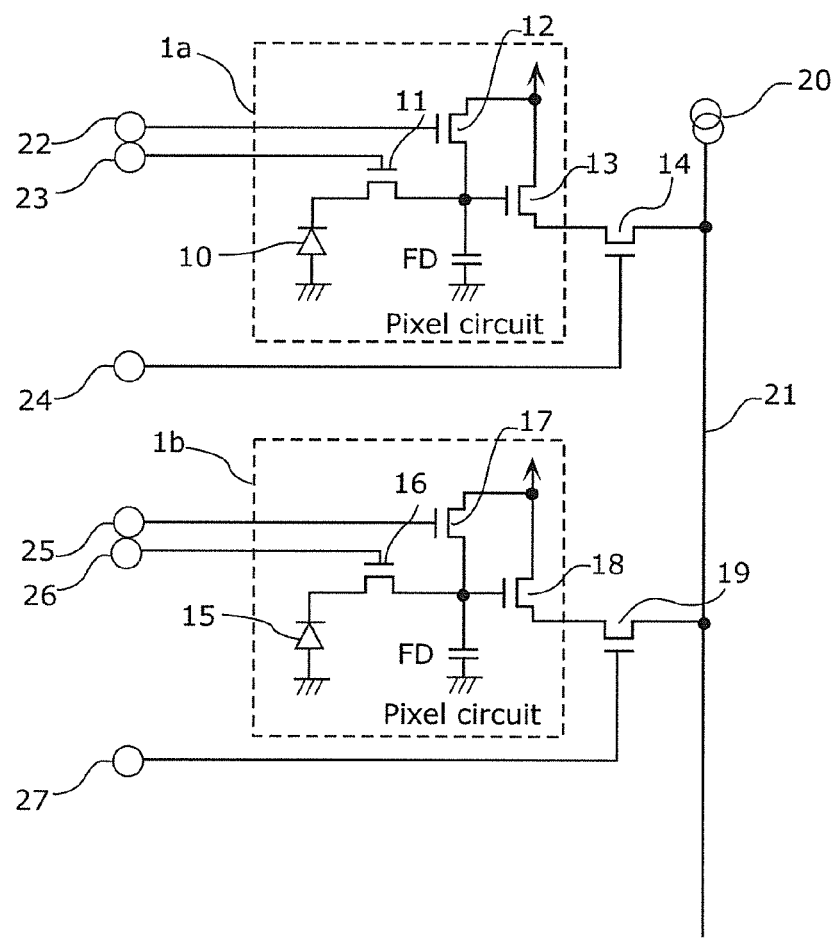
FIG. 2 is a circuit diagram which illustrates an example of a configuration of a pixel circuit unit having pixels circuits for two rows and one column in the solid-state image capturing element illustrated in FIG. 1.

FIG. 2 is a circuit diagram which illustrates an example of a configuration of the pixels for two rows and one column in the pixel circuit unit 1. The broken lines illustrated in FIG. 2 indicate pixels 1a and 1b which are unit pixels included in the pixel circuit unit 1. The pixel 1a includes a photodiode 10, a transfer MOS transistor 11, a reset MOS transistor 12, and an output MOS transistor 13. The pixel 1b includes a photodiode 15, a transfer MOS transistor 16, a reset MOS transistor 17, and an output MOS transistor 18, as with the pixel 1a.

In the pixel 1a, the photodiode 10 converts a received light signal into an electric signal to generate the electric signal according to the amount of the received light. The anode of the photodiode 10 is grounded and the cathode is connected to the drain of the transfer MOS transistor 11. The source of the transfer MOS transistor 11 is connected to the source of the reset MOS transistor 12 and the gate of the output MOS transistor 13, and the gate of the transfer MOS transistor 11 is connected to a terminal 23. The region ranging from the source of the transfer MOS transistor 11, the source of the reset MOS transistor 12, to the gate of the output MOS transistor 13 defines a diffusion capacitance called a floating diffusion (hereinafter referred to as FD). The drain of the reset MOS transistor 12 is connected to a power supply, and the gate is connected to a terminal 22. The drain of the output MOS transistor 13 is connected to the power supply, and the source is connected to the drain of a row selecting MOS transistor 14. The current supply 20 is connected to the column signal line 21. The gate of the row selecting MOS transistor 14 is connected to a terminal 24, and the output MOS transistor 13 and the current supply 20 form a source follower when in the conducting state.

Likewise, in the pixel 1b, the photodiode 15 converts a received light signal into an electric signal to generate the electric signal according to the amount of the received light. The anode of the photodiode 15 is grounded and the cathode is connected to the drain of the transfer MOS transistor 16. The source of the transfer MOS transistor 16 is connected to the source of the reset MOS transistor 17 and the gate of the output MOS transistor 18, and the gate of the transfer MOS transistor 16 is connected to a terminal 25. The region ranging from the source of the transfer MOS transistor 16, the source of the reset MOS transistor 17, to the gate of the output MOS transistor 18 defines a diffusion capacitance called an FD. The drain of the reset MOS transistor 17 is connected to a power supply, and the gate is connected to a terminal 25. The drain of the output MOS transistor 18 is connected to the power supply, and the source is connected to the drain of a row selecting MOS transistor 19. The gate of the row selecting MOS transistor 19 is connected to a terminal 27, and the output MOS transistor 18 and the current supply 20 form a source follower when in the conducting state.

In addition, the output terminals of the pixel 1a and the pixel 1b are connected to the column signal line 21 via the row selecting MOS transistor 14 and the row selecting MOS transistor 19, respectively. The column signal line 21 is connected to the first holding circuit unit 2 illustrated in FIG. 1, and the output signals from the pixels 1a and 1b are provided to the holding circuit unit 2.

Figure 3:
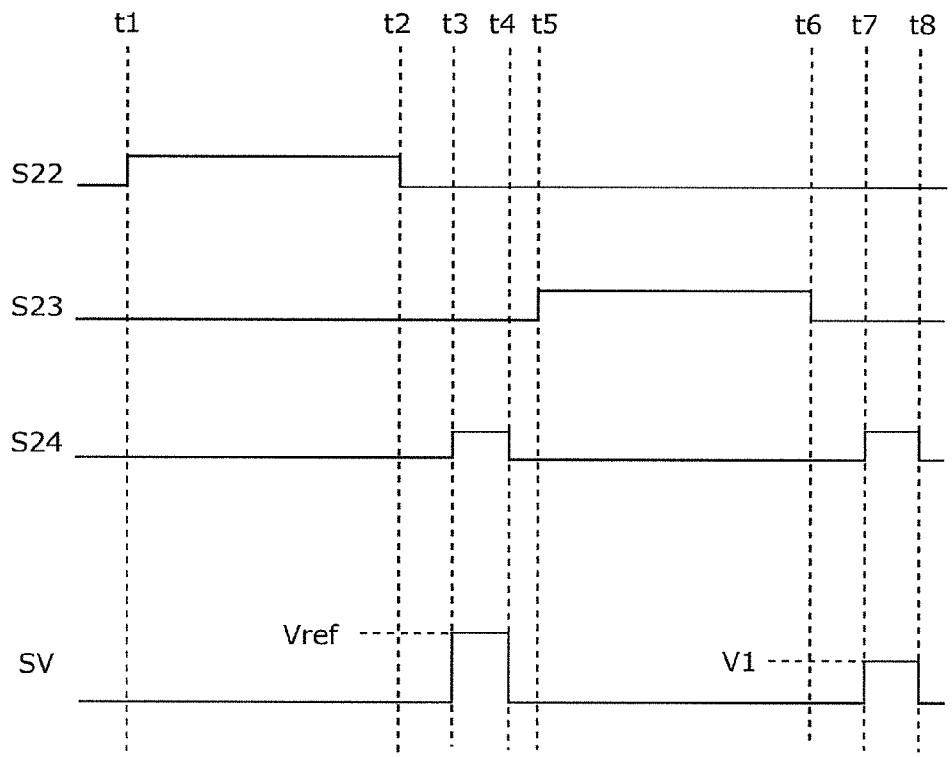
FIG. 3 is a timing chart which illustrates temporal changes in main signals in the solid-state image capturing element illustrated in FIG. 1.

FIG. 3 is a timing chart which illustrates temporal changes in main signals in the solid-state image capturing element 100 according to the present embodiment.

FIG. 3 illustrates control signals applied from the vertical scanning circuit 6 to each of the terminals 22, 23, 24, 25, 26, and 27 in FIG. 2. The control signals are indicated by the denotations of which S is added to the reference numerals of the terminals to which the control signals are applied.

More specifically, the signal S22 is a signal which is applied to the terminal 22 and provided to the gate of the reset MOS transistor 12. The signal S23 is a signal which is applied to the terminal 23 and provided to the gate of the transfer MOS transistor 11. The signal S24 is a signal which is applied to the terminal 24 and provided to the gate of the row selecting MOS transistor 14. In addition, the signal SV indicates an output signal to be provided to the column signal line 21.

Next, an operation performed by the pixel circuit unit 1 of the solid-state image capturing element 100 according to the present embodiment will be described with reference to FIG. 2 and FIG. 3.

At time t1 in FIG. 3, the signal S22 is "HIGH", and the vertical scanning circuit 6 provides the gate of the reset MOS transistor 12 in the pixel 1a with a pulse signal in the "HIGH" level to bring the reset MOS transistor 12 into conduction, so that the FD of the pixel 1a is connected to the power supply to be into an initial state. At time t2, the signal S22 is "LOW", and the MOS transistor 12 is brought into non-conduction. This brings the pixel 1a into an initial (reset) state.

In a time period from time t3 to time t4, the signal S24 is "HIGH", and the vertical scanning circuit 6 provides the gate of the row selection transistor 14 with the pulse signal in the "HIGH" level to bring the row selection transistor 14 into conduction. The reference output corresponding to the potential of the FD in the pixel 1a, which is in the initial state, is provided to the column signal line 21 via the source follower including the output MOS transistor 13 and the current supply 20 (a value Vref of the signal SV at time t3 in FIG. 3: reference output).

In a time period from time t5 to time t6, the signal S23 is "HIGH", and the vertical scanning circuit 6 provides the gate of the transfer MOS transistor 11 with the pulse signal in the "HIGH" level to bring the transfer MOS transistor 11 into conduction, so that charges accumulated in the photodiode 10 of the pixel 1a are transferred to the FD. Then, the voltage (FD potential) generated by the transferred charges and the capacitance of the FD is applied to the gate of the output MOS transistor 13.

In a time period from time t7 to time t8, the signal S24 is "HIGH", and the vertical scanning circuit 6 provides the gate of the row selection transistor 14 with the pulse signal in the "HIGH" level to bring the row selection transistor 14 into conduction. The signal output corresponding to the FD potential of the pixel 1a is provided to the column signal line 21 via the source follower including the output MOS transistor 13 and the current supply 20 (a value V1 of the signal SV at time t7 in FIG. 3: signal output).

Subsequent to time t8, the pixel 1b is driven in the same manner as in the forgoing.

Figure 4A:
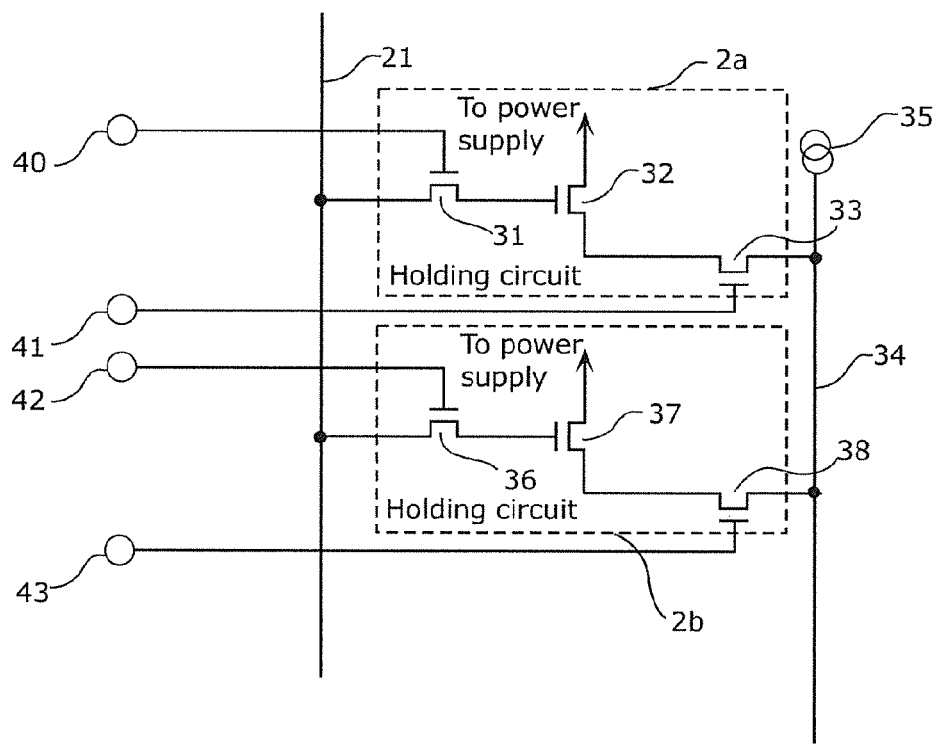
FIG. 4A is a circuit diagram which illustrates an example of a configuration of a holding circuit unit in the solid-state image capturing element illustrated in FIG. 1.

FIG. 4A is a circuit diagram which illustrates an example of a configuration of the holding circuit unit 2 of the solid-state image capturing element 100 according to the present embodiment.

FIG. 4A illustrates holding circuits 2a and 2b which are unit holding circuits included in the holding circuit unit 2. The holding circuit 2a is connected to the column signal line 21 and the reading column signal line 34, and includes a write transistor 31, a holding transistor 32, and a read transistor 33. The holding circuit 2b is connected to the column signal line 21 and the reading column signal line 34, and includes a write transistor 36, a holding transistor 37, and a read transistor 38.

The holding transistor 32, the read transistor 33, and the current supply 35 form the source follower. In addition, the holding transistor 37, the read transistor 38, and the current supply 35 form the source follower. The holding circuits 2a and 2b hold and output the signal output provided from the column signal line 21 to each gate capacitance of the holding transistors 32 and 37, respectively. More specifically, the holding circuits 2a and 2b serve as both of a holding capacitance and an amplifier (a transistor for amplification).

Here, the write transistors 31 and 36 correspond to the first transistors according to the present embodiment, and the read transistors 33 and 38 correspond to the second transistors.

The gates of the write transistors 31 and 36 are connected to terminals 40 and 42, respectively, and the read transistors 33 and 38 are connected to terminals 41 and 43, respectively.

Figure 5:
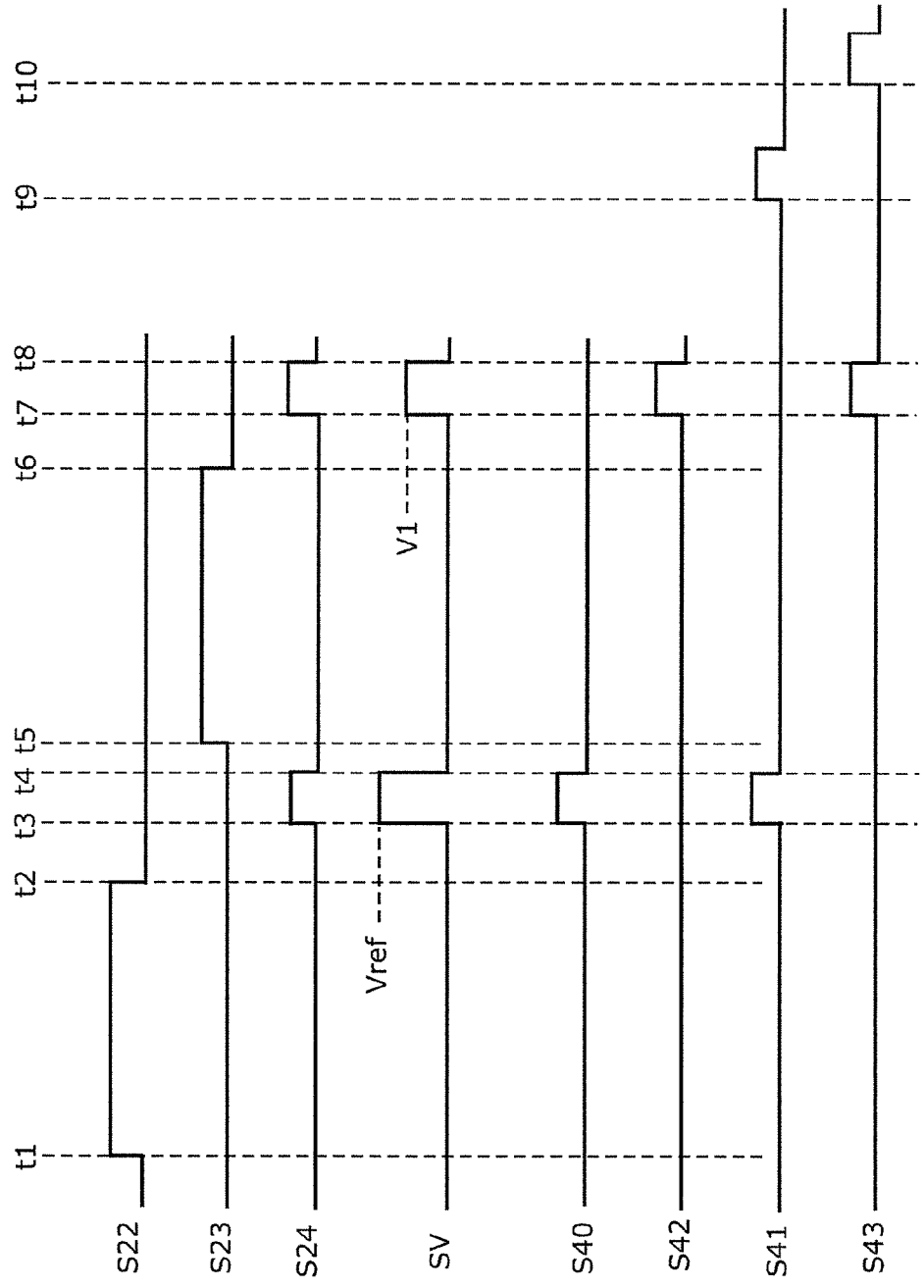
FIG. 5 is a timing chart which illustrates temporal changes in main signals in the solid-state image capturing element illustrated in FIG. 1.

FIG. 5 is a timing chart which illustrates temporal changes in main signals in the solid-state image capturing element 100 according to the present embodiment.

FIG. 5 illustrates control signals applied from the vertical scanning circuit 6 to each of the terminals 22, 23, 24, 25, 26, 27, 40, 41, 42, and 43 in FIG. 2 to FIG. 4A. The control signals are indicated by the denotations of which S is added to the reference numerals of the terminals to which the control signals are applied.

The signal S22, the signal S23, the signal S24, and the signal SV are the same as the signals described in FIG. 3.

In addition, the signal S40 is a signal which is applied to the terminal 40 and is provided to the gate of the write transistor 31. The signal S42 is a signal which is applied to the terminal 42 and is provided to the gate of the write transistor 36. The signal S41 is a signal which is applied to the terminal 41 and is provided to the gate of the read transistor 33. The signal S43 is a signal which is applied to the terminal 43 and is provided to the gate of the write transistor 38.

Next, an operation performed by the holding circuit unit 2 of the solid-state image capturing element 100 according to the present embodiment will be described with reference to FIG. 4A and FIG. 5.

In a time period from time t3 to time t4 in FIG. 5, the reference output Vref is provided from the pixel 1a to the column signal line 21. At this time, the signal S40 and the signal S41 are "HIGH", so that the vertical scanning circuit 6 provides each of the gates of the write transistor 31 and the read transistor 33 with a pulse signal in "HIGH" level, thereby bringing the write transistor 31 and the read transistor 33 into conduction. The write transistor 31 is brought into conduction, so that the reference output Vref is conducted from the column signal line 21 to the gate of the holding transistor 32 and held in the gate capacitance of the holding transistor 32. At this time, since the read transistor 33 is also in the conducting state, the source follower formed by the holding transistor 32, the read transistor 33, and the current supply 35 operates as well. Accordingly, at time t9 described below, an output signal according to the reference output Vref accumulated in the gate capacitance of the holding transistor 32 is provided to the reading column signal line 34.

As described above, when the write transistor 31 is in the conducting state, the read transistor is also in the conducting state, and thus the holding transistor 32 and the read transistor 33, together with the current supply 35, operate as the source follower; that is, operate as an amplifier. Accordingly, it is possible to amplify an output signal according to the electric signal accumulated in the gate capacitance of the holding transistor 32 and efficiently provide the reading column signal line 34 with the amplified output signal.

In addition, when holding an electric signal in the holding circuit 2a, the holding transistor 32 and the read transistor 33 are brought into conduction as with the time when reading an electric signal held in the holding circuit 2a. More specifically, the state when holding an electric signal in the holding circuit 2a is the same as the state when reading an electric signal held in the holding circuit 2a, and thus it is possible to accurately hold and read a signal value held therein.

In a time period from time t7 to time t8, the signal output V1 is provided from the pixel 1a to the column signal line 21. At this time, the signal S42 and the signal S43 stay "HIGH", so that the vertical scanning circuit 6 provides each of the gates of the write transistor 36 and the read transistor 38 with a pulse signal in the "HIGH" level, thereby bringing the write transistor 36 and the read transistor 38 into conduction. The write transistor 36 is brought into conduction, so that the signal output V1 is conducted from the column signal line 21 to the gate of the holding transistor 37 and held in the gate capacitance of the holding transistor 37. At this time, since the read transistor 38 is also in the conducting state, the source follower formed by the holding transistor 37, the read transistor 38, and the current supply 35 operates as well. Accordingly, at time t10 described below, an output according to the signal output V1 accumulated in the gate capacitance of the holding transistor 37 is provided to the reading column signal line 34.

As described above, when the write transistor 36 is in the conducting state, the read transistor 38 is also in the conducting state, and thus the holding transistor 37 and the read transistor 38, together with the current supply 35, operate as the source follower; that is, operate as an amplifier. Accordingly, it is possible to amplify an output signal according to the electric signal accumulated in the gate capacitance of the holding transistor 37 and efficiently provide the reading column signal line 34 with the amplified output signal.

In addition, when holding an electric signal in the holding circuit 2b, the holding transistor 37 and the read transistor 38 are brought into conduction as with the time when reading an electric signal held in the holding circuit 2b. More specifically, the state when holding an electric signal in the holding circuit 2b is the same as the state when reading an electric signal held in the holding circuit 2b, and thus it is possible to accurately hold and read a signal value held therein.

At time t9, the signal S41 is "HIGH" and the read transistor 33 is brought into conduction, so that an output signal according to the reference output Vref is provided to the reading column signal line 34.

At time t10, the signal S43 is "HIGH" and the read transistor 38 is brought into conduction, so that an output signal according to the signal output V1 is provided to the reading column signal line 34.

As described above, the holding transistors 32 and 37 serve as both of the holding capacitance and the amplifier (the transistor for amplification) in the holding circuits of the solid-state image capturing element according to the present embodiment, and thus it is possible to reduce the circuit area compared to the solid-state image capturing element according to conventional techniques, in which the holding capacitance and the amplifier are independently provided.

Figure 6:
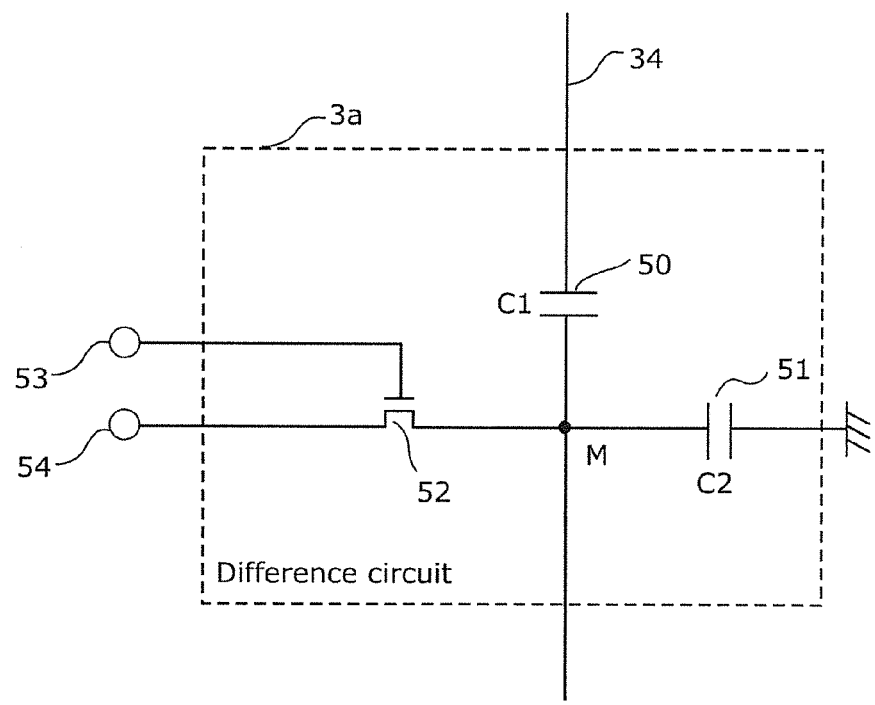
FIG. 6 is a circuit diagram which illustrates an example of a configuration of a difference circuit unit in the solid-state image capturing element illustrated in FIG. 1.

Furthermore, FIG. 6 is a circuit diagram which illustrates an example of a configuration of the difference circuit unit 3 of the solid-state image capturing element 100 according to the present embodiment. The difference circuit unit 3 provides, from the holding circuit unit 2, a difference signal between a reset signal and an electric signal when light is not received by the pixel circuit unit 1.

FIG. 6 illustrates a difference circuit 3a which is a unit difference circuit included in the difference circuit unit 3. As illustrated in FIG. 6, the difference circuit 3a includes a capacitor 50 connected to the reading column signal line 34, a capacitor 51 which is grounded, and an MOS transistor 52. The gate of the MOS transistor 52 is connected to the terminal 53, and the source or the drain of the MOS transistor 52 is connected to a terminal 54 to which a bias voltage is applied. In addition, a capacitance value of the capacitor 50 is C1, and a capacitance value of the capacitor 51 is C2.

Figure 7A:
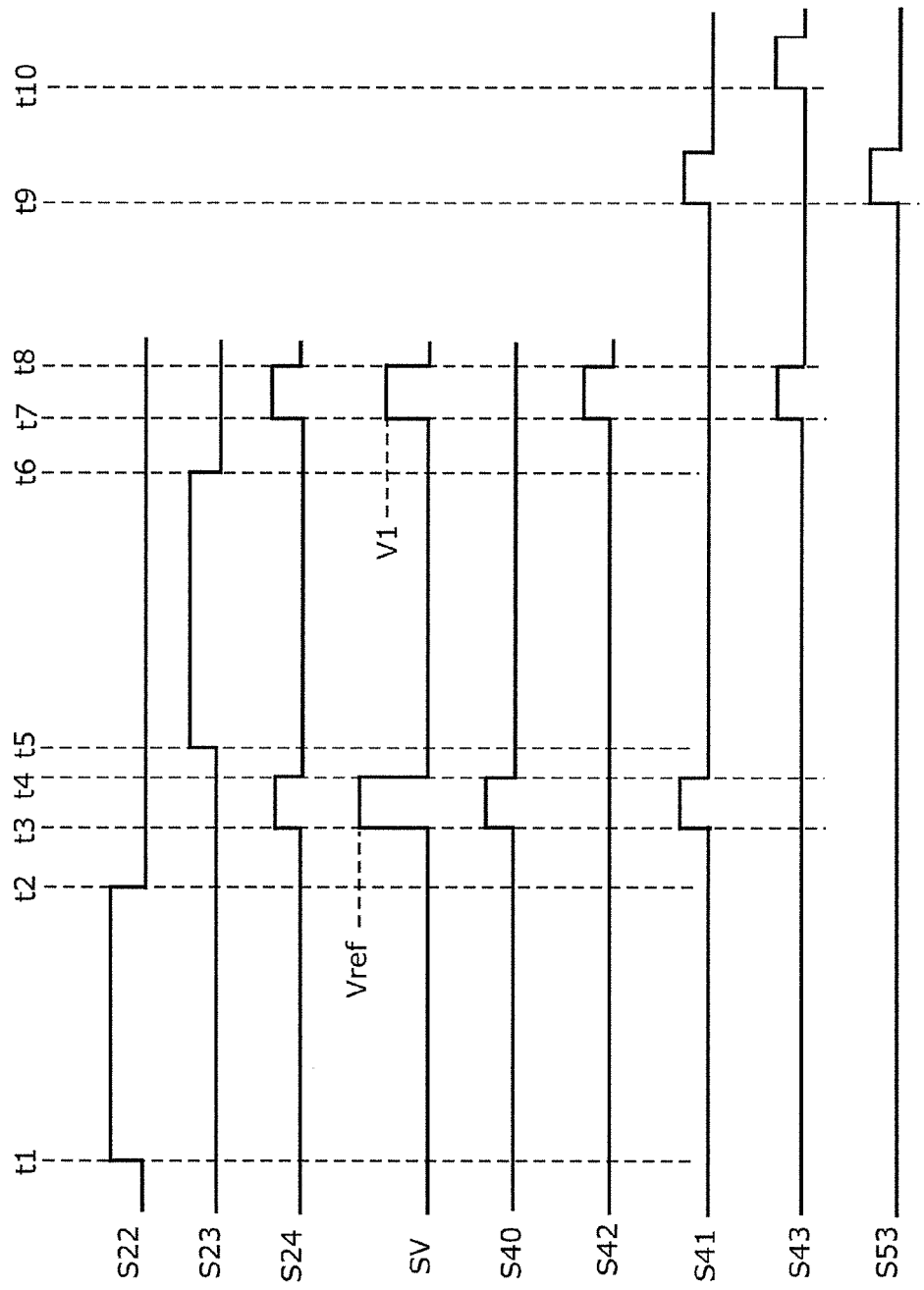
FIG. 7A is a timing chart which illustrates temporal changes in main signals in the solid-state image capturing element illustrated in FIG. 1.

FIG. 7A is a timing chart which illustrates temporal changes in main signals in the solid-state image capturing element 100 according to the present embodiment. Signals other than the signal S53 are the same signals as the signals described in FIG. 5. S53 is a control signal which is applied to the gate of the MOS transistor 52.

Next, an operation performed by the difference circuit unit 3 of the solid-state image capturing element 100 according to the present embodiment will be described with reference to FIG. 6 and FIG. 7A.

At time t9 in FIG. 7A, the reference output Vref is provided to the reading column signal line 34 from the read transistor 33 in the holding circuit 2a. At the same time, the signal S53 is "HIGH", so that a pulse signal in the "HIGH" level is applied to the gate of the MOS transistor 52, and thus the MOS transistor 52 is brought into conduction to transmit the bias voltage of the terminal 54 to a point M in FIG. 6. Given the bias voltage is VB, the potential of the capacitor 50 is Vref at the side of the reading column signal line 34 and VB at the side of the point M, so that a voltage of (Vref−VB) is applied to the capacitor 50. Meanwhile, the voltage of VB is applied to the capacitor 51 at the side of point M.

At time t10, the signal S53 is "LOW", and thus the MOS transistor 52 is in a non-conducting state and the signal output V1 is provided to the reading column signal line 34. At this time, the potential of the capacitor 50 is (Vref−V1) at the side of the reading column signal line, and (Vref−V1)*C1/(C1+C2) at the side of point M, so that a difference voltage is obtained which is divided according to the capacitance of the reference output Vref and the signal output V1. More specifically, even when noise is included in V1 and Vref, since the difference voltage is obtained from (Vref−V1) and (Vref−V1)*C1/(C1+C2), it is possible to obtain an output signal from which the effect of noise is removed.

As described above, it is possible to suppress noise generated in the solid-state image capturing element 100, by combining the difference circuit unit 3.

Next, various operations performed by a solid-state image capturing device according to the present embodiment will be described. The following describes (1) a memory through mode, (2) a multiple-frame holding mode, and (3) a mechanical shutter combination use mode.

First, (1) the memory through mode is described. Subsequent to time t8 illustrated in FIG. 7A, when the first transistor 31 and the second transistor 33 are constantly in the conducting state in the unit holding circuit for a singe row of the holding circuit unit 2, such as the holding circuit 2a for a single row in FIG. 4A, it is possible, while holding pixel signal information of Nth frame prior to time t8 in the holding circuit unit 2, to output pixel signal information of the (N+1)th frame without holding the pixel signal information of the (N+1)th frame in the holding circuit unit 2. In other words, it is possible, while holding pixel signal information in the holding circuit unit 2, to read the next pixel signal information. This is called the "memory through mode".

Figure 4B:
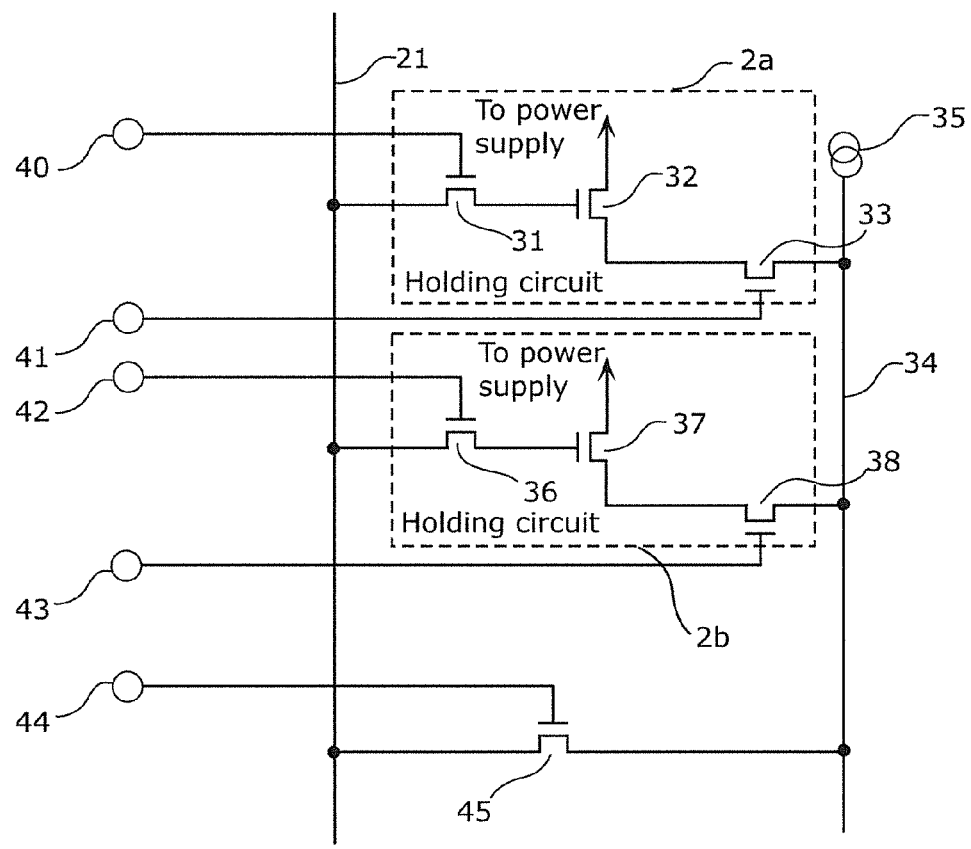
FIG. 4B is a circuit diagram which illustrates an example of a configuration of the holding circuits which correspond to a memory through mode.

In addition, as shown in FIG. 4B, the above-described operation of the "memory through mode" can be performed as well by connecting a transistor 45 between the column signal line 21 and the reading column signal line 34 and applying a signal on a gate terminal 44 for bringing the transistor 45 into conduction, so that the transistor 45 comes into conduction. This is called the "memory through mode".

There is concern, in some cases, for noise caused by holding a signal in the holding circuit unit and deterioration in the image quality due to a dark current, depending on the demand characteristics and the image capturing mode of a camera. In such a case, the memory through mode enables reading, while holding pixel signal information in the holding circuit unit, the next signal information, thereby realizing less noise and a low dark current.

Next, (2) the multiple-frame holding mode is described. Although the holding circuit unit 2 illustrated in FIG. 1 is provided with the holding circuits of the corresponding number to the number of pixels in the pixel circuit unit 1, it is also possible to provide the holding circuit unit 2 with the holding circuits of more than the number of pixels.

For example, pixel signal information for two frames can be held by providing the holding circuit unit 2 with twice as many holding circuits as the number of pixels, and it is possible to perform shading correction on the pixel circuit unit 1 by holding the pixel signal information of a dark period for one frame and the pixel signal information of a bright period for the remaining one frame and calculating the difference between the pixel signal information of the dark period and the pixel signal information of the bright period. As described above, it is possible to correct or process the signal information by providing the holding circuit unit 2 with the holding circuits of more than the number of pixels.

In addition, even when providing the holding circuit unit 2 with the number of holding circuits corresponding to the number of pixels in the pixel circuit unit 1, it is possible to hold a plurality of frames with a small number of pixels, by perform pixel skipping. For example, horizontally skipping two pixels and vertically skipping two pixels allows holding four frames with the 1/4 numbers of pixels. In addition, horizontally skipping three pixels and vertically skipping three allows holding nine frames with the 1/9 numbers of pixels. For example, temporally consecutive frames having different exposure periods are held in the holding circuit 2 and the frames are integrated into one frame outside the solid-state imaging device, thereby making it possible to obtain an image with expanded dynamic range.

Figure 7B:
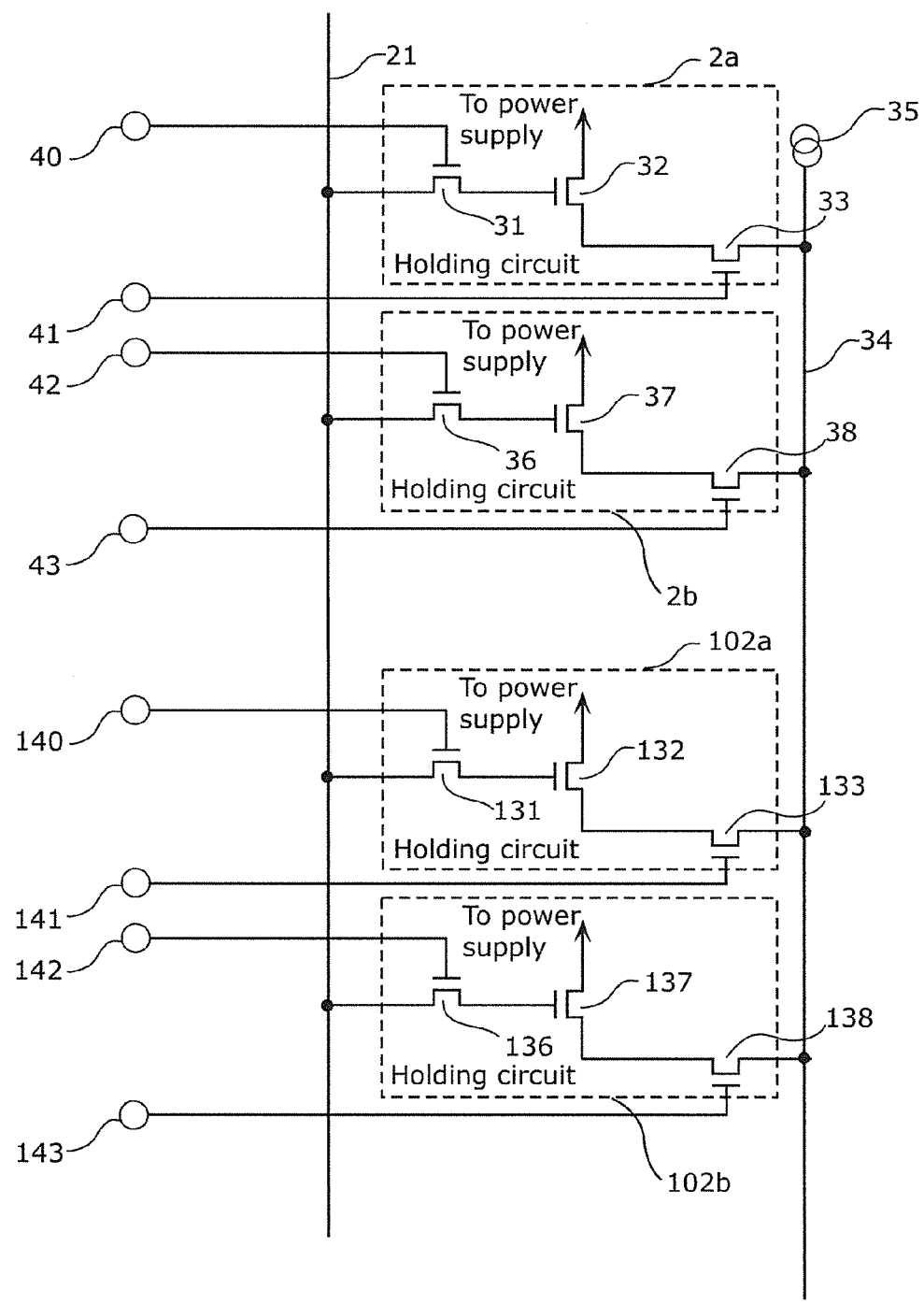
FIG. 7B is a circuit diagram which illustrates a configuration of the holding circuits for two rows.

In addition, (3) the mechanical shutter combination use mode is described. FIG. 7B illustrates the holding circuits for two rows. In FIG. 7B, two sets of the holding circuits are provided. Each of the sets includes the holding circuits for one row (shown in FIG. 4A). As with FIG. 4A, FIG. 7B illustrates the holding circuits 102a and 102b which are unit holding circuits. The holding circuit 102a is connected to the column signal line 21 and the reading column signal line 34, and includes a write transistor 131, a holding transistor 132, and a read transistor 133. The holding circuit 102b is connected to the column signal line 21 and the reading column signal line 34, and includes a write transistor 136, a holding transistor 137, and a read transistor 138. The holding transistor 132, the read transistor 133, and the current supply 35 form the source follower. In addition, the holding transistor 137, the read transistor 138, and the current supply 35 form the source follower. The holding circuits 102a and 102b hold and output the signal output provided from the column signal line 21 to the gate capacitance of the holding transistors 132 and 137. More specifically, the holding circuits 102a and 102b serve as both of the holding capacitance and the amplifier (a transistor for amplification).

Figure 7C:
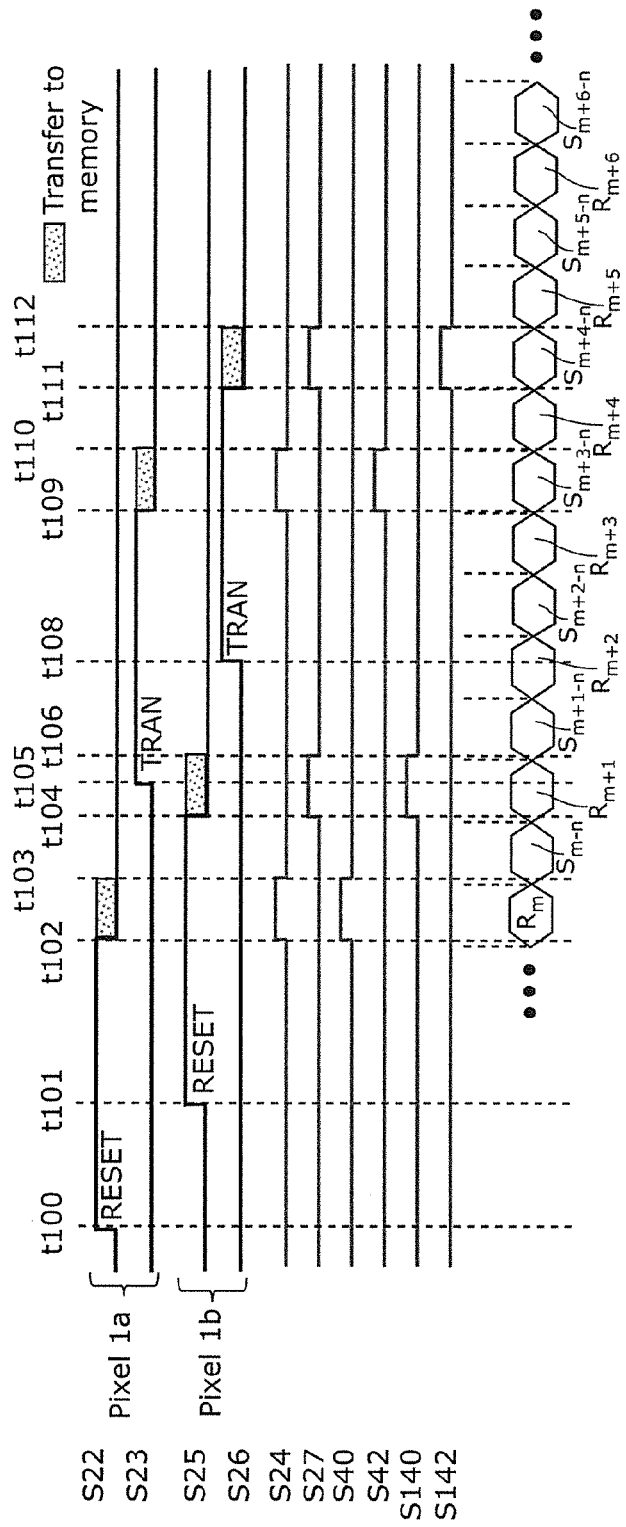
FIG. 7C is a timing chart which illustrates temporal changes in other main signals in the solid-state image capturing element according to the present embodiment.

FIG. 7C is a timing chart which illustrates temporal changes in other main signals in the solid-state image capturing element 100 according to the present embodiment.

FIG. 7C illustrates control signals applied from the vertical scanning circuit 6 to each of the terminals 22, 23, 24, 25, 26, 27, 40, 42, 140, and 142 in FIG. 2 to FIG. 7B. The control signals are indicated by the denotations of which S is added to the reference numerals of the terminals to which the control signals are applied.

The driving illustrated in FIG. 7C differs from the driving illustrated in each of FIG. 3, FIG. 5, and FIG. 7A in that periods for applying signals for setting the respective pixels to their initial (reset) states are overlapped, and periods for applying signals for transferring charges from each of the pixels to the FD are overlapped.

An initializing signal S22 is applied to the pixel 1a in a time period from time t100 to time t103, and the initializing signal of the pixel 1a is transferred via the transistor 14 and the transistor 31 and stored in the gate of the transistor 32, in a time period from time t102 to time t103. An initializing signal S25 is applied to the pixel 1b in a time period from time t101 to time t106, and the initializing signal of the pixel 1b is transferred via the transistor 19 and the transistor 131 and stored in the gate of the transistor 132, in a time period from time t104 to time t106. In addition, a signal S23 for transferring charges of the pixel 1a to the FD is applied in a time period from time t105 to time t110, and the FD signal of the pixel 1a is transferred via the transistor 14 and the transistor 36 and stored in the gate of the transistor 37, in a time period from time t109 to time t110. A signal S26 for transferring charges of the pixel 1b to the FD is applied in a time period from time t108 to time t112, and the FD signal of the pixel 1b is transferred via the transistor 19 and the transistor 136 and stored in the gate of the transistor 137, in a time period from time t111 to time t112. As described above, it is possible to transfer the pixel signals to the holding circuit unit at high speed, by performing the driving with which the periods for applying signals for setting the respective pixels to their initial (reset) states are overlapped and the periods for applying signals for transferring charges from each of the pixels to the FD are overlapped. Reading of the holding circuit is performed in the same manner as above.

For example, when there are four thousand pixel rows and the initializing signal and the FD signal for one row is transferred in one microsecond, the pixel signals in all of the rows can be transferred to the holding circuit in four milliseconds.

In the case of cameras, when transferring the pixel signal to the holding circuit in four milliseconds at the same time the mechanical shutter closes and changing to the "memory through mode" in the state the pixel signals for one frame (for example, all of the pixels) are held in the holding circuit, it is possible to obtain a monitor image (a reduced image resulting from skipping and mixing, for example) four milliseconds after the mechanical shutter closes. This can be realized, in the case where the mechanical shutter is a rear curtain shutter of a focal-plane shutter, for example, by performing control of synchronizing the start of exposure by an electronic shutter and the end of exposure by the rear curtain shutter, and so on.

With conventional techniques, a monitor image can only be obtained 200 milliseconds after the mechanical shutter closes even in an action mode of 5 FPS. On the other hand, in the mechanical shutter combination use mode, it is possible to obtain the monitor image at high speed, thereby allowing improved real-time characteristics of the monitor image.

It is to be noted that the reading from the holding circuit 2 is non-destructive reading. More specifically, since each of the transistor 32 and the transistor 37 illustrated in FIG. 4A holds a signal in the gate, the signals (charges) in the gates of the transistor 32 and the transistor 37 are held and change such as disappearance is not seen even when signal information is read by the transistor 32 in the period from time t3 to time t4 in FIG. 7A and by the transistor 37 in the period from time t7 to time 8 in FIG. 7A. Therefore, it is possible to perform the non-destructive reading with which reading can be performed a number of times. When a rectangle region is read with the above-described random access, for example, it is possible to again perform reading of a rectangle region with a slight shift of the position.

It is to be noted that the above-described operation modes (1) to (3) may be combined in operation. This facilitates a higher operation speed because the operation which can only be carried out outside the solid-state image capturing device with conventional techniques can be carried out in the operation mode within the solid-state image capturing device.

It is to be noted that the present invention is not limited to the above-described embodiment, and a variety of modifications or variations are possible in the exemplary embodiments without materially departing from the novel teachings and advantages of the present invention.

For example, although the case where the unit pixel includes a single photoelectric conversion element is exemplified in the present embodiment, the present invention is not limited to this and can be adapted to the case where the unit pixel includes a plurality of the photoelectric conversion elements and the FD is shared by the plurality of photoelectric conversion elements. For example, a pixel configuration shown in FIG. 8A and FIG. 8B may be implemented.

Figure 8A:
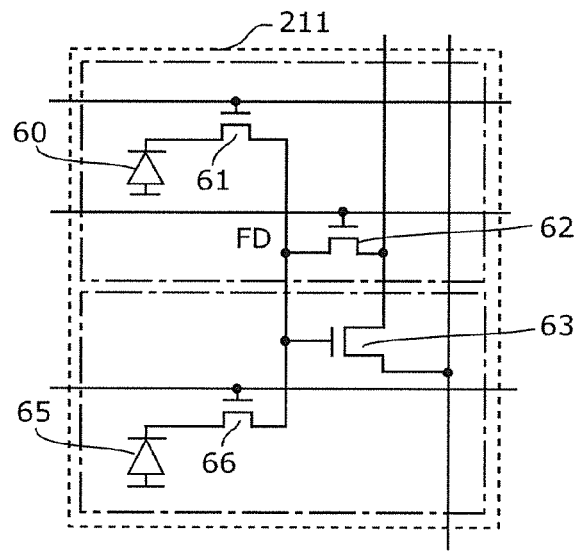
FIG. 8A is a circuit diagram which illustrates an example of a configuration of a pixel circuit unit in which an FD is shared among a plurality of photoelectric conversion elements.

In FIG. 8A, a unit pixel 211 includes: photodiodes 60 and 65 which are photoelectric conversion elements; transfer transistors 61 and 66; a reset transistor 62; and an SF transistor 63. More specifically, the unit pixel 211 includes two photoelectric conversion elements and two transfer transistors for a single FD, a single reset transistor (shared reset transistor), and a single SF transistor (shared SF transistor), and signals of the two photoelectric conversion elements pass through each of the transfer transistors 61 and 66, and read out to the FD.

Figure 8B:
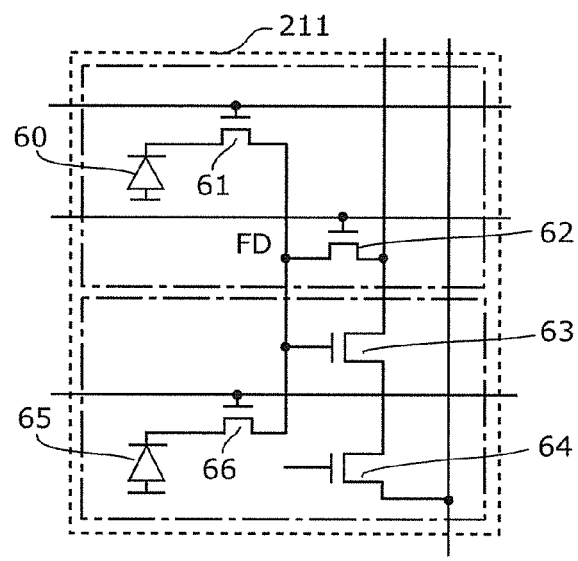
FIG. 8B is a circuit diagram which illustrates an example of a configuration of the pixel circuit unit in which the FD is shared among a plurality of photoelectric conversion elements.

In addition, in FIG. 8B, the unit pixel 211 includes a selection transistor 64 in addition to the configuration of the unit pixel 211 illustrated in FIG. 8A. As described above, the aperture of the light receiving unit in the pixel cell further improves by sharing the FD among the plurality of photoelectric conversion elements.

Figure 9:
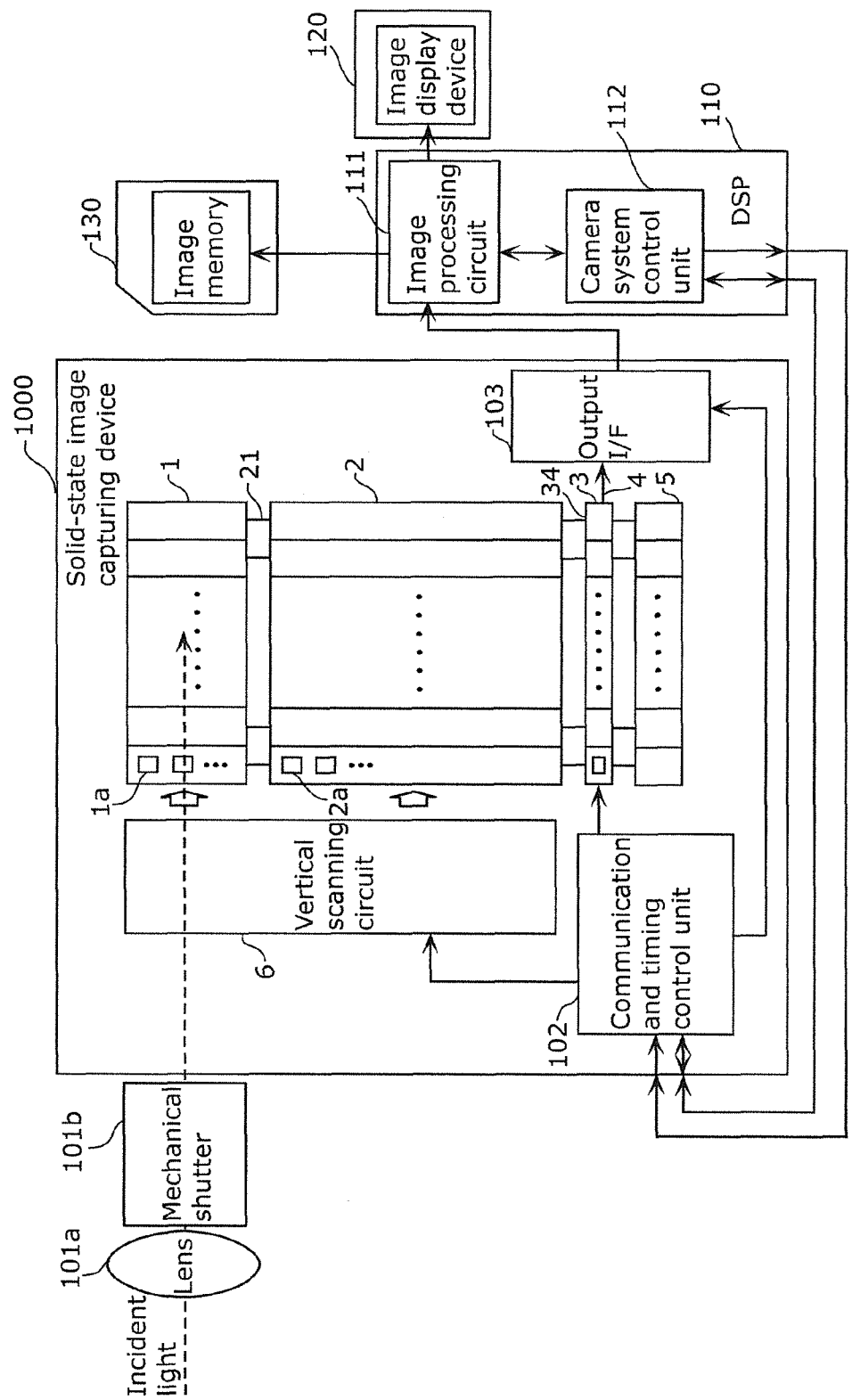
FIG. 9 is a diagram which illustrates a schematic structure of a camera according to the present embodiment.

FIG. 9 is a diagram which illustrates a schematic structure of a camera according to the present embodiment.

This camera includes: a solid-state image capturing device 1000 (or also denoted by 200); a lens 101a; a mechanical shutter 101b; a DSP (digital signal processing circuit) 110; an image display device 120; and an image memory 130. It is to be noted that, a lens shutter or a focal-plane shutter is used as the mechanical shutter 101b. In addition, in the case of the focal-plane shutter, two curtains, that is, a front curtain and a rear curtain are included. In this diagram, straight line arrows indicate transmission directions of the respective signals.

In this camera, light enters from outside via the lens 101a and the mechanical shutter 101b, and the incident light is converted into an output signal by the solid-state imaging device 1000 and output from the horizontal signal line 3 and an output I/F 103. Then, the output signal, after outputted, is processed by the DSP 110, provided as a video signal to the image memory 130 and recorded, and provided to the image display device 120 and displayed as an image.

The DSP 110 includes an image processing circuit 111 and a camera system control unit 112. The image processing circuit 111 generates a video signal by performing a process such as denoising on the output signal of the solid-state image capturing device 1000, and the camera system control unit 112 controls a scanning timing and gain of pixels in the solid-state image capturing device 1000. The DSP 110, for example, performs correction related to characteristic difference between pixels shared in a unit cell in the solid-state image capturing device 1000.

A communication and timing control unit (timing generator) 102 receives a master clock CLKO and data DATA which are provided via an external terminal and generates a variety of internal clocks, to control the vertical scanning circuit 6, the difference circuit unit 3, the horizontal scanning circuit unit 5, the output I/F 103, and the like.

It is to be noted that, in the present embodiment, an analog/digital signal processing unit (AD converter) may be provided between the holding circuit 2 and the output I/F 103.

(Embodiment 2)

Figure 10:
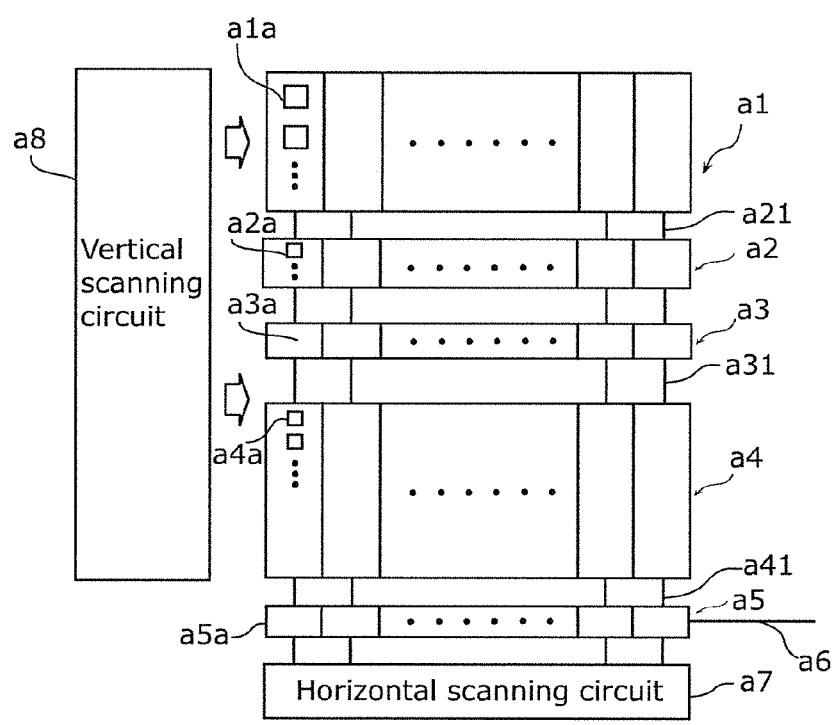
FIG. 10 is a block diagram which illustrates a configuration of a solid-state image capturing element according to Embodiment 2 of the present invention.

FIG. 10 is a block diagram which illustrates a configuration of a solid-state image capturing element according to the present embodiment.

The solid-state image capturing element illustrated in FIG. 10 includes: a pixel circuit a1; a first storage circuit a2; a first difference circuit a3; a second storage circuit a4; a second difference circuit a5; an output line a6; a horizontal scanning circuit a7; a vertical scanning circuit a8; and a column signal line a21.

The pixel circuit a1 includes a plurality of pixel units a1a which are arranged in rows and columns and output electric signals according to the amount of received light. Each of the pixel unit a1a outputs a reference signal and a pixel signal as the above-described electric signals. The reference signal is a signal indicating a reference voltage provided from the pixel unit a1a in a reset state, which is substantially in the level of a power supply voltage. The pixel signal is a signal in a voltage level according to the amount of received light.

The column signal line 21 is provided for each of the columns of the plurality of pixel units a1a.

The first storage circuit a2 includes a plurality of storage cells a2a which are arranged in rows and columns and store an electric signal transmitted from the column signal lines a21. Each of the storage cells a2a includes a depletion mode field-effect transistor to store the electric signal transmitted from the column signal lines a21 into a gate capacitance of the depletion mode field-effect transistor. The first storage circuit a2 stores both of the reference signal and the pixel signal, or only the reference signal.

The first difference circuit a3 includes a unit difference circuit a3a provided for each of the columns. Each of the unit difference circuit a3a outputs the difference between the reference signal and the pixel signal which are stored in the first storage circuit a2, or the difference between the reference signal stored in the first storage circuit a2 and the pixel signal provided from the pixel circuit a1. The second storage circuit a4 stores the difference provided from the first difference circuit a3. The second difference circuit a5 includes a unit difference circuit a5a provided for each of the columns. Each of the unit difference circuits a5a calculates the difference between the difference stored in the storage circuit a4 and the reference voltage, and outputs the resulting difference to the output line a6 in synchronization with the output of the horizontal scanning circuit a7. The vertical scanning circuit a8 applies a pulse to the pixel circuit a1, the first storage circuit a2, and the second storage circuit a4.

With the configuration illustrated in FIG. 10, the electric signals are stored in the gate capacitance with less variation with respect to the variation of the gate voltage at the time of writing and reading, and thus it is possible to lower the power consumption and reduce a dark current.

Figure 11:
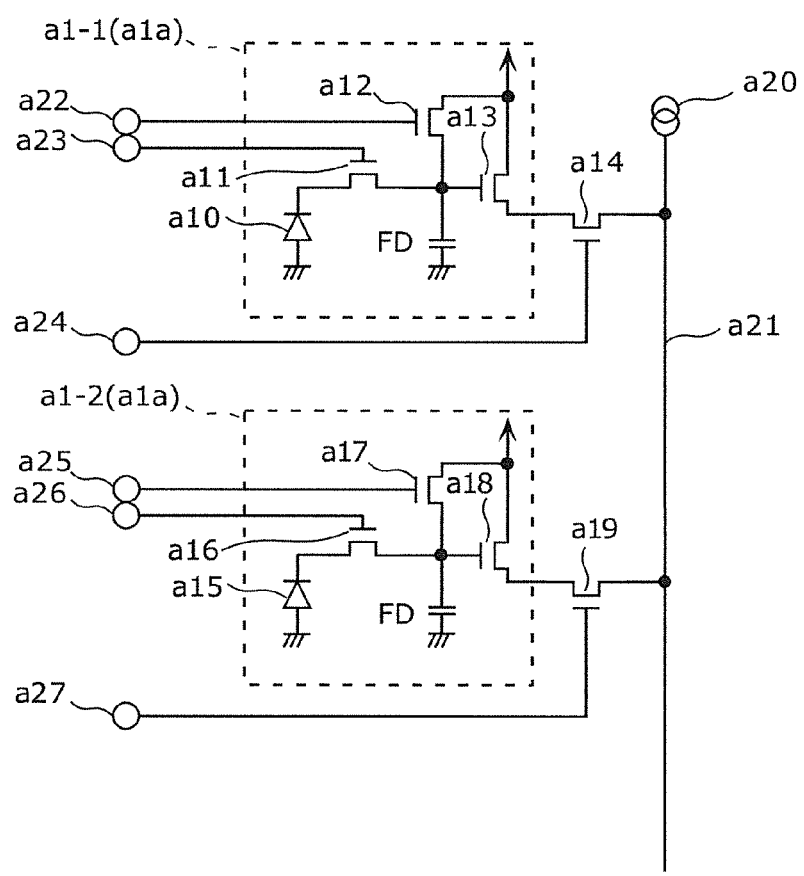
FIG. 11 is a circuit diagram which illustrates pixel circuits for two rows and one column according to Embodiment 2 of the present invention.

FIG. 11 illustrates in detail an example of the pixel circuits a1 for two rows and one column. The broken lines a1-1 and a1-2 denote the pixel unit a1a, and a pixel unit a1-1 (a1a) includes: a photodiode a10; a transfer MOS transistor a11; a reset MOS transistor a12; and an output MOS transistor a13. A pixel unit a1-2 (a1a), as with the pixel unit a1-1 (a1a), includes: a photodiode a15; a transfer MOS transistor a16; a reset MOS transistor a17; and an output MOS transistor a18.

In the pixel unit a1-1 (a1*a*), the anode of the photodiode a10 is grounded and the cathode is connected to the drain of the transfer MOS transistor a11. The source of the transfer MOS transistor a11 is connected to the source of the reset MOS transistor a12 and the gate of the output MOS transistor a13, and the gate of the transfer MOS transistor a11 is connected to a terminal a23. This region defines a diffusion capacitance called a floating diffusion (hereinafter referred to as FD). The drain of the reset MOS transistor a12 is connected to the power supply, and the gate is connected to a terminal a22. The drain of the output MOS transistor a13 is connected to the power supply, and the source is connected to the drain of a row selecting MOS transistor a14. A current supply a20 is connected to the column signal line a21. The gate of the row selecting MOS transistor a14 is connected to a terminal a24, and the output MOS transistor a13 and the current supply a20 form a source follower when in the conducting state.

In the pixel unit a1-2 (a1*a* ), the anode of the photodiode a15 is grounded and the cathode is connected to the drain of the transfer MOS transistor a16. The source of the transfer MOS transistor a16 is connected to the source of the reset MOS transistor a17 and the gate of the output MOS transistor a18, and the gate of the transfer MOS transistor a16 is connected to a terminal a25. This region defines a diffusion capacitance called an FD. The drain of the r MOS transistor a17 is connected to the power supply, and the gate is connected to a terminal a25. The drain of the output MOS transistor a18 is connected to the power supply, and the source is connected to the drain of a row selecting MOS transistor a19. The gate of the row selecting MOS transistor a19 is connected to a terminal a27, and the output MOS transistor a19 and the current supply a20 form a source follower when in the conducting state. The output terminals of the pixel a1-1 (a1*a*) and the pixel a1-2 (a1*a*) are connected to the column signal line a21 via the row selecting MOS transistor a14 and the row selecting MOS transistor a19, respectively. The column signal line a21 provides an input to the first storage circuit a2 illustrated in FIG. 10.

It is to be noted that, although each of the pixel units a1-1 (a1*a*) and a1-2 (a1*a*) includes a corresponding one of the photodiodes a10 and a15 in the solid-state image capturing element according to the present embodiment, the solid-state imaging device according to the present invention is not limited to such a configuration. For example, each of the pixel units may include a plurality of photodiodes and an FD may be shared by the plurality of photodiodes The first storage circuit a2 (the first storage unit) includes: the plurality of storage cells a2*a*; a plurality of output signal lines corresponding to the columns of the pixel units a1*a* in one-to-one relationship; and a current supply transistor which is connected to the output signal lines.

Each of the storage cells a2*a* includes: a depletion mode field-effect transistor of which one of the drain and the source is connected to a power line or a ground line; a write switch transistor which is disposed between a corresponding one of the column signal lines and the gate of the depletion mode field-effect transistor; and a read switch transistor which is disposed between a corresponding one of the output signal lines and the other of the drain and the source of the depletion mode field-effect transistor.

Figure 12:
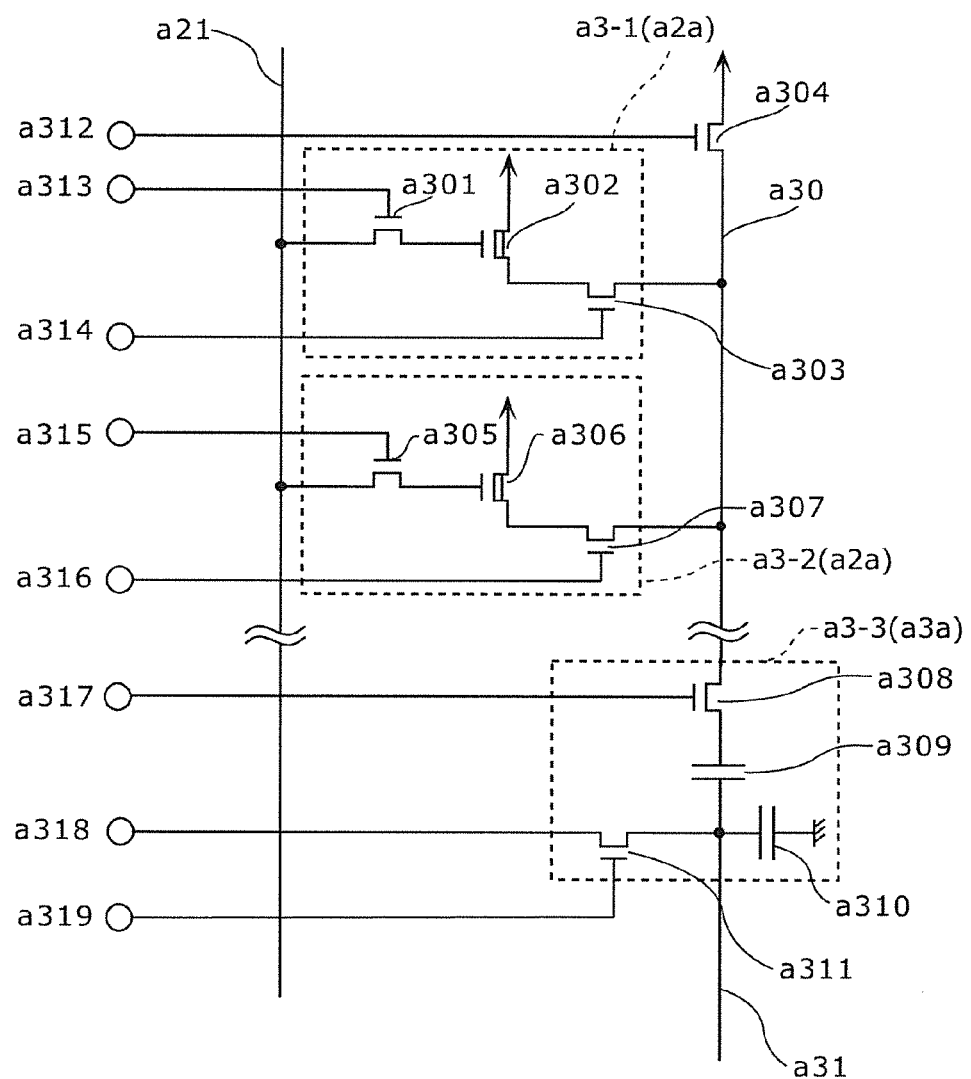
FIG. 12 is a circuit diagram which illustrates storage cells of the first storage circuit for two rows and one column and a unit difference circuit according to Embodiment 2 of the present invention.

FIG. 12 illustrates in detail the storage cells a2*a* for two rows and one column in the first storage circuit a2 and the unit difference circuit a3*a* illustrated in FIG. 10. In FIG. 12, a21 denotes one of the output signal lines connected to the pixels in a corresponding one of the columns illustrated in FIG. 11, and the broken lines a3-1 and a3-2 denote the unit storage circuits (storage cells a2*a*) corresponding to the pixel a1-1 (a1*a*) and the pixel a1-2, respectively, illustrated in FIG. 11. The storage circuit a3-1 (storage cell a2*a*) corresponding to the pixel unit a1-1 includes: a write row selecting MOS transistor a301 which is the write switch transistor; a storage MOS transistor a302 which is the depletion mode field-effect transistor; and a read row selecting MOS transistor a303 which is the read switch transistor, and the source of the read row selecting MOS transistor a303 is connected to an output line a30 which is connected to a current supply MOS transistor a304. The drain of the current supply MOS transistor a304 is connected to the power supply. A bias voltage a312 is applied to the gate of the current supply MOS transistor a304.

The storage MOS transistor a302 and the current supply MOS transistor a304 operate as source follower amplifiers when the read row selecting MOS transistor a303 is on. More specifically, the storage MOS transistor a302 serves as a drive transistor for driving the electric signal (voltage) held in the gate, and the current supply MOS transistor a304 serves as a load (transistor) to the drive transistor. In the same manner as above, the storage MOS transistor a306 and the current supply MOS transistor a304 operate as source follower amplifiers when the read row selecting MOS transistor a307 is on.

As described above, the storage MOS transistor is the depletion mode field-effect transistor, and has the function as a storage cell for holding an analogue signal in the gate capacitance and the function as the source follower amplifier which outputs a voltage according to the analogue signal held in the gate capacitance. According to the above-described configuration, it is possible to simplify the circuit configuration of the first storage unit and to reduce the number of components or wiring resistance, thereby allowing a significant reduction in the power consumption for the entire chip. As a result, it is possible to reduce the amount of heat generation and reduce the dark current In addition, the output line a30 is connected to the unit difference circuit a3-3 (a3*a*) illustrated in FIG. 10. The unit difference circuit a3-3 (a3*a*) includes: a column selecting MOS transistor a308; a sample capacitor a309; a divide capacitor a310; and a bias MOS transistor a311, and the difference output signal is provided to the output line a31. The storage circuit a3-2 (a2*a*) corresponding to the pixel unit a1-2 has the configuration similar to the configuration of the storage circuit a3-1 (a2*a*) corresponding to the pixel unit a1-1, and includes: a write row selecting MOS transistor a305; a storage MOS transistor a306; and a read row selecting MOS transistor a307. The source of the read row selecting MOS transistor a307 is connected to the output line a30 which is connected to the current supply MOS transistor a304, in such a manner that the output line a30 is shared with the output of the storage circuit a3-1. The drain of the storage MOS transistor is connected to the power supply. Here, for the storage MOS transistors a302 and a306, the depletion mode field-effect transistors are used. With such a configuration as described above, it is possible, while saving power, to store a reset signal and a light signal which are provided from the pixel a1-1 and the pixel a1-2 in FIG. 11 in the storage unit a3-1 and the storage unit a3-2 with different timings, and further to output a voltage proportional to the difference between the reset signal and the light signal from each of the storage units to the output line a31, in the difference circuit a3-3 in which an output terminal of each of the storage units is connected via the output line a30.

Figure 13:
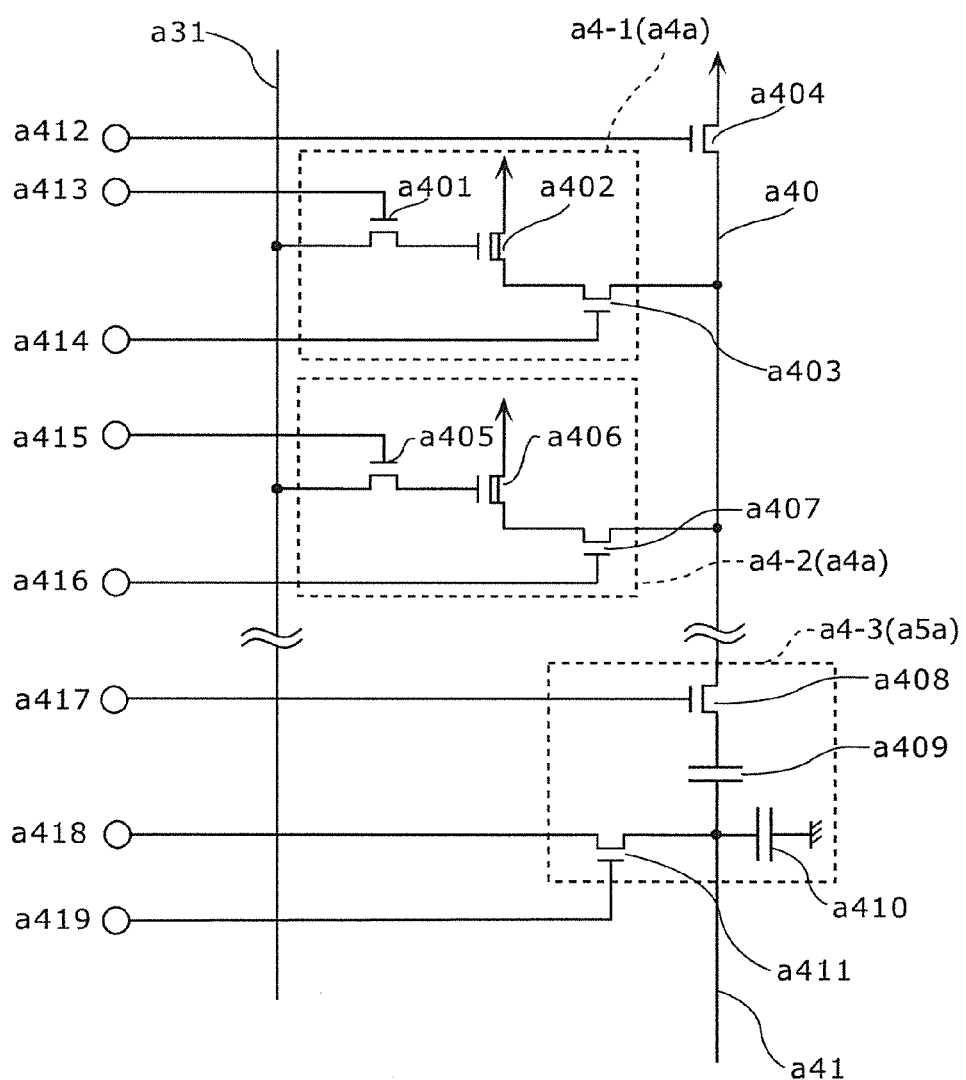
FIG. 13 is a circuit diagram which illustrates storage cells of the second storage circuit for two rows and one column and a unit difference circuit according to Embodiment 2 of the present invention.

FIG. 13 illustrates in detail the storage cells a4*a* for two rows and one column in the second storage circuit a4 and the unit difference circuit a5*a* illustrated in FIG. 10. In FIG. 13, a31 denotes one of the output signal lines connected to a corresponding one of the columns in the storage circuit illustrated in FIG. 12, and the broken lines a4-1 and a4-2 denote the unit storage circuits (storage cells a4a) corresponding to the unit storage circuit a3-1 and the unit storage circuit a3-2, respectively, illustrated in FIG. 12. As illustrated in the diagram, the storage cell a4a may have the same configuration as the configuration of the storage cell a2a. The storage circuit a4-1 (storage cell a4a) corresponding to the pixel unit a1-1 includes: a write row selecting MOS transistor a401; a storage MOS transistor a402; and a read row selecting MOS transistor a403, and the source of the read row selecting MOS transistor a403 is connected to a current supply MOS transistor a404 via the output line a40. The drain of the current supply MOS transistor is connected to the power supply. In addition, the output line a40 is connected to the unit difference circuit a4-3 (a5a). The unit difference circuit a5a includes: a column selecting MOS transistor a408; a sample capacitor a409; a divide capacitor a410; and a bias MOS transistor a411, and the difference output signal is provided to the output line a41. The storage circuit a4-2 corresponding to the pixel unit a1-2 has the configuration similar to the configuration of the storage circuit a4-1 corresponding to the pixel unit a1-1, and includes: a write row selecting MOS transistor a405; a storage MOS transistor a406; and a read row selecting MOS transistor a407. The source of the read row selecting MOS transistor a407 is connected to the output line a40 which is connected to the current supply MOS transistor a404, in such a manner that the output line a40 is shared with the output of the storage circuit a4-1. The drain of the storage MOS transistor is connected to the power supply. Here, for the storage MOS transistors a402 and a406, the depletion mode field-effect transistors are used. With such a configuration as described above, it is possible, while saving power, to store a signal equivalent to the light signal provided from the pixel a1-2 and the pixel a1-2 in FIG. 11 in the storage unit a4-1 and the storage unit a4-2 with different timings, and further to output a voltage proportional to the difference between the reset signal and the light signal from each of the storage units to the output line a41, in the difference circuit a4-3 in which an output terminal of each of the storage units is connected via the output line a40.

Figure 14:
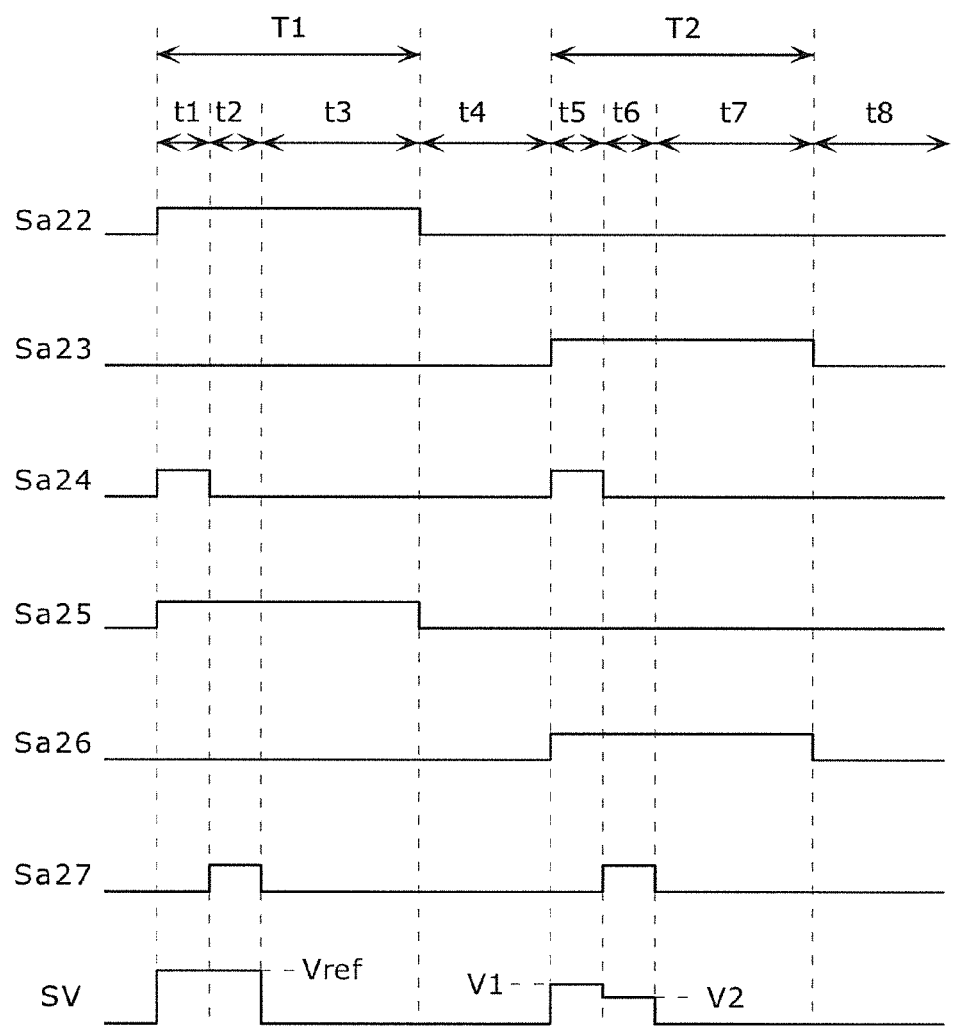
FIG. 14 is a timing chart which illustrates temporal changes in main signals in the solid-state image capturing element according to Embodiment 2 of the present invention.

FIG. 14 is a timing chart which illustrates temporal changes in main signals in the solid-state image capturing element according to Embodiment 2 of the present invention. In FIG. 14, control signals are shown which are applied to the respective terminals in FIG. 11. The control signals are indicated by the denotations of which S is added to the reference numerals of the terminals to which the control signals are applied.

A signal Sa22 is provided from the terminal a22 to the gate of the reset MOS transistor a12.

A signal Sa23 is provided from the terminal a23 to the gate of the transfer MOS transistor a11.

A signal Sa24 is provided from the terminal a24 to the gate of the row selecting MOS transistor a14.

A signal Sa25 is provided from the terminal a25 to the gate of the reset MOS transistor a17.

A signal Sa26 is provided from the terminal a26 to the gate of the transfer MOS transistor a16.

A signal Sa27 is provided from the terminal a27 to the gate of the row selecting MOS transistor a19.

A signal SV indicates an output signal to be provided to the column signal line a21.

An operation performed by the solid-state image capturing element according to Embodiment 2 of the present invention will be described with reference to FIG. 11 and FIG. 14.

During the time period t1 in FIG. 14, the signals Sa22, Sa24, and Sa25 are "HIGH", and the gates of the reset MOS transistors a12 and a17 of each of the pixels in the pixel units are brought into conduction in a "HIGH" state, so that the FD of each of the pixels is connected simultaneously to the power supply to be into an initial state. In addition, the gate of the row selecting transistor a14 is brought into conduction in the "HIGH" state, and an FD potential in the initial state of the pixel unit a1-1 is provided to the column signal line a21 via the source follower including the output MOS transistor a13 and the current supply a20 (the Value Vref of the signal SV in the time period t1 in FIG. 14).

During the time period t2, the signals Sa22, Sa27, and Sa25 are "HIGH", and the gates of the reset MOS transistors a12 and a17 of each of the pixels in the pixel units are brought into conduction in the "HIGH" state, so that the FD of each of the pixels is connected simultaneously to the power supply to maintain the initial state. The gate of the row selecting transistor a19 is brought into conduction in the "HIGH" state, and the FD potential in the initial state of the pixel unit a1-2 is provided to the column signal line a21 via the source follower including the output MOS transistor a18 and the current supply a20 (the Value Vref of the signal SV in the time period t2 in FIG. 14).

During the time period t3, the signals Sa22 and Sa25 stay "HIGH", and the signals Sa24 and Sa27 are "LOW". Although FIG. 14 shows an example of pixels for two rows, it goes without saying that the Value Vref is set to the signal SV even in the time period t3 in practical case of pixels for three or more rows.

During the time period t4, all of the signals are "LOW".

During the time period t5, the signals Sa23, Sa24, and Sa26 are "HIGH", and the gates of the transfer MOS transistors a11 and a16 of each of the pixels in the pixel units are brought into conduction in the "HIGH" state, so that charges accumulated in the photodiodes a10 and a15 of each of the pixels are transferred to the FD. A voltage is generated in the gate of the output MOS transistors a13 and a18 by the transferred charges and the capacitance of the FD. In addition, the gate of the row selecting transistor a14 is brought into conduction in the "HIGH" state, and an FD potential of the pixel unit a1-1 is provided to the column signal line a21 via the source follower including the output MOS transistor a13 and the current supply a20 (the value V1 of the signal SV in the time period t1 in FIG. 14).

During the time period t6, the signals Sa23 and Sa26 stay "HIGH", and a voltage continues to be generated in the gate of the output MOS transistors a13 and a18 by the transferred charges and the capacitance of the FD. The gate of the row selecting transistor a19 is brought into conduction in the "HIGH" state, and the FD potential of the pixel unit a1-2 is provided to the column signal line a21 via the source follower including the output MOS transistor a18 and the current supply a20 (the value V2 of the signal SV in the time period t1 in FIG. 14).

As described above with reference to FIG. 14, the method of driving the pixel circuit includes: the time period T1 in which the reset MOS transistor of each of the pixel units are simultaneously brought into conduction and the pixel signal (Vref) corresponding to the initial state of the FD is outputted; and the time period T2 in which the transfer MOS transistor of each of the pixel units are simultaneously brought into conduction and the pixel signals (V1, V2) corresponding to the charges accumulated in the photodiode are outputted.

Figure 15:
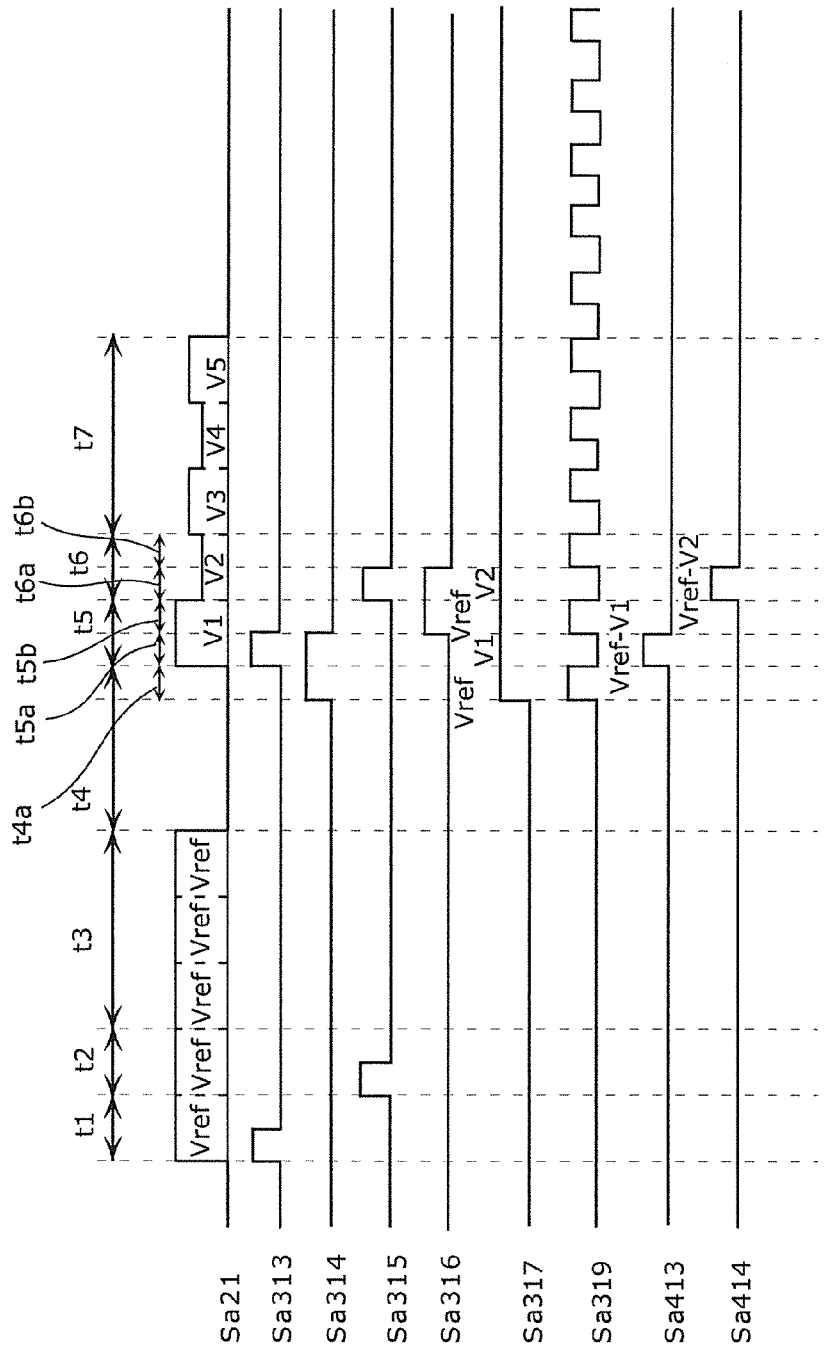
FIG. 15 is a timing chart which illustrates a method of transferring a signal from a pixel unit to a storage circuit according to Embodiment 2 of the present invention.

Next, FIG. 15 illustrates the method of transferring a signal from the pixel unit to the storage circuit according to the present embodiment. In FIG. 15, Sa21 indicates a time-series output signal of the column signal line a21 in FIG. 11, corresponding to the pixel circuit a1-1 and the pixel circuit a1-2. Sa313, Sa314, Sa315, Sa316, Sa317, and Sa319 indicate time-series input signals of the signal lines connected to the terminals a313, a314, a315, a316, a317, and a319, respectively, in FIG. 12. Sa413 and Sa414 indicate time-series input signals of the signal lines connected to the terminals a413 and a414, respectively, in FIG. 13.

Time periods t1 and t2 correspond to the time periods t1 and t2 illustrated in FIG. 14, and an initial state pixel signal is consecutively outputted in order of the pixel units a1-1 and a1-2. Subsequently, in the time period t3, the initial state signals from pixels for a predetermined number of rows are outputted sequentially from the pixel units in the same column. During the time period of outputting an initial state signal of each of the pixels, a write signal for turning ON a write transistor of a corresponding address is inputted for performing the writing on the first storage circuit. For example, during the time period t1 in which the initial state signal of the pixel unit a1-1 is outputted, an ON pulse is transmitted to Sa313 and the write transistor a301 is brought into conduction, so that the initial state signal is written into the gate capacitance of the transistor a302. In the same manner as above, during the time period t2, the ON pulse is transmitted to Sa315 and the write transistor a305 is brought into conduction, so that the initial state signal is written into the gate capacitance of the transistor a306. Here, since the storage MOS transistor is the depletion mode field-effect transistor, it is not necessary to bring the read row selecting MOS transistor a303 into conduction at the time of writing. More specifically, the output line a30 and the storage MOS transistors a302 and a306 are electrically disconnected at the time of writing. Accordingly, power is further saved compared to the case where the storage MOS transistor is not the depletion mode field-effect transistor. In addition, potentials of the source and the drain of the storage MOS transistor are the same at the time of writing. Therefore, power is further saved. In addition, since the holding capacitance does not change at the time of writing, it is possible to stably perform writing. This operation is repeated, and initial state signals of pixels for the predetermined number of rows are stored independently in the first storage circuit before the time period t3 ends.

Next, after the blanking period indicated by t4, an output signal of the pixel unit a1-1 is sequentially provided to the column signal line a21 during the time periods t5a and t5b, followed by an output signal of the pixel unit a1-2 during the time periods t6a and t6b. In the same manner, the output signals are sequentially provided from the pixel in which the initial state signal is stored in the storage circuit during the time period t3. During a light pixel signal period from each of the pixels, the difference between the initial state signal and the light signal is calculated in the subsequent stage, that is, the first difference circuit a3-3, and the difference signal is written into the second storage circuit unit a4-1 (storage cell a4a) which is a further subsequent stage. This operation will be described with reference to the light signal of the pixel unit a1-1. First, in the time period t4a immediately preceding the light pixel signal period t5a, a High pulse is provided to the signal Sa314 to bring the read row selecting MOS transistor a303 into conduction, thereby reading an initial state signal stored in the time period t1 and providing the initial state signal to the output line a30. Here, since the storage MOS transistor a302 is the depletion mode field-effect transistor, the source follower operations accurately even with a small signal. In addition, the High signal is provided to each of the Sa317 and Sa319 in order to bring the transistors a308 and a311 into conduction simultaneously with the start of the time period t4a so that the data is stored in the sample capacitor a309 of the difference circuit a3-3. After that, Sa317 stays in the High state until all of the light signals of the predetermined pixel signals are stored in the storage circuit of a subsequent stage. Meanwhile, Sa319 is disconnected after the storing of the initial state signals to the sample capacitor a309 is ended.

Next, in order to write a pixel signal simultaneously with the start of the time period t5a, a High pulse is provided to the signal Sa313, and the transistor a301 is brought into conduction. Here, the transistors a303 and a308 are kept in the conducting state by the Sa314 and Sa317, respectively, and thus the pixel signal is read as it is by the read row selecting MOS transistor a303 and provided to the difference circuit a3-3. Since Sa139 is set to Low in the difference circuit a3-3, the transistor a311 is already disconnected and the output line a31 is provided with the difference signal of the initial state signal and the pixel signal, which is proportional to the ratio of the sample capacitor a309 to the divide capacitor a310. In addition, during the period t5a, Sa413 is provided with the High signal for bringing the write row selecting MOS transistor a401 of the second storage circuit a4-1, and the difference signal of the initial state signal and the pixel signal is stored in the gate capacitance of the transistor a402. At this time, since the storage MOS transistors a402 and a406 are the depletion modes, it is possible to set the transistor a403 to be in the disconnection state; that is, it is possible to bring Sa414 into the Low level, and thus power consumption of the transistor a402 is reduced. In addition, potentials of the source and the drain of the storage MOS transistor are the same at the time of writing. Therefore, power is further saved. In addition, since the holding capacitance does not change at the time of writing, it is possible to stably perform writing.

After the difference between the initial state signal and the pixel signal which are provided from the pixel unit a1-1 is stored in the storage circuit a4-1 during the time period t5a, the operation of writing a difference signal regarding the pixel unit a1-2 into the storage circuit a4-2 is performed within the time period t6a by the same operation as the operation performed in the time period t5a, and subsequently the difference signal is stored sequentially in the storage unit for the pixels for the predetermined number of rows. As described above, with a series of the pixel signal reading and the storage operation according to the present embodiment, it is possible to perform reading similar to the global shutter operation with which the pixel signals of substantially all of the pixels are read simultaneously, with significantly low power consumption and in the stable signal level having less variation in the capacitance. The method of reading with the global shutter operation is, in general, has an advantageous effect that the shortened accumulation period enables image capturing free from distortion, even when the object moves at high speed.

As described above, in the solid-state image capturing device according to the present embodiment, the storage cell a2a, upon receiving an electric signal from a corresponding one of the column signal lines, turns the write switch transistor temporarily ON in the state where the read switch transistor is OFF, thereby causing the gate capacitance to store the electric signal (t1 and t2 in FIG. 15).

With this configuration, when writing an electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

In addition, the storage cell a2a, upon receiving a reference signal from a corresponding one of the column signal lines, turns the write switch transistor temporarily ON in the state where the read switch transistor is OFF, thereby causing the gate capacitance to store the reference signal (t1 and t2 in FIG. 15).

With this configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

In addition, the storage cell a2a turns the read switch transistor temporarily ON in the state where the write switch transistor is OFF, thereby outputting the reference signal stored in the gate capacitance, from one of the drain and the source of the depletion mode field-effect transistor to the corresponding output signal line (t4a and t5b in FIG. 15).

The storage cell a2a further, upon receiving a pixel signal from a corresponding one of the column signal lines, turns the write switch transistor temporarily ON in the state where the read switch transistor is ON, thereby outputting the pixel signal from one of the drain and the source of the depletion mode field-effect transistor to the corresponding output signal line (t5a and t6a in FIG. 15).

It is to be noted that, the storage cell a2a, upon receiving the pixel signal from a corresponding one of the column signal lines, may turn the write switch transistor temporarily ON in the state where the read switch transistor is OFF, thereby causing the gate capacitance to store the pixel signal. In addition, the storage cell a2a may turn the read switch transistor temporarily ON in the state where the write switch transistor is OFF, thereby outputting the pixel signal stored in the gate capacitance from one of the drain and the source of the depletion mode field-effect transistor to the corresponding output signal line.

It is to be noted that, the number of the storage cells a2a in the first storage circuit a2 may be the same as the number of the pixel units a1a.

When the number of the storage cells a2a is the same as the number of the pixel units a1a, the difference from the first difference circuit may be outputted directly from the output line a6 according to a control by the horizontal scanning circuit a7, and the second storage unit a4 and the second difference circuit a5 may be removed.

In addition, the number of the storage cells a2a may be the number corresponding to at least two rows in the pixel unit a1a. In this case, the number of the storage cells a4a in the second storage circuit a2 is preferably the same as the number of the pixel units a1a, and it is possible to transfer the difference signal from the difference circuit a3 to the second storage circuit a4, by one row at a time, cyclically using the row of the storage cell a2a.

(Embodiment 3)

Figure 16:
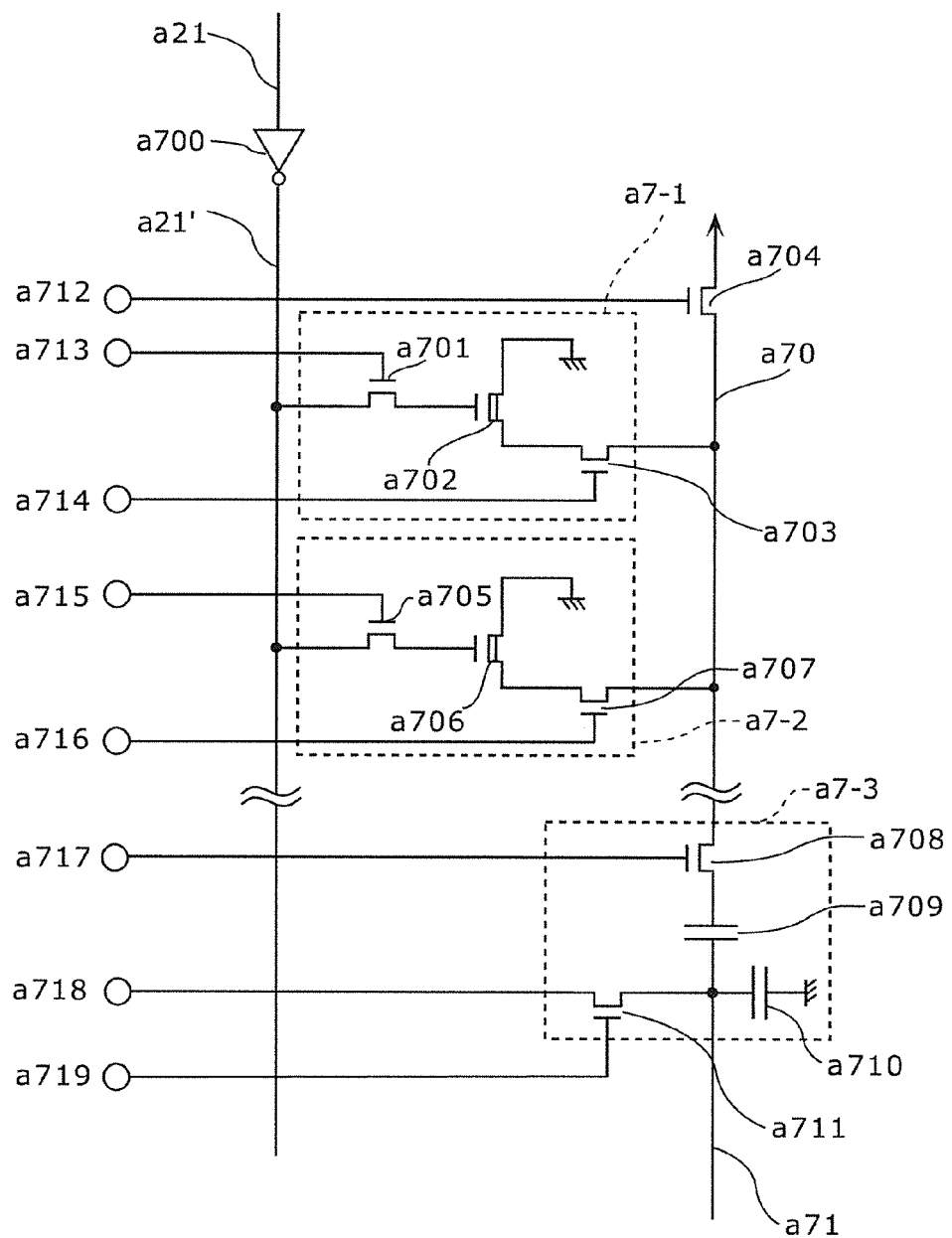
FIG. 16 is a circuit diagram which illustrates storage cells of a first storage circuit for two rows and one column and a unit difference circuit according to Embodiment 3 of the present invention.

The following describes Embodiment 3 according to the present invention, with reference to FIG. 16 and FIG. 10. In the present embodiment, the configuration of the circuit block is the same as the configuration shown in FIG. 10, and the pixel unit circuit is the same as that shown in FIG. 11.

FIG. 16 illustrates in detail the storage cells for two rows and one column in the first storage circuit a2 and the unit difference circuit illustrated in FIG. 10 according to the present embodiment. In FIG. 16, a21 denotes one of the output signal lines connected to the pixels in a corresponding one of the columns in FIG. 11, which is connected to a column signal line a21' via an inverter circuit (inverting amplifier) a700, and connected to the unit storage circuit corresponding to the pixel a1-1 and the pixel a1-2 indicated by broken lines a7-1 and a7-2 in FIG. 11. The storage circuit a7-1 corresponding to the pixel unit a1-1 includes: a write row selecting MOS transistor a701; a storage MOS transistor a702; and a read row selecting MOS transistor a703, and the source of the read row selecting MOS transistor a703 is connected to a current supply MOS transistor a704 via the output line a70. In addition, the output line a70 is connected to a first difference circuit unit a7-3 illustrated as a3 in FIG. 10. The first difference circuit unit includes: a column selecting MOS transistor a708; a sample capacitor a709; a divide capacitor a710; and a bias MOS transistor a711, and the difference output signal is provided to the output line a71. The storage circuit a7-2 corresponding to the pixel unit a1-2 has the configuration similar to the configuration of the storage circuit a7-1 corresponding to the pixel unit a1-1, and includes: a write row selecting MOS transistor a705; a storage MOS transistor a706; and a read row selecting MOS transistor a707. The source of the read row selecting MOS transistor a707 is connected to the output line a70 that is connected to the current supply MOS transistor a704, in such a manner that the output line a70 is shared with the output of the storage circuit a7-1. With such a configuration as described above, it is possible to store a reset signal and a light signal which are provided from the pixel a1-1 and the pixel a1-2 in FIG. 11 in the storage unit a7-1 and the storage unit a7-2 with different timings, and further to output a voltage proportional to the difference between the reset signal and the light signal from each of the storage units to the output line a71, in the difference circuit a7-3 in which an output terminal of each of the storage units is connected via the output line a70. Here, the transistors a701, a702, a703, a704, a705, a706, and a707 are all P channel MOS transistors, and are capable of storing the initial state signal in the High level as a Low level signal. In addition, a larger amount of signals are stored as a higher voltage level.

Figure 17:
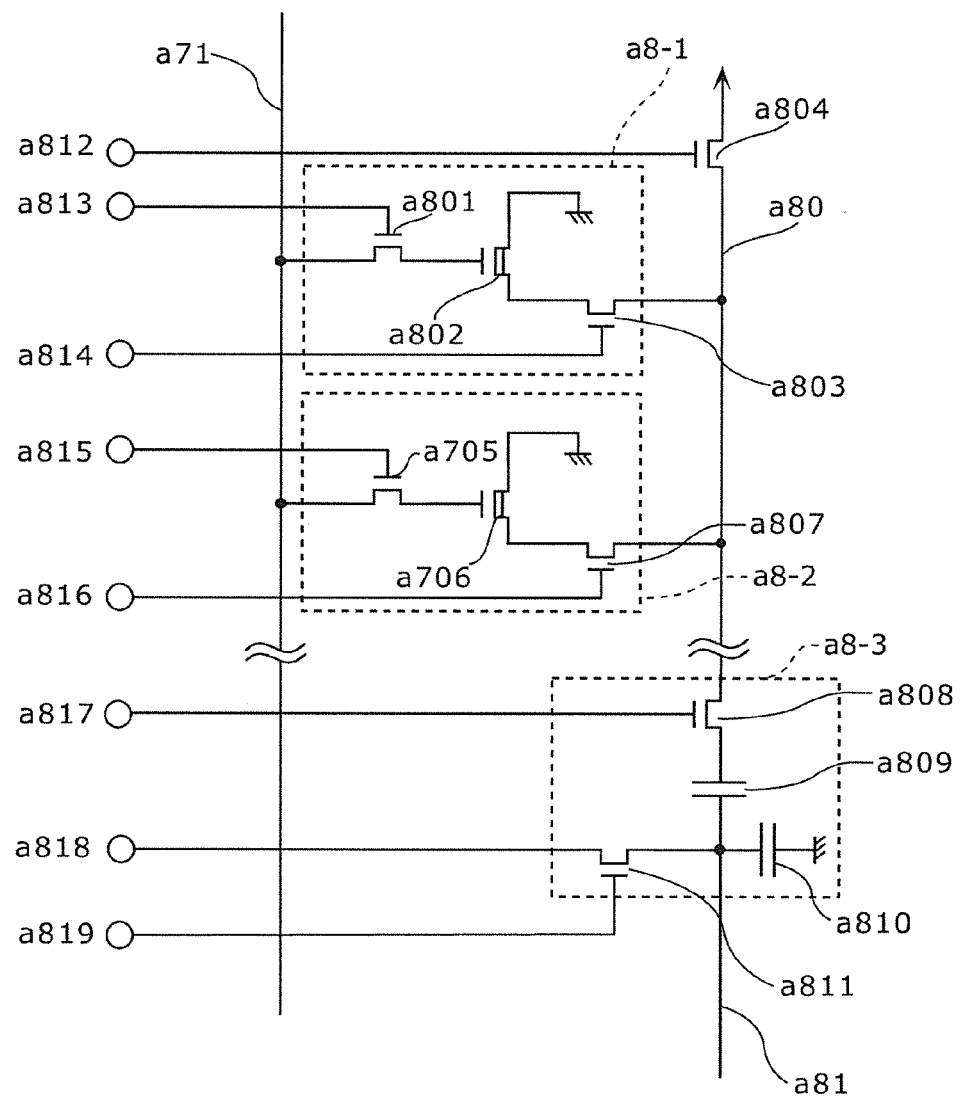
FIG. 17 is a circuit diagram which illustrates storage cells of a second storage circuit for two rows and one column and a unit difference circuit according to Embodiment 3 of the present invention.

FIG. 17 illustrates in detail the storage cells for two rows and one column in the second storage circuit a4 and the unit difference circuit illustrated in FIG. 10 according to the present embodiment. In FIG. 17, a71 denotes one of the output signal lines connected to a corresponding one of the columns in the storage circuit in FIG. 16, and the broken lines a8-1 and a4-2 denote the unit storage circuits corresponding to the unit storage circuit a7-1 and the unit storage circuit a7-2, respectively, illustrated in FIG. 16. The storage circuit a8-1 corresponding to the pixel unit a1-1 includes: a write row selecting MOS transistor a801; a storage MOS transistor a802; and a read row selecting MOS transistor a803, and the source of the read row selecting MOS transistor a803 is connected to a current supply MOS transistor a804 via the output line a80. In addition, the output line a80 is connected to a second difference circuit unit a8-3 illustrated as a5 in FIG. 10. The second difference circuit unit a8-3 includes: a column selecting MOS transistor a808; a sample capacitor a809; a divide capacitor a810; and a bias MOS transistor a811, and the difference output signal is provided to the output line a81. The storage circuit a8-2 corresponding to the pixel unit a1-2 has the configuration similar to the configuration of the storage circuit a8-1 corresponding to the pixel unit a1-1, and includes: a write row selecting MOS transistor a805; a storage MOS transistor a806; and a read row selecting MOS transistor a807. The source of the read row selecting MOS transistor a807 is connected to the output line a80 that is connected to the current supply MOS transistor a804, in such a manner that the output line a80 is shared with the output of the storage circuit a8-1. With such a configuration as described above, it is possible to store a signal corresponding to a light signal provided from the pixel a1-1 and the pixel a1-2 in FIG. 11, into the storage unit a8-1 and the storage unit a8-2 with different timings, and further to output a voltage proportional to the difference between a reset signal and the light signal from each of the storage units to the output line a81, in the difference circuit a8-3 in which an output terminal of each of the storage units is connected via the output line a81.

A timing chart which illustrates temporal changes in main signals regarding the pixel unit in the solid-state image capturing element according to Embodiment 3 of the present invention is similar to the timing chart illustrated in FIG. 14.

Figure 18:
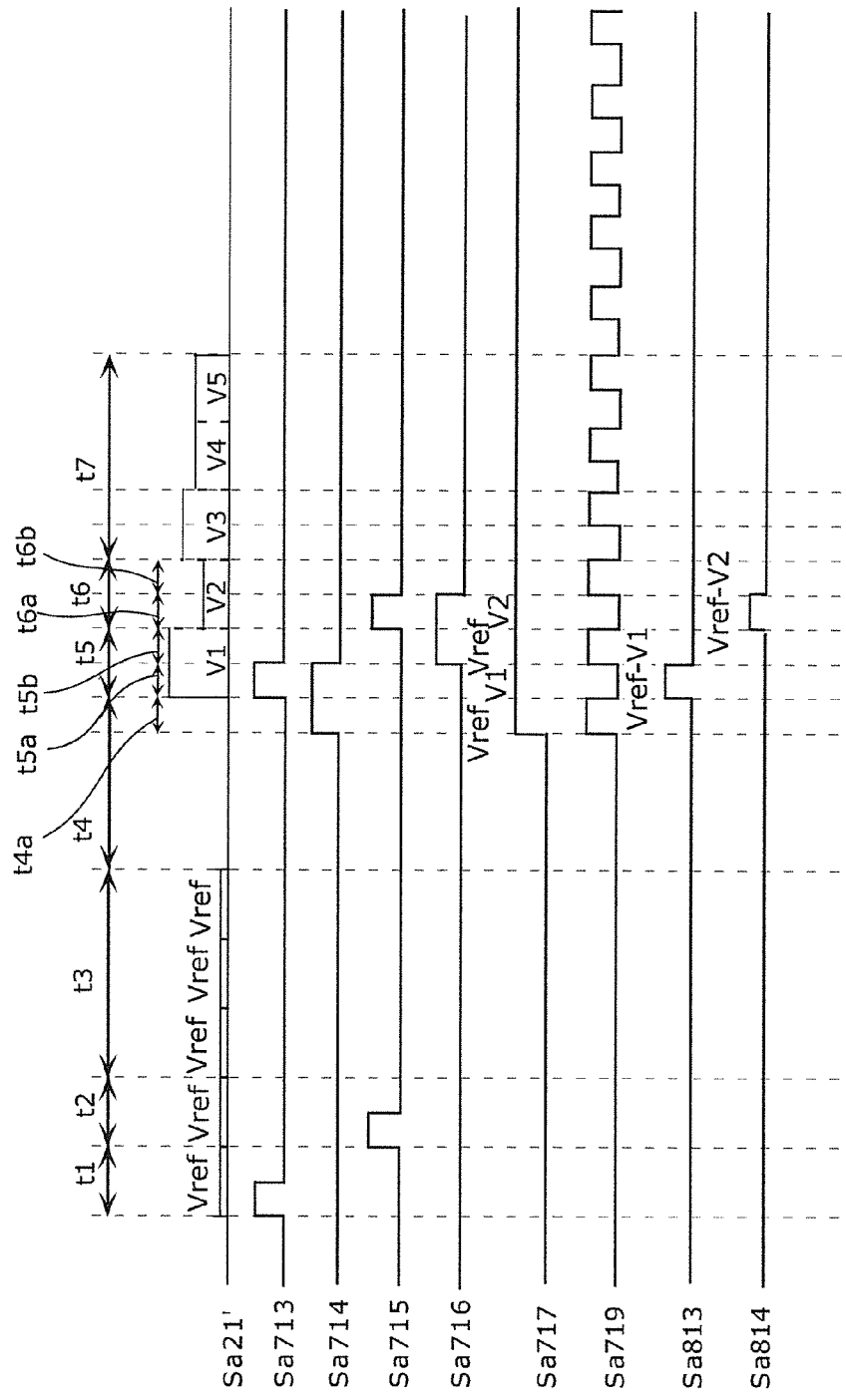
FIG. 18 is a timing chart which illustrates a method of transferring a signal from a pixel unit to a storage circuit according to Embodiment 3 of the present invention.

Next, FIG. 18 illustrates the method of transferring a signal from the pixel unit to the storage circuit according to the present embodiment. In FIG. 18, Sa21' indicates a time-series output signal of the column signal line 21' in FIG. 16, corresponding to the pixel circuit a1-1 and the pixel circuit a1-2. Sa713, Sa714, Sa715, Sa716, Sa717, and Sa719 denote time-series input signals of the signal lines connected to the terminals a713, a714, a715, a716, a717, and a719, respectively, in FIG. 12. Sa813 and Sa814 denote time-series input signals of the signal lines connected to the terminals a813 and a814, respectively, in FIG. 17.

Time periods t1 and t2 correspond to the time periods t1 and t2 illustrated in FIG. 14, and an initial state pixel signal is consecutively outputted in order of the pixel units a1-1 and a1-2. Subsequently, in the time period t3, the initial state signals from pixels for a predetermined number of rows are outputted sequentially from the pixel units in the same column. During the time period of outputting the initial state signal of each of the pixels, a write signal for turning ON a write transistor of a corresponding address is inputted for performing the writing on the first storage circuit. For example, during the time period t1 in which the initial state signal of the pixel unit a1-1 is outputted, an ON pulse is transmitted to Sa713 and the write transistor a701 is brought into conduction, so that the initial state signal is written into the gate capacitance of the transistor a702. In the same manner as above, during the time period t2, the ON pulse is transmitted to Sa715 and the write transistor a705 is brought into conduction, so that the initial state signal is written into the gate capacitance of the transistor a706. This operation is repeated, and the initial state signal of each of the pixels for the predetermined number of rows is stored independently in the first storage circuit before the time period t3 ends.

Next, after the blanking period indicated by t4, an output signal of the pixel unit a1-1 is sequentially provided to the column signal line a21 during the time periods t5a and t5b, followed by an output signal of the pixel unit a1-2 during the time periods t6a and t6b. In the same manner, the output signals are sequentially provided from the pixels of which the initial state signals are stored in the storage circuit during the time period t3. During a period of a light pixel signal from each of the pixels, the difference between the initial state signal and the light signal is calculated in the subsequent stage, that is, the first difference circuit a7-3, and the difference signal is written into the second storage circuit unit a8-1 which is a further subsequent stage. This operation will be described with reference to the light signal of the pixel unit a1-1. First, in the time period t4a immediately preceding the light pixel signal period t5a, a High pulse is provided to the signal Sa814 to bring the read row selecting MOS transistor a703 into conduction, thereby reading an initial state signal stored in the time period t1 and providing the initial state signal to the output line a70. In addition, the High signal is provided to each of the Sa717 and Sa719 in order to bring the transistors a708 and a711 into conduction simultaneously with the start of the time period t4a so that the data is stored in the sample capacitor a709 of the difference circuit a7-3. After that, Sa717 stays in the High state until all of the light signals of the predetermined pixel signals are stored in the storage circuit in a subsequent stage. Meanwhile, Sa719 is disconnected after the storing of the initial state signals to the sample capacitor a709 is ended. Next, in order to write a pixel signal simultaneously with the start of the time period t5a, a High pulse is provided to the signal Sa713 and the transistor a701 is brought into conduction. Here, the transistors a703 and a708 are kept in the conducting state by Sa714 and Sa717, respectively, and thus the pixel signal is read as it is by the read row selecting MOS transistor a703 and provided to the difference circuit a7-3. Since Sa718 is set to Low in the difference circuit a7-3, the transistor a711 is already disconnected and the output line a71 is provided with the difference signal of the initial state signal and the pixel signal, which is proportional to the ratio of the capacitor a709 to the capacitor a710. In addition, during the period t5a, Sa813 is provided with the High signal for bringing the write row selecting MOS transistor a801 of the second storage circuit a8-1, and the difference signal of the initial state signal and the pixel signal is stored in the gate capacitance of the transistor a802. At this time, the transistor a803 is set to be in the disconnection state; that is, Sa814 is set to be in the Low level, and thus power consumption of the transistor a802 is reduced.

After the difference between the initial state signal and the pixel signal which are provided from the pixel unit a1-1 is stored in the storage circuit a8-1 during the time period t5a, the operation of writing a difference signal regarding the pixel unit a1-2 into the storage circuit a8-2 is performed within the time period t6a by the same operation as the operation performed in the time period t5a, and subsequently the difference signal is stored sequentially in the storage unit for the pixels for the predetermined number of rows.

As described above, with a series of the pixel signal reading and the storage operation according to the present embodiment, it is possible to perform reading similar to the global shutter operation with which the pixel signals of substantially all of the pixels are read simultaneously, with significantly low power consumption and in the stable signal level having less variation in the capacitance. In addition, since a high voltage state of the pixel output is changed to a low voltage state in a storage operation according to the present embodiment, it is possible to reduce the applied voltage during the storage period and further reduce the power consumption.

As described above, the solid-state image capturing device according each of Embodiments 2 and 3, in order to achieve the above-described second object, includes: a plurality of pixel units which are arranged in rows and columns and output electric signals according to the amount of received light; column signal lines each of which is provided to a corresponding one of columns of the plurality of pixel units; and the first storage unit having a plurality of storage cells which are arranged in rows and columns and which store electric signals transmitted from the column signal lines. Each of the storage cells has a depletion mode field-effect transistor and stores the electric signals transmitted from the column signal lines into a gate capacitance of the depletion mode field-effect transistor.

With this configuration, the electric signals are stored in the gate capacitance with less variation with respect to the variation of the gate voltage at the time of writing and reading, and thus it is possible to lower the power consumption and reduce a dark current.

Here, the first storage unit may include: the storage cells; output signal lines corresponding to the columns of the pixel units; and current supply transistors connected to the output signal lines, and each of the storage cells may include: the depletion mode field-effect transistor of which one of the drain and the source is connected to a power line or a ground line; a write switch transistor which is disposed between a corresponding one of the column signal lines and the gate of the depletion mode field-effect transistor; and a read switch transistor which is disposed between a corresponding one of the output signal lines and the other of the drain and the source of the depletion mode field-effect transistor.

According to this configuration, the depletion mode field-effect transistor has the function as a storage cell for holding an analogue signal in the gate capacitance and the function as the source follower amplifier which outputs a voltage according to the analogue signal held in the gate capacitance, and thus it is possible to simplify the circuit configuration of the first storage unit, reduce the number of components and wiring resistance, and significantly reduce the power consumption for the entire chip. As a result, it is possible to reduce the amount of heat generation and reduce the dark current.

Here, the storage cell may, when the electric signal is transmitted from a corresponding one of the column signal lines, cause the gate capacitance to store the electric signal by turning the write switch transistor temporarily ON in the state where the read switch transistor is OFF.

According to this configuration, when writing an electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

Here, the electric signal may include a reference signal which indicates a reference voltage provided from the pixel unit in the reset state and a pixel signal according to the amount of received light, and the storage cell, when the reference signal is transmitted from a corresponding one of the column signal lines, may cause the gate capacitance to store the reference signal by temporarily turning ON the write switch transistor in the state where the read switch transistor is OFF.

According to this configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

Here, the storage cell may further output the reference signal stored in the gate capacitance to a corresponding one of the output signal lines, from the other of the drain and the source of the depletion mode field-effect transistor, by temporarily turning the read switch transistor ON in the state where the write switch transistor is OFF.

Here, the storage cell, when the pixel signals is transmitted from a corresponding one of the column signal lines, may output the pixel signal from the other of the drain and the source of the depletion mode field-effect transistor, to the corresponding one of the output signal lines, by turning the write switch transistor temporarily ON in the state where the read switch transistor is OFF.

Here, the electric signal may include a reference signal which indicates a reference voltage and a pixel signal according to the amount of received light, and the storage cell, when the pixel signal is transmitted from a corresponding one of the column signal lines, may cause the gate capacitance to store the pixel signal, by temporarily turning ON the write switch transistor in the state where the read switch transistor is OFF.

Here, the storage cell may further output the pixel signal stored in the gate capacitance to a corresponding one of the output signal lines, from the other of the drain and the source of the depletion mode field-effect transistor, by temporarily turning the read switch transistor ON in the state where the write switch transistor is OFF.

In addition, the method of driving the solid-state image capturing device according to an embodiment of the present invention includes: outputting the electric signals from the pixel units to the column signal lines; and causing the gate capacitance to store the electric signals by temporarily turning ON the write switch transistor in the state where the read switch transistor is OFF.

(Embodiment 4)

Figure 19:
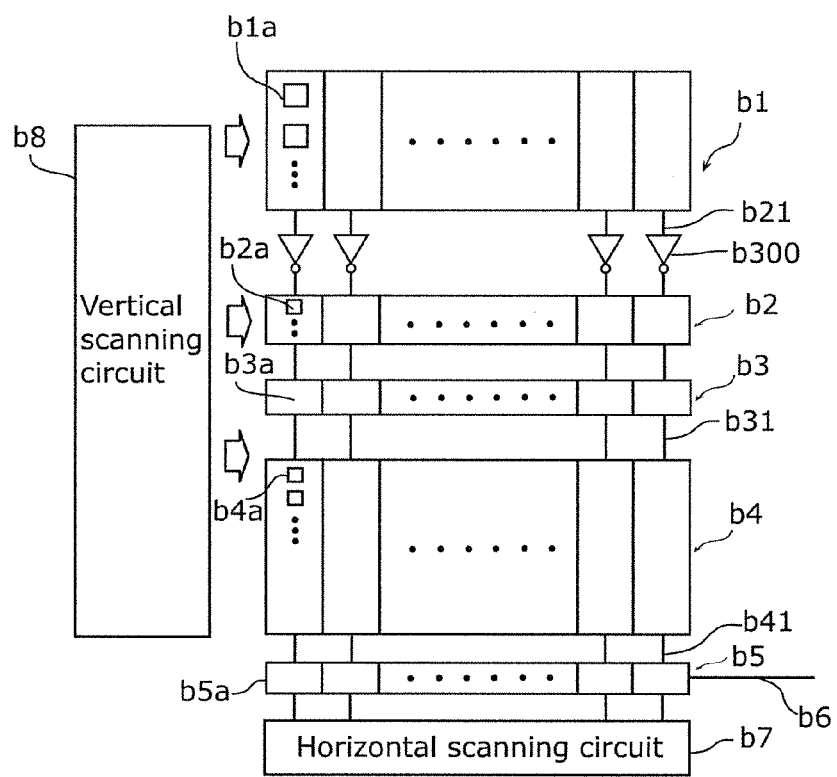
FIG. 19 is a block diagram which illustrates a configuration of a solid-state image capturing element according to Embodiment 4 of the present invention.

FIG. 19 is a block diagram which illustrates a configuration of a solid-state image capturing element according to the present embodiment.

The solid-state image capturing element illustrated in FIG. 19 includes: a pixel circuit b1; an inverting amplifier (inverter) b300; a first storage circuit b2; a first difference circuit b3; a second storage circuit b4; a second difference circuit b5; an output line b6; a horizontal scanning circuit b7; a vertical scanning circuit b8; and a column signal line b21.

The pixel circuit b1 includes a plurality of pixel units b1a which are arranged in rows and columns and output electric signals according to the amount of received light. Each of the pixel units b1a outputs a reference signal and a pixel signal as the above-described electric signals. The reference signal is a signal indicating a reference voltage provided from the pixel unit b1a in a reset state, which is substantially in the level of a power supply voltage. The pixel signal is a signal in a voltage level according to the amount of received light.

The column signal line b21 is provided for each of the columns of the plurality of pixel units b1a.

The inverting amplifier b300 is provided for each of the column signal lines b21, inverts the polarity of an electric signal provided from a corresponding one of the column signal lines b21, and outputs an inverted electric signal. The inverted electric signal includes two types of signals; that is, an inverted reference signal and an inverted pixel signal.

The first storage circuit b2 includes a plurality of storage cells b2a which are arranged in rows and columns and store the inverted electric signals provided from the inverting amplifiers b300. Each of the storage cells b2a includes a depletion mode field-effect transistor to store the inverted electric signal into a gate capacitance of the depletion mode field-effect transistor. The first storage circuit b2 stores both of the inverted reference signal and the inverted pixel signal, or only the inverted reference signal. At this time, an electric signal with a higher voltage is more likely to be written into the storage cell b2a with a low voltage. Since leak of the storage cell b2a is proportional to an electric field intensity, writing with a lower voltage causes less leak and less deterioration in signals. Noise in images is more noticeable where the luminance is lower, and thus it is possible, with an image in which the electric signal is higher where the luminance is lower, to obtain a better image with less variation noise, by reducing the deterioration in signals due to the leak current in a portion with the low luminance.

The first difference circuit b3 includes a unit difference circuit b3a provided for each of the columns. Each of the unit difference circuit b3a outputs the difference between the inverted reference signal and the inverted pixel signal which are stored in the first storage circuit b2, or the difference between the inverted reference signal stored in the first storage circuit b2 and the inverted pixel signal provided from the pixel circuit b1. The second storage circuit b4 stores the difference provided from the first difference circuit b3. The second difference circuit b5 includes a unit difference circuit b5a provided for each of the columns. Each of the unit difference circuits b5a calculates the difference between the difference stored in the storage circuit b4 and the reference voltage, and provides the resulting difference to the output line b6 in synchronization with the output of the horizontal scanning circuit b7. The vertical scanning circuit b8 applies a pulse to the pixel circuit b1, the first storage circuit b2, and the second storage circuit b4.

Figure 20:
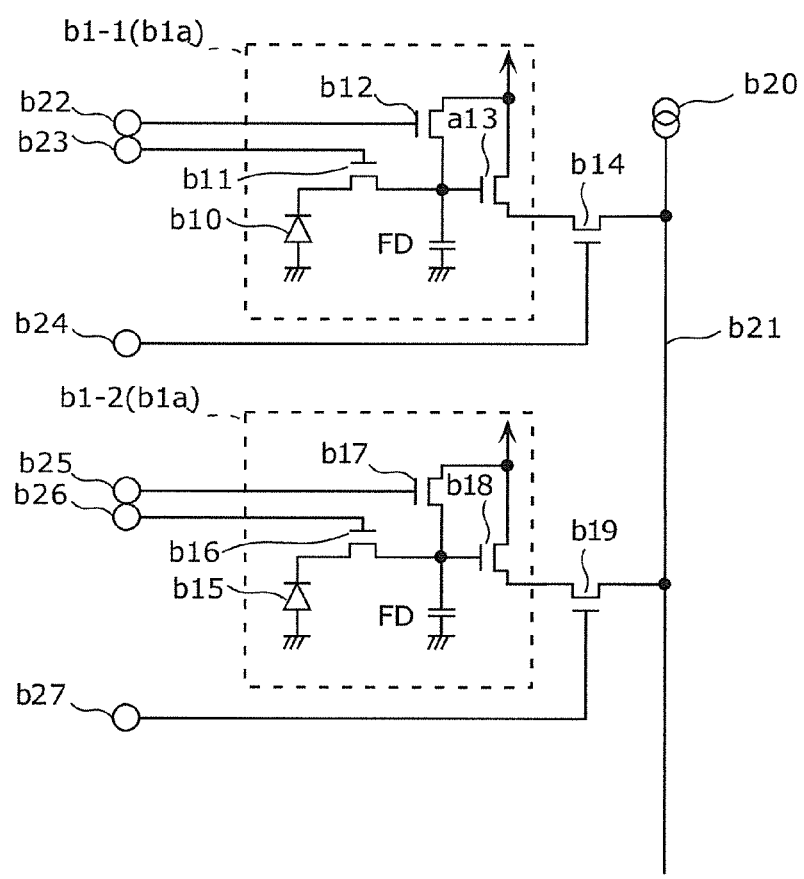
FIG. 20 is a circuit diagram which illustrates pixel circuits for two rows and one column according to Embodiment 4 of the present invention.

FIG. 20 illustrates in detail an example of two rows and one column in the pixel circuit b1. The pixel units b1a are shown by broken lines b1-1 and b1-2 in FIG. 20. The pixel unit b1-1 (b1a) includes: a photodiode b10; a transfer MOS transistor b11; a reset MOS transistor b12; and an output MOS transistor b13. The pixel unit b1-2 (b1a), as with the pixel unit b1-1 (b1a) includes: a photodiode b15; a transfer MOS transistor b16; a reset MOS transistor b17; and an output MOS transistor b18.

The anode of the photodiode b10 is grounded and the cathode is connected to the drain of the transfer MOS transistor 11 in the pixel unit b1-1 (b1a). The source of the transfer MOS transistor b11 is connected to the source of the reset MOS transistor b12 and the gate of the output MOS transistor b13, and the gate of the transfer MOS transistor b11 is connected to a terminal b23. This region defines a diffusion capacitance called a floating diffusion (hereinafter referred to as FD). The drain of the reset MOS transistor b12 is connected to a power supply, and the gate is connected to a terminal b22. The drain of the output MOS transistor b13 is connected to the power supply, and the source is connected to the drain of a row selecting MOS transistor b14. A current supply b20 is connected to a column signal line b21. The gate of the row selecting MOS transistor b14 is connected to a terminal b24, and the output MOS transistor b13 and the current supply b20 form a source follower when in the conducting state.

Likewise in the pixel unit b1-2 (b1a), the anode of the photodiode b15 is grounded and the cathode is connected to the drain of the transfer MOS transistor b16. The source of the transfer MOS transistor b16 is connected to the source of the reset MOS transistor b17 and the gate of the output MOS transistor b18, and the gate of the transfer MOS transistor b16 is connected to a terminal b25. This region defines a diffusion capacitance called an FD. The drain of the reset MOS transistor b17 is connected to a power supply, and the gate is connected to a terminal b25. The drain of the output MOS transistor b18 is connected to the power supply, and the source is connected to the drain of a row selecting MOS transistor b19. The gate of the row selecting MOS transistor b19 is connected to a terminal b27, and the output MOS transistor b19 and the current supply b20 form a source follower when in the conducting state. The output terminals of the pixel unit b1-1 (b1a) and the pixel unit b1-2 (b1a) are connected to the column signal line b21 via the row selecting MOS transistor b14 and the row selecting MOS transistor b19, respectively. The column signal line a21 provides an input to the first storage circuit b2 illustrated in FIG. 19.

The first storage circuit b2 (the first storage unit) includes: a plurality of storage cells b2a; a plurality of output signal lines corresponding to the columns of the pixel units b1a in one-to-one relationship; and a current supply transistor which is connected to the output signal lines.

Each of the storage cells b2a includes: a depletion mode field-effect transistor of which one of the drain and the source is connected to the power line or a ground line; a write switch transistor which is disposed between the output terminal of a corresponding one of the inverting amplifiers and the gate of the depletion mode field-effect transistor; and a read switch transistor which is disposed between a corresponding one of the output signal lines and the other of the drain and the source of the depletion mode field-effect transistor.

Figure 21:
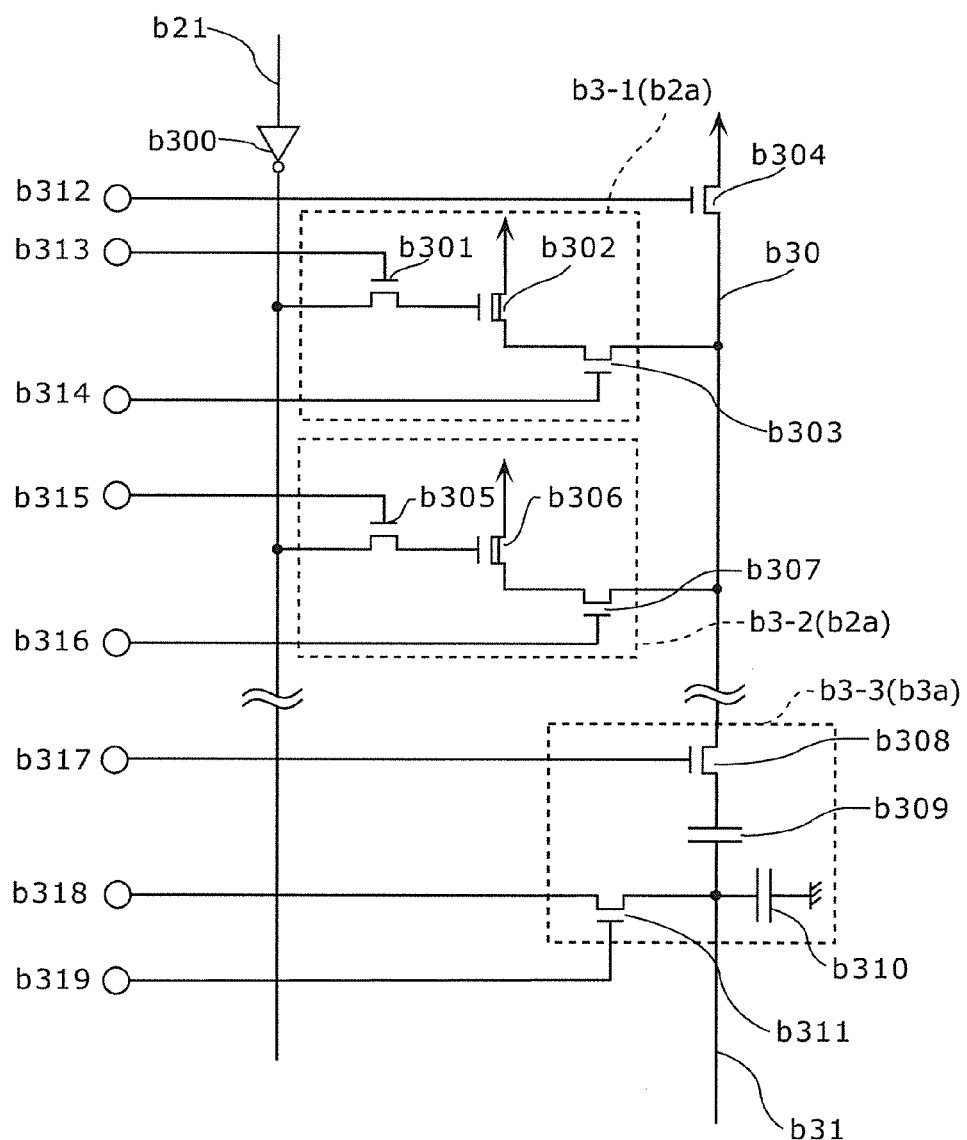
FIG. 21 is a circuit diagram which illustrates storage cells of a first storage circuit for two rows and one column and a unit difference circuit according to Embodiment 4 of the present invention.

FIG. 21 illustrates in detail the storage cells b2a for two rows and one column in the first storage circuit b2 and the unit difference circuit b3a illustrated in FIG. 19. In FIG. 21, b21 denotes one of the output signal lines connected to the pixels in a corresponding one of the columns illustrated in FIG. 20, and broken lines b3-1 and b3-2 denote the unit storage circuits (storage cells b2a) corresponding to the pixel b1-1 and the pixel b1-2, respectively, illustrated in FIG. 20. The storage circuit b3-1 (storage cell a2a) corresponding to the pixel unit b1-1 includes: a write row selecting MOS transistor b301 which is the write switch transistor; a storage MOS transistor b302 which is the depletion mode field-effect transistor; and a read row selecting MOS transistor b303 which is the read switch transistor. The source of the read row selecting MOS transistor b303 is connected to the output line b30 that is connected to a current supply MOS transistor b304. The drain of the current supply MOS transistor b304 is connected to the power supply. A bias voltage b312 is applied to the gate of the current supply MOS transistor b304.

The storage MOS transistor b302 and the current supply MOS transistor b304 operate as source follower amplifiers when the read row selecting MOS transistor b303 is ON. More specifically, the storage MOS transistor b302 serves as a drive transistor for driving the electric signal (voltage) held in the gate, and the current supply MOS transistor b304 serves as a load (transistor) to the drive transistor. In the same manner as above, the storage MOS transistor b306 and the current supply MOS transistor b304 operate as source follower amplifiers when the read row selecting MOS transistor b307 is ON.

As described above, the storage MOS transistor is the depletion mode field-effect transistor, and has the function as a storage cell for holding an analogue signal in the gate capacitance and the function as the source follower amplifier which outputs a voltage according to the analogue signal held in the gate capacitance. According to the above-described configuration, it is possible to simplify the circuit configuration of the first storage unit and to reduce the number of components or wiring resistance, thereby allowing a significant reduction in the power consumption for the entire chip. As a result, it is possible to reduce the amount of heat generation and reduce the dark current.

In addition, the output line b30 is connected to a first difference circuit unit b3-3 illustrated as b3 in FIG. 19. The first difference circuit unit includes: a column selecting MOS transistor b308; a sample capacitor b309; a divide capacitor b310; and a bias MOS transistor b311, and the difference output signal is provided to the output line b31. The storage circuit b3-2 that corresponds to the pixel unit b1-2 has a similar configuration to the configuration of the storage circuit b3-1 that corresponds to the pixel unit b1-1, and includes: a write row selecting MOS transistor b305; a storage MOS transistor b306; and a read row selecting MOS transistor b307. The source of the read row selecting MOS transistor b307 is connected to the output line b30 that is connected to the current supply MOS transistor b304 in such a manner that the output line b30 is shared with the output of the storage circuit b1-1. With such a configuration as described above, it is possible to store a reset signal and a light signal which are provided from the pixel b1-1 and the pixel b1-2 illustrated in FIG. 20, into the storage unit b3-1 and the storage unit b3-2 with different timings, and further to output a voltage proportional to the difference between the reset signal and the light signal which are provided from each of the storage units to the output line b31, in the difference circuit b3-3 in which an output terminal of each of the storage units is connected via the output line b30.

Figure 22:
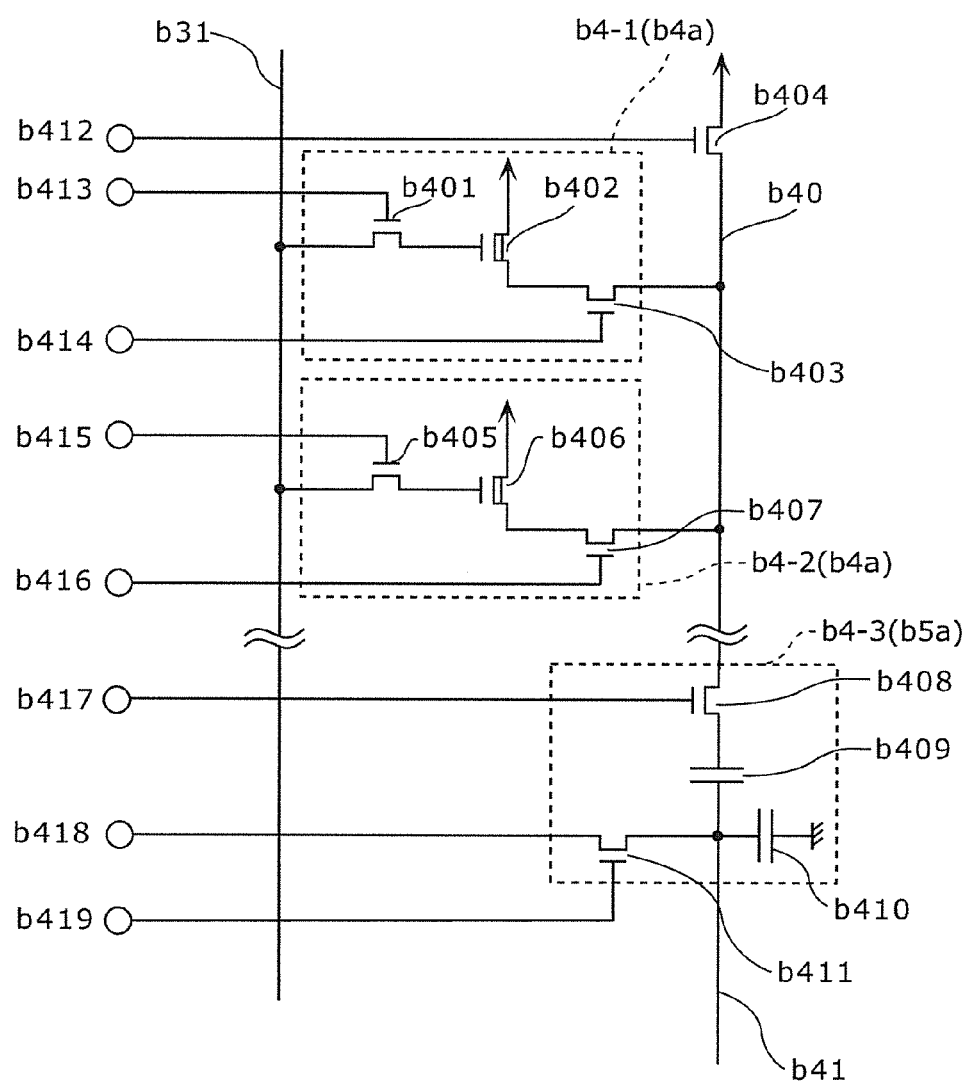
FIG. 22 is a circuit diagram which illustrates storage cells of a second storage circuit for two rows and one column and a unit difference circuit according to Embodiment 4 of the present invention.

FIG. 22 illustrates in detail storage cells b4a for two rows and one column in the second storage circuit b4 and the unit difference circuit b5a illustrated in FIG. 19. In FIG. 22, b31 denotes one of the output signal lines connected to a corresponding one of the columns in the storage circuit illustrated in FIG. 21, and broken lines b4-1 and b4-2 denote the unit storage circuits (that is, storage cells b4a) corresponding to a unit storage circuit b3-1 and a unit storage circuit b3-2, respectively, illustrated in FIG. 21. As illustrated in the diagram, the storage cell b4a may have the same configuration as the configuration of the storage cell b2a. The storage circuit b4-1 (storage cell b4a) corresponding to the pixel unit b1-1 includes: a write row selecting MOS transistor b401; a storage MOS transistor b402; and a read row selecting MOS transistor b403. The source of the read row selecting MOS transistor b403 is connected to a current supply MOS transistor b404 via the output line b40. The drain of the current supply MOS transistor is connected to the power supply. In addition, the output line b40 is connected to the unit difference circuit b4-3 (b5a). The unit difference circuit b5a includes: a column selecting MOS transistor b408; a sample capacitor b409; a divide capacitor b410; and a bias MOS transistor b411, and the difference output signal is provided to the output line b41. The storage circuit b4-2 that corresponds to the pixel unit b1-2 has a similar configuration to the configuration of the storage circuit b4-1 that corresponds to the pixel unit b1-1, and includes: a write row selecting MOS transistor b405; a storage MOS transistor b406; and a read row selecting MOS transistor b407. The source of the read row selecting MOS transistor b407 is connected to the output line b40 that is connected to the current supply MOS transistor b404 in such a manner that the output line b40 is shared with the output of the storage circuit b4-1. With such a configuration as described above, it is possible to store signals equivalent to the light signals which are provided from the pixel b1-1 and the pixel b1-2 illustrated in FIG. 20, into the storage unit b4-1 and the storage unit b4-2 with different timings, and further to output a voltage proportional to the difference between the reset signal and the light signal from each of the storage units to the output line b41, in the difference circuit b4-3 in which an output terminal of each of the storage units is connected via the output line b40.

Figure 23:
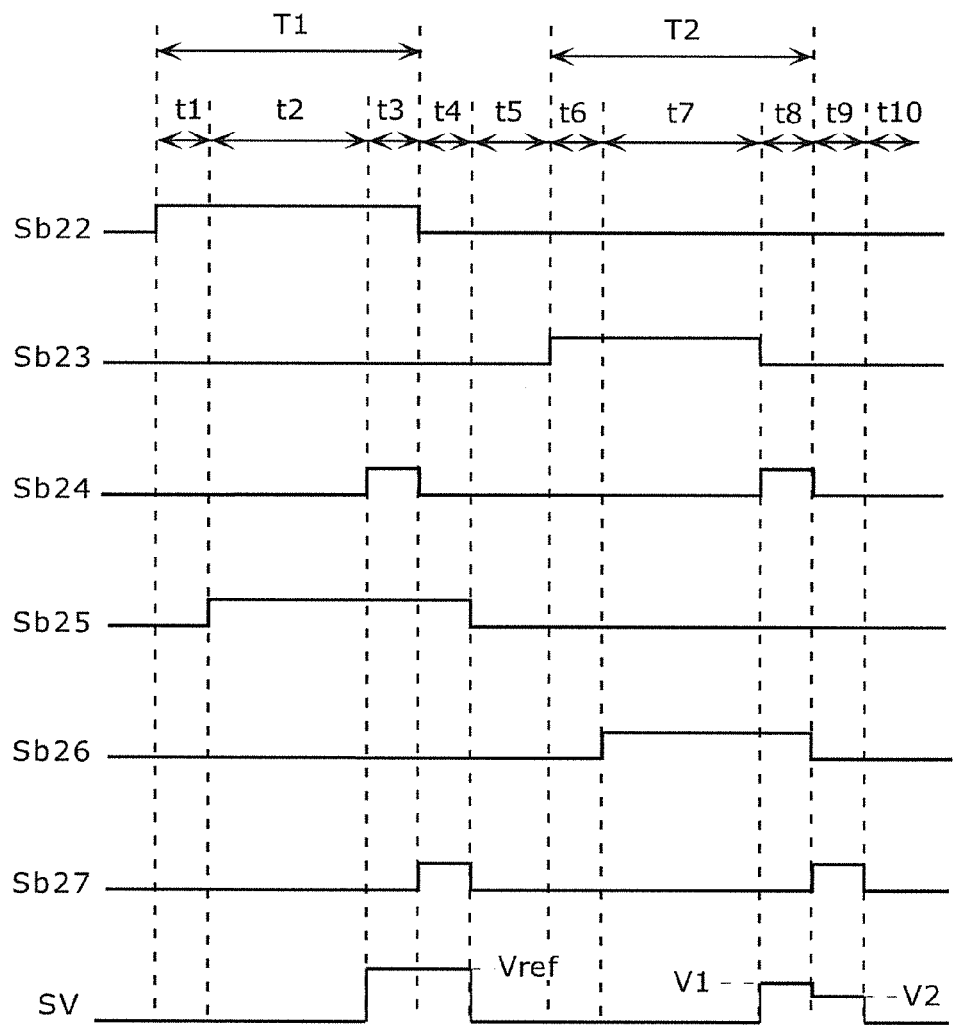
FIG. 23 is a timing chart which illustrates temporal changes in main signals in the solid-state image capturing element according to Embodiment 4 of the present invention.

FIG. 23 is a timing chart which illustrates temporal changes in main signals in the solid-state image capturing element according to Embodiment 4 of the present invention. In FIG. 23, control signals are shown which are applied to the respective terminals in FIG. 20. The control signals are indicated by the denotations of which S is added to the reference numerals of the terminals to which the control signals are applied.

A signal Sb22 is provided from the terminal b22 to the gate of the reset MOS transistor b12.

A signal Sb23 is provided from the terminal b23 to the gate of the transfer MOS transistor b11.

A signal Sb24 is provided from the terminal b24 to the gate of the row selecting MOS transistor b14.

A signal Sb25 is provided from the terminal b25 to the gate of the reset MOS transistor b17.

A signal Sb26 is provided from the terminal b26 to the gate of the transfer MOS transistor b16.

A signal Sb27 is provided from the terminal b27 to the gate of the row selecting MOS transistor b19.

A signal SV indicates an output signal to be provided to the column signal line b21.

An operation performed by the solid-state image capturing element according to Embodiment 4 of the present invention will be described with reference to FIG. 20 and FIG. 23.

During the time period t1 illustrated in FIG. 23, the signal Sb22 is "HIGH", and the gate of the reset MOS transistors b12 of each of the pixels in the pixel unit is brought into conduction in a "HIGH" state, so that the FD of each of the pixels is connected simultaneously to the power supply to be into an initial state. During the time period t2, the signal Sb25 is "HIGH", and the gate of the reset MOS transistors b17 of each of the pixels in the pixel unit is brought into conduction in a "HIGH" state, so that the FD of each of the pixels is connected simultaneously to the power supply to be into an initial state. In addition, during the time period t3, the gate of the row selecting transistor b14 is brought into conduction in the "HIGH" state, and an FD potential in the initial state of the pixel unit b1-1 is provided to the column signal line b21 via the source follower including the output MOS transistor b13 and the current supply b20 (the Value Vref of the signal SV in the period t1 in FIG. 23). Likewise, during the time period t4, the gate of the row selecting transistor b19 is brought into conduction in the "HIGH" state, and an FD potential in the initial state of the pixel unit 1-2 is provided to the column signal line b21 via the source follower including the output MOS transistor b18 and the current supply b20 (the Value Vref of the signal SV in the period t2 in FIG. 23).

Although FIG. 23 shows an example of pixels for two rows, it goes without saying that the Value Vref is set to the signal SV even in the time period t5 in practical case of pixels for three or more rows.

During the time period t5, all of the signals are "LOW".

During the time period t6, the signal Sb23 is "HIGH", and the gate of the transfer MOS transistor b11 of each of the pixels in the pixel unit is brought into conduction in the "HIGH" state, so that charges accumulated in the photodiode a10 of each of the pixels is transferred to the FD. A voltage is generated in the gate of the output MOS transistor b13 by the transferred charges and the capacitance of the FD. During the time period t7, the signals Sb23 and Sb26 are "HIGH", and the gates of the transfer MOS transistors b11 and b16 of each of the pixels in the pixel unit are brought into conduction in the "HIGH" state, so that charges accumulated in the photodiodes b10 and b15 of each of the pixels are transferred to the FD. A voltage is generated in the gates of the output MOS transistors b13 and b18 by the transferred charges and the capacitance of the FD. In addition, during the time period t8, the gate of the row selecting transistor b14 is brought into conduction in the "HIGH" state, and an FD potential of the pixel unit b1-1 is provided to the column signal line 21 via the source follower including the output MOS transistor b13 and the current supply b20 (the value V1 of the signal SV in the period t8 in FIG. 23). Likewise, during the time period t9, the gate of the row selecting transistor b19 is brought into conduction in the "HIGH" state, and an FD potential of the pixel unit b1-1 is provided to the column signal line b21 via the source follower including the output MOS transistor b18 and the current supply b20 (the value V2 of the signal SV in the period t1 in FIG. 23).

As described above with reference to FIG. 23, the method of driving the pixel circuit includes: the time period T1 in which the reset MOS transistors of the respective pixel units are simultaneously brought into conduction and the pixel signal (Vref) corresponding to the initial state of the FD is outputted; and the period of time T2 in which the transfer MOS transistors of the respective pixel units are simultaneously brought into conduction and the pixel signal (V1, V2) corresponding to the charges accumulated in the photodiode are outputted. In the case where a pixel having such a configuration as in FIG. 20 is used, the pixel signal provided from the pixel indicates a high voltage when the light inputted to the photodiode is dark. On the other hand, the pixel signal provided from the pixel indicates a low voltage when the light inputted to the photodiode is bright.

Figure 24:
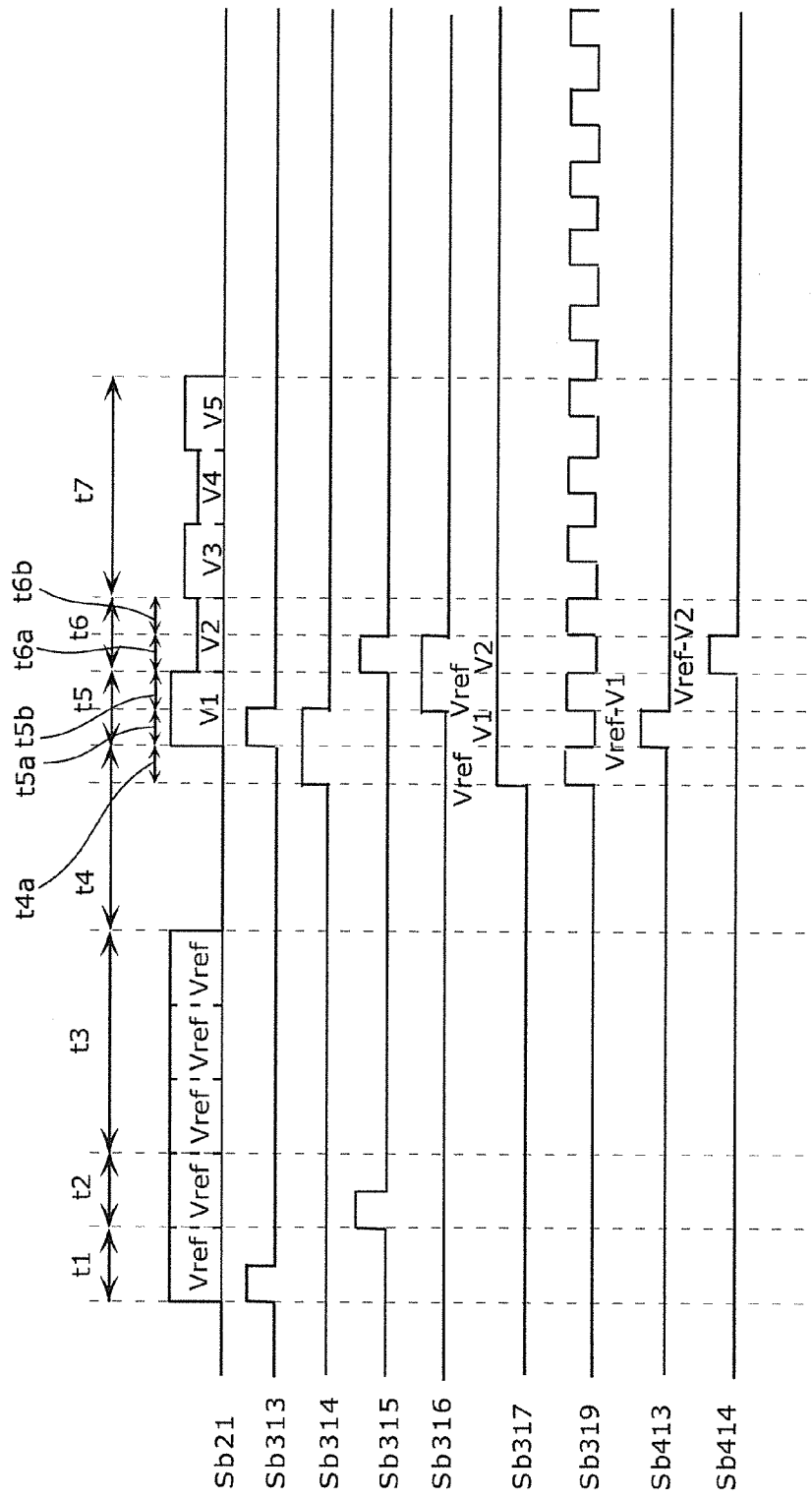
FIG. 24 is a timing chart which illustrates a method of transferring a signal from a pixel unit to a storage circuit according to Embodiment 4 of the present invention.

Next, FIG. 24 illustrates the method of transferring a signal from the pixel unit to the storage circuit according to the present embodiment. In FIG. 24, Sb21 indicates a time-series output signal of the pixel output line 21 in FIG. 20, corresponding to the pixel circuit b1-1 and the pixel circuit b1-2. Here, an output voltage provided from a pixel is inverted and provided to each of the storage circuits by an inverter 300 connected to the Sb21. More specifically, when the light inputted to the photodiode is dark, an input to the first storage circuit is a low voltage. On the other hand, when the light inputted to the photodiode is bright, an input to the first storage circuit is a high voltage. Sb313, Sb314, Sb315, Sb316, Sb317, and Sb319 which indicate time-series input signals of the signal lines that are connected to the terminals b313, b314, b315, b316, b317, and b319, respectively, in FIG. 21. Sb413 and Sb414 indicate time-series input signals of the signal lines connected to the terminals b413 and b414, respectively, in FIG. 22.

Time periods t1 and t2 correspond to the time periods t3 and t4 illustrated in FIG. 23, and an initial state pixel signal is consecutively outputted in order of the pixel units b1-1 and b1-2. Subsequently, in the time period t3, the initial state signals provided from pixels for the predetermined number of rows are outputted sequentially from the pixel unit in the same column. During the time period of outputting an initial state signal of each of the pixels, a write signal for turning ON a write transistor of a corresponding address is inputted for performing the writing on the first storage circuit. For example, during the time period t1 in which the initial state signal of the pixel unit 1-1 is outputted, an ON pulse is transmitted to Sb313 and the write transistor b301 is brought into conduction, so that the initial state signal is written into the gate capacitance of the transistor b302. In the same manner as above, during the time period t2, the ON pulse is transmitted to Sb315 and the write transistor b305 is brought into conduction, so that the initial state signal is written into the gate capacitance of the transistor b306. This operation is repeated, and the initial state signals of the pixels for the predetermined number of rows are stored independently in the first storage circuit before the time period t3 ends.

Next, after the blanking period indicated by t4, an output signal of the pixel unit b1-1 is sequentially provided to the pixel output line b21 during the time periods t5a and t5b, followed by an output signal of the pixel unit b1-2 during the time periods t6a and t6b. In the same manner, the output signals are sequentially provided from the pixels of which the initial state signals are stored in the storage circuit during the time period t3. During a period of a light pixel signal from each of the pixels, the difference between the initial state signal and the light signal is calculated in the subsequent stage, that is, the first difference circuit b3-3, and the difference signal is written into the second storage circuit unit b4-1 which is a further subsequent stage. This operation will be described with reference to the light signal of the pixel unit b1-1. First, in the time period t4a immediately preceding the light pixel signal period t5a, a High pulse is provided to the signal Sb314 to bring the read transistor b303 into conduction, thereby reading an initial state signal stored in the time period t1 and providing the initial state signal to the output line b30. In addition, a High signal is provided to each of the Sb317 and b319 in order to bring the transistors b308 and b311 into conduction simultaneously with the start of the time period t4a so that the data is stored in the sample capacitor b309 of the difference circuit b3-3. After that, Sb317 stays in the High state until all of the light signals of the predetermined pixel signals are stored in the storage circuit of a subsequent stage. Meanwhile, Sb319 is disconnected after the storing of the initial state signals to the sample capacitor b309 is ended. Next, in order to write a pixel signal simultaneously with the start of the time period t5a, a High pulse is provided to the signal Sb313 and the transistor b301 is brought into conduction. Here, the transistors b303 and b308 are kept in the conducting state by the Sb314 and Sb317, respectively, and thus the pixel signal is read as it is by the read transistor b303 and provided to the difference circuit b3-3. Since Sb319 is set to Low in the difference circuit b3-3, the transistor b311 is already disconnected and the output line b31 is provided with the difference signal of the initial state signal and the pixel signal of the capacitor b309 to the capacitor b310. In addition, during the time period t5a, Sb413 is provided with the High signal for bringing the write row selecting MOS transistor b401 of the second storage circuit b4-1, and the difference signal of the initial state signal and the pixel signal is stored in the gate capacitance of the transistor b402. At this time, the transistor b403 is set to be in the disconnection state; that is, Sb414 is set to be in the Low level, and thus power consumption of the transistor b402 is reduced.

After the difference between the initial state signal and the pixel signal which are provided from the pixel unit b1-1 is stored in the storage circuit b4-1 during the time period t5a, the operation of writing a difference signal regarding the pixel unit b1-2 into the storage circuit b4-2 is performed within the time period t6a by the same operation as the operation performed in the time period t5a, and subsequently the difference signal is stored sequentially in the storage unit for the pixels for the predetermined number of rows.

As described above, with a series of the pixel signal reading and the storage operation according to the present embodiment, it is possible to perform reading similar to the global shutter operation with which the pixel signals of substantially all of the pixels are read simultaneously with significantly low power consumption. Since the inverter b300 inverts output signals from the pixels, an input voltage provided to the first storage circuit is lower than an input voltage in the case where the inverter b300 is not included, and the input voltage provided to the storage circuit at the time of resetting approximates a ground voltage. Therefore, power is further saved. In addition, accordingly, when the light inputted to the photodiode is dark, an input to the second storage circuit is a low voltage. On the other hand, when the light inputted to the photodiode is bright, an input to the second storage circuit is a high voltage. Therefore, power is further saved.

As described above, in the solid-state image capturing device according to the present embodiment, the storage cell b2a, when an inverted electric signal is provided from a corresponding inverting amplifier, turns the write switch transistor temporarily ON in the state where the read switch transistor is OFF, thereby causing the gate capacitance to store the electric signal (t1 and t2 in FIG. 24).

With this configuration, when writing an electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

In addition, the electric signal includes (i) a reference signal that is reset to a power supply voltage and provided from the pixel unit and (ii) a pixel signal according to the amount of received light, and the inverted electric signal includes an inverted reference signal and an inverted pixel signal. The storage cell b2a, when the inverted reference signal is provided from a corresponding inverting amplifier, turns the write switch transistor temporarily ON in the state where the read switch transistor is OFF, thereby causing the gate capacitance to store the inverted reference signal (t1 and t2 in FIG. 24).

With this configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

The storage cell b2a turns the read switch transistor temporarily ON in the state where the write switch transistor is OFF, thereby providing the inverted reference signal stored in the gate capacitance, from the other one of the drain and the source of the depletion mode field-effect transistor to the corresponding output signal line (t4a and t5b in FIG. 24).

The storage cell b2a further, when an inverted pixel signal is provided from a corresponding inverting amplifier, turns the write switch transistor temporarily ON in the state where the read switch transistor is ON, thereby providing the inverted pixel signal from the other one of the drain and the source of the depletion mode field-effect transistor to the corresponding output signal line (t5a/t6a).

In addition, the storage cell b2a, when an inverted pixel signal is provided from a corresponding inverting amplifier, may turn the write switch transistor temporarily ON in the state where the read switch transistor is OFF, thereby, thereby causing the gate capacitance to store the inverted pixel signal. The storage cell b2a may turn the read switch transistor temporarily ON in the state where the write switch transistor is OFF, thereby providing the inverted reference signal stored in the gate capacitance, from the other one of the drain and the source of the depletion mode field-effect transistor to the corresponding output signal line.

It is to be noted that, the number of the storage cells b2a in the first storage circuit b2 may be the same as the number of the pixel units b1a. When the number of the storage cells b2a is the same as the number of the pixel units b1a, the difference from the first difference circuit may be outputted directly from the output line b6 according to a control by the horizontal scanning circuit b7, and the second storage unit b4 and the second difference circuit b5 may be removed.

In addition, the number of the storage cells b2a may be the number corresponding to at least two rows in the pixel unit b1a. In this case, the number of the storage cells b4a in the second storage circuit b2 is preferably the same as the number of the pixel units b1a, and it is possible to transfer the difference signal from the difference circuit b3 to the second storage circuit b4, by one row at a time, cyclically using the row of the storage cell b2a.

In addition, although an operation in the case where the blanking period t4 is provided is described, the blanking period is not necessarily provided. In addition, the periods of SB24 and Sb27 in FIG. 23 may be reduced to substantially half to be equivalent to the periods of Sb313 and Sb315 in FIG. 24, so that the reset signal and the light signal are alternately provided to the output signal line, and the operation of writing the reset signal onto the storage circuit, the operation of reading from another storage circuit, and the operation of outputting a difference signal between the reset signal and the light signal may be concurrently carried out. In this case, for example, the reset signal of the first pixel is written into the first storage circuit and, at the same time, the reset signal of the second pixel which is stored in advance in the second storage circuit is provided to the difference circuit during the time period t5b in FIG. 24, and the light signal of the second pixel is provided to the difference circuit during the time period t6a, thereby outputting the difference between the reset signal and the light signal of the second pixel. By outputting as described above, it is possible to output the difference for one image screen at higher speed compared to the case where a reset signal and a light signal are read for each row for outputting the difference.

(Embodiment 5)

Figure 25:
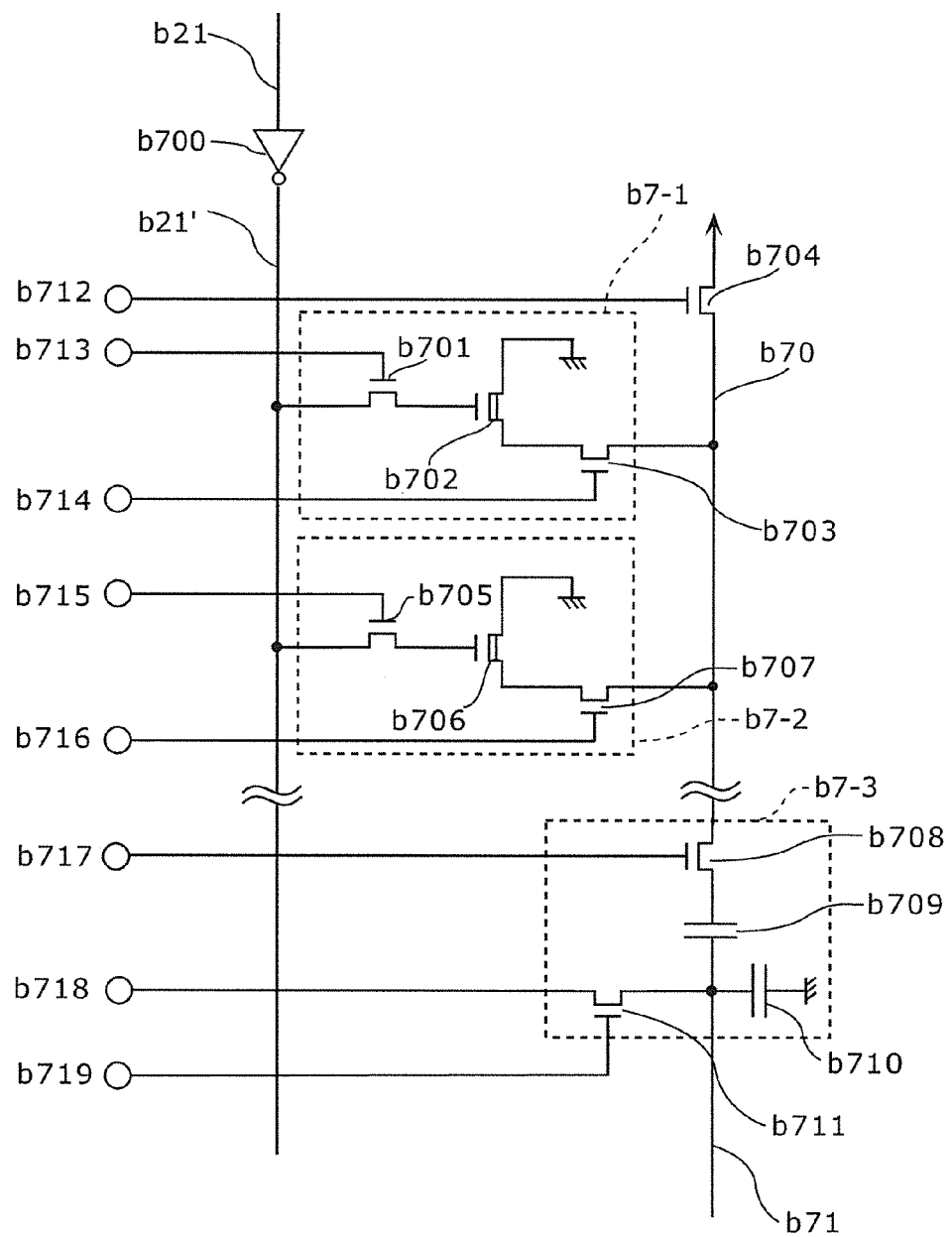
FIG. 25 is a circuit diagram which illustrates storage cells of a first storage circuit for two rows and one column and a unit difference circuit according to Embodiment 5 of the present invention.
Figure 26:
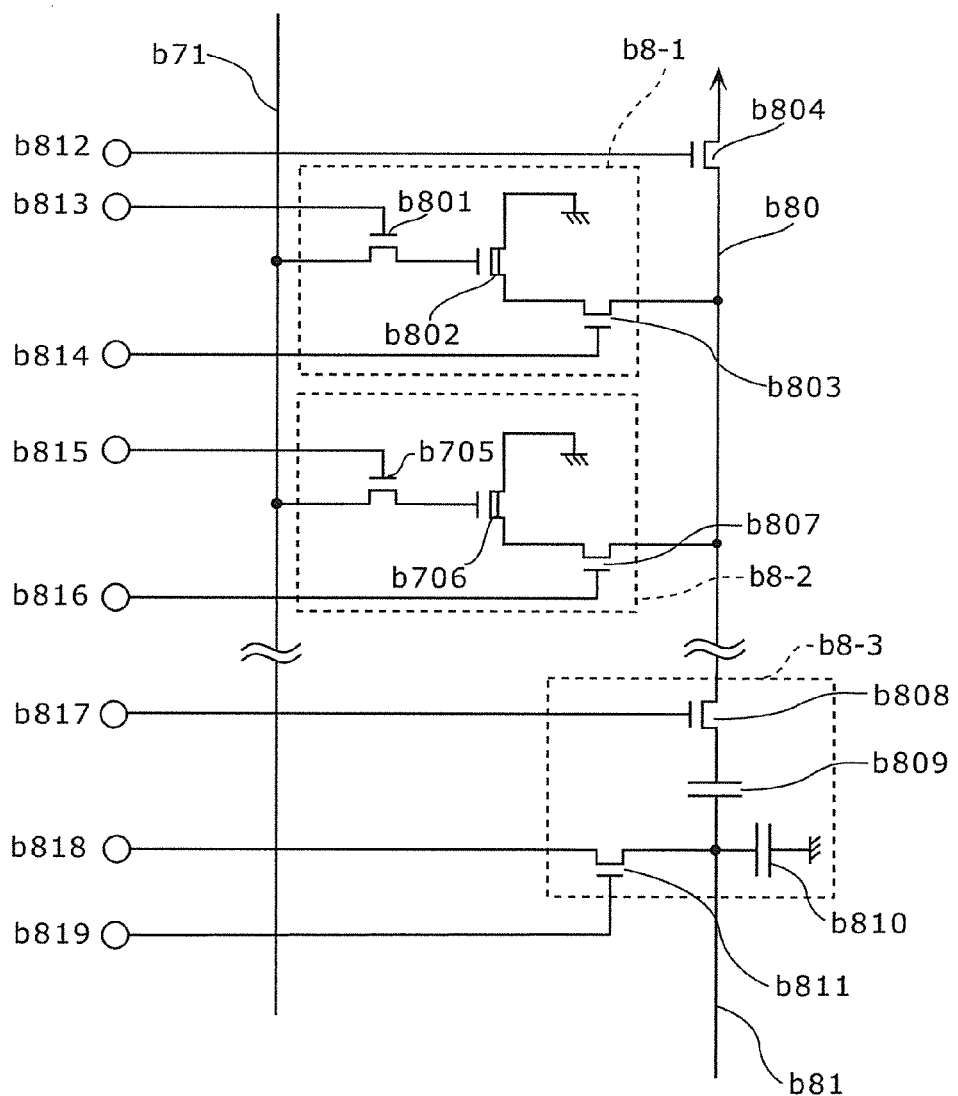
FIG. 26 is a circuit diagram which illustrates storage cells of a second storage circuit for two rows and one column and a unit difference circuit according to Embodiment 5 of the present invention.
Figure 27:
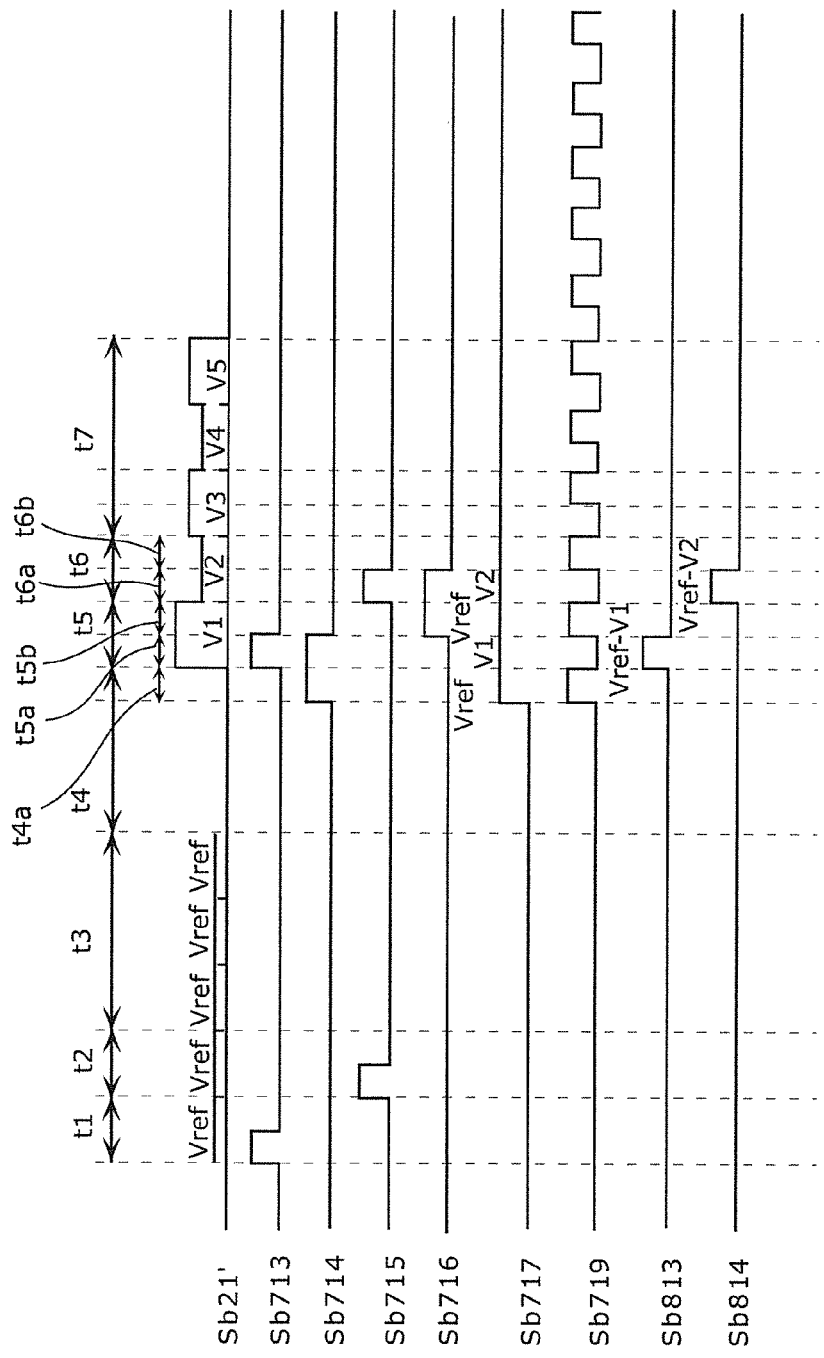
FIG. 27 is a timing chart which illustrates a method of transferring a signal from a pixel unit to a storage circuit according to Embodiment 5 of the present invention.
Figure 28:
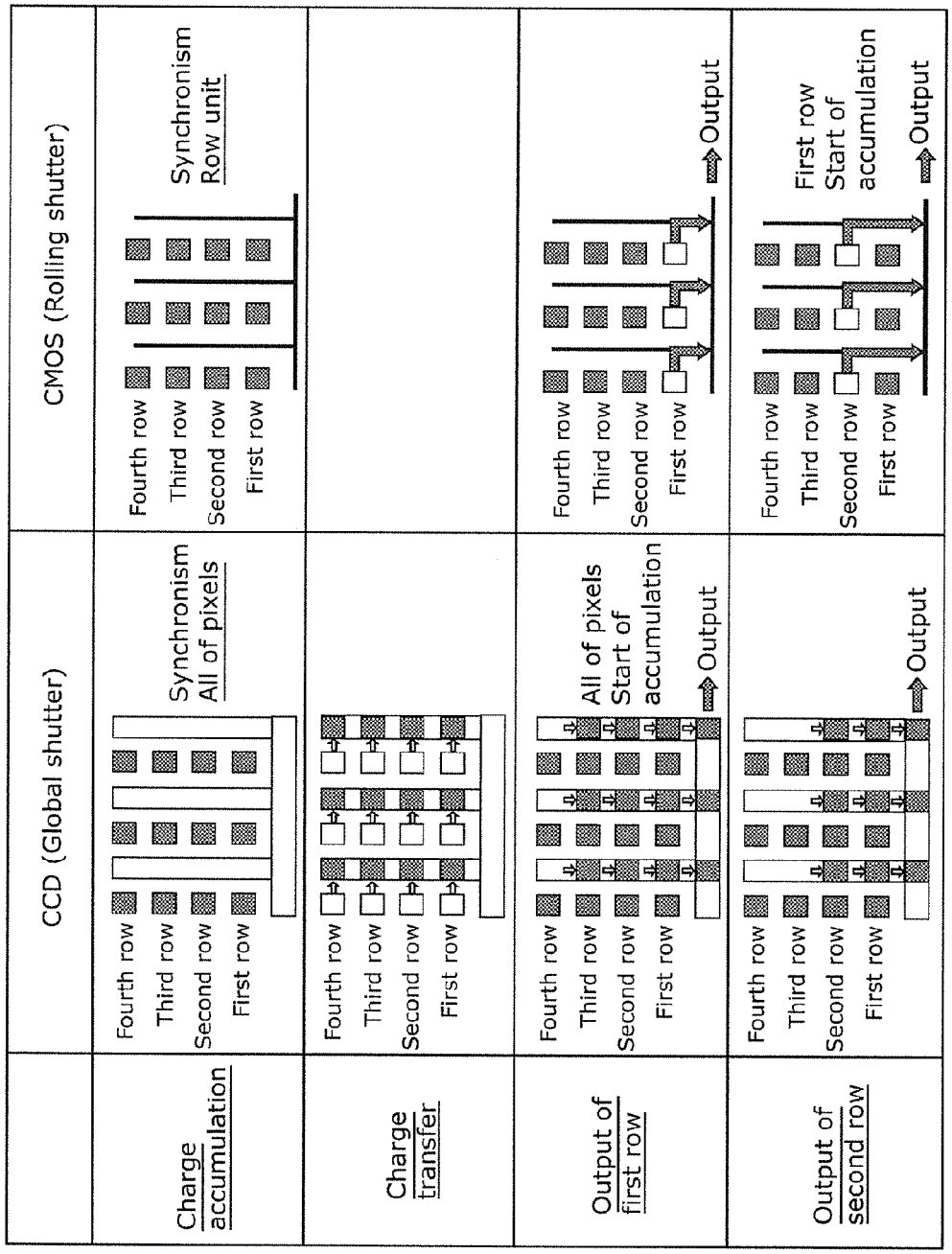
FIG. 28 is a diagram which schematically explains the difference in a shutter operation between CCD and CMOS sensors.
Figure 29:
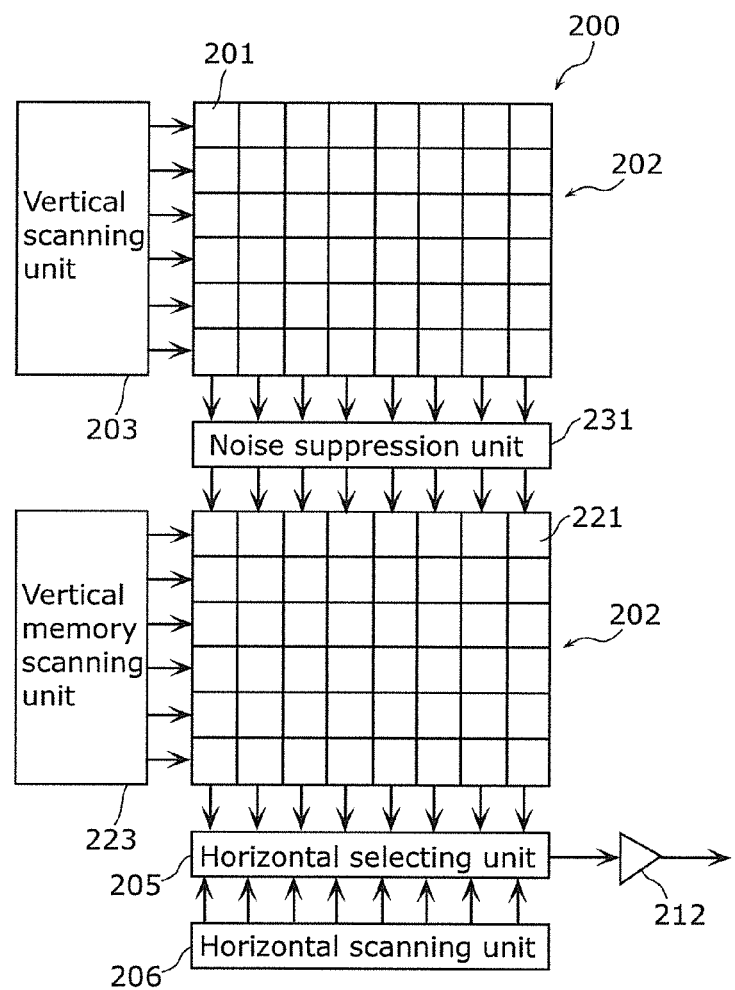
FIG. 29 is a diagram which illustrates a configuration block according to conventional techniques.
Figure 30:
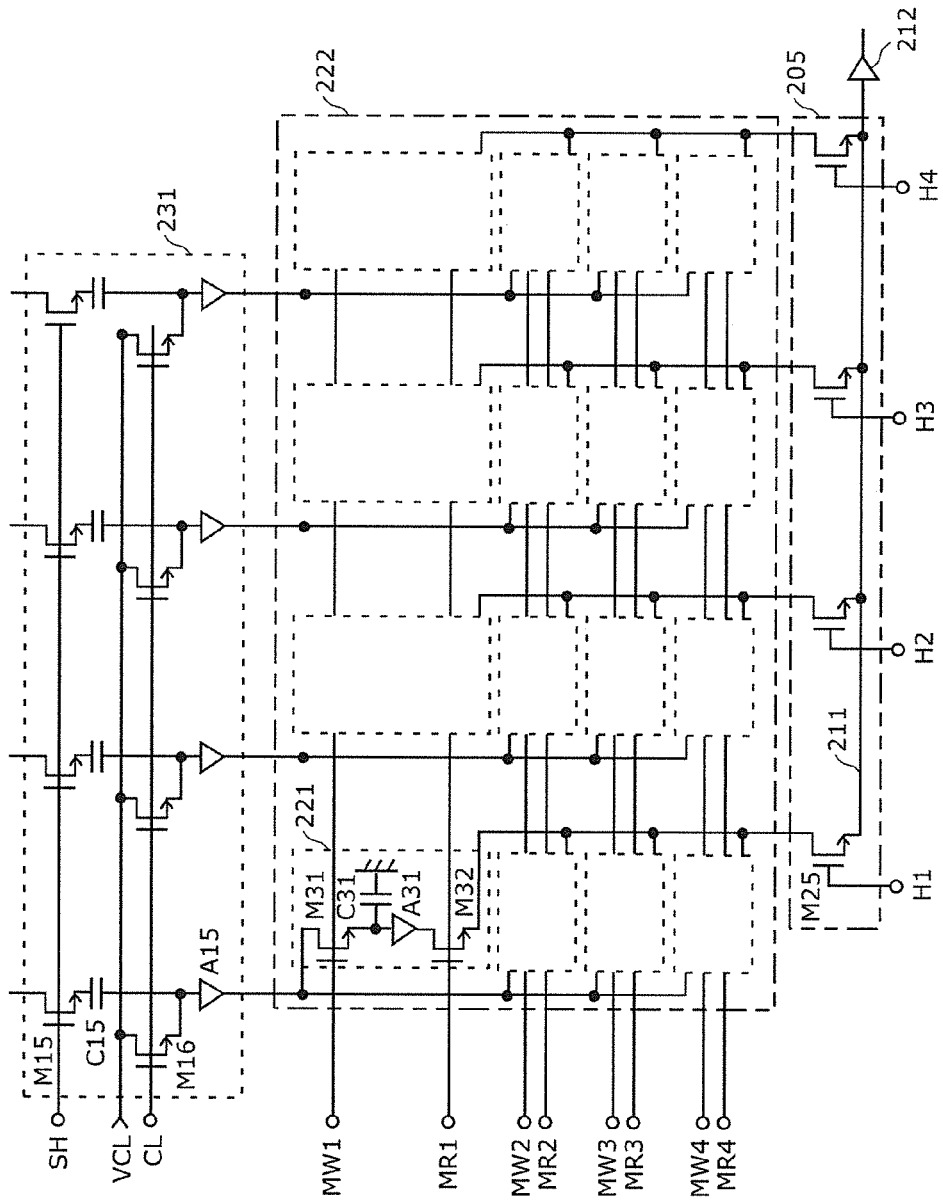
FIG. 30 is a circuit diagram which illustrates a configuration of a noise suppression unit and a memory unit of a solid-state image capturing element.

The following describes Embodiment 5 according to the present invention, with reference to FIG. 25 to FIG. 27. In the present embodiment, the configuration of the circuit block is the same as the configuration shown in FIG. 19, and the pixel unit circuit is the same as that shown in FIG. 20.

FIG. 25 illustrates in detail the storage cells for two rows and one column in the first storage circuit b2 and the unit difference circuit illustrated in FIG. 19 according to the present embodiment. In FIG. 25, b21 denotes one of the output signal lines connected to the pixels in a corresponding one of the columns in FIG. 20, which is connected to an output line b21' via an inverter circuit (inverting amplifier) b700, and connected to the unit storage circuit corresponding to the pixel b1-1 and the pixel b1-2 indicated by broken lines b7-1 and b7-2 in FIG. 20. The storage circuit b7-1 corresponding to the pixel unit b1-1 includes: a write row selecting MOS transistor b701; a storage MOS transistor b702; and a read row selecting MOS transistor b703. The source of the read row selecting MOS transistor b703 is connected to a current supply MOS transistor b704 via the output line b70. In addition, the output line b70 is connected to the first difference circuit unit b7-3 illustrated as b3 in FIG. 19. The first difference circuit unit includes: a column selecting MOS transistor b708; a sample capacitor b709; a divide capacitor b710; and a bias MOS transistor b711, and the difference output signal is provided to the output line b71. The storage circuit b7-2 that corresponds to the pixel unit b1-2 also has a similar configuration to the configuration of the storage circuit b7-1 that corresponds to the pixel unit b1-1, and includes: a write row selecting MOS transistor b705; a storage MOS transistor b706; and a read row selecting MOS transistor b707. The source of the read row selecting MOS transistor b707 is connected to the output line b70 that is connected to the current supply MOS transistor b704 in such a manner that the output line b70 is shared with the output of the storage circuit b7-1. With such a configuration as described above, it is possible to store a reset signal and a light signal which are provided from the pixel b1-1 and the pixel b1-2 illustrated in FIG. 20, into the storage unit b7-1 and the storage unit b7-2 with different timings, and further to output, to the output line b71, a voltage proportional to the difference between the reset signal and the light signal from each of the storage units, in the difference circuit b7-3 in which an output terminal of each of the storage units is connected via the output line b70. Here, the transistors b701, b702, b703, b704, b705, b706, and b707 are all P channel MOS transistors, and are capable of storing the initial state signal in the High level as a Low level signal. In addition, a larger amount of signals are stored as a higher voltage level.

FIG. 26 illustrates in detail the storage cells for two rows and one column in the second storage circuit b4 and the unit difference circuit illustrated in FIG. 19 according to the present embodiment. In FIG. 26, b71 denotes one of the output signal lines connected to a corresponding one of the columns in the storage circuit illustrated in FIG. 25, and broken lines b8-1 and b8-2 denote the unit storage circuits corresponding to a unit storage circuit b7-1 and a unit storage circuit b7-2, respectively, illustrated in FIG. 25. The storage circuit b8-1 corresponding to the pixel unit b1-1 includes: a write row selecting MOS transistor b801; a storage MOS transistor b802; and a read row selecting MOS transistor b803. The source of the read row selecting MOS transistor b803 is connected to a current supply MOS transistor b804 via the output line b80. In addition, the output line b80 is connected to the second difference circuit unit b8-3 illustrated as b5 in FIG. 19. The second difference circuit unit includes: a column selecting MOS transistor b808; a sample capacitor b809; a divide capacitor b810; and a bias MOS transistor b811, and the difference output signal is provided to the output line b81. The storage circuit b8-2 that corresponds to the pixel unit b1-2 also has a similar configuration to the configuration of the storage circuit b8-1 that corresponds to the pixel unit b1-1, and includes: a write row selecting MOS transistor b805; a storage MOS transistor b806; and a read row selecting MOS transistor b807. The source of the read row selecting MOS transistor b807 is connected to the output line b80 that is connected to the current supply MOS transistor b804 in such a manner that the output line b80 is shared with the output of the storage circuit b8-1. With such a configuration as described above, it is possible to store signals equivalent to the light signals which are provided from the pixel b1-1 and the pixel b1-2 illustrated in FIG. 20, into the storage unit b8-1 and the storage unit b8-2 with different timings, and further to output, to the output line b81, a voltage proportional to the difference between the reset signal and the light signal which are provided from each of the storage units, in the difference circuit b8-3 in which an output terminal of each of the storage units is connected via the output line b80.

A timing chart which illustrates temporal changes in main signals regarding the pixel unit in the solid-state image capturing element according to Embodiment 5 of the present invention is similar to the timing chart illustrated in FIG. 23.

Next, FIG. 27 illustrates the method of transferring a signal from the pixel unit to the storage circuit according to the present embodiment. In FIG. 27, Sb21' denotes a time-series output signal of the output line b21' illustrated in FIG. 25, corresponding to the pixel circuit b1-1 and the pixel circuit b1-2. Sb713, Sb714, Sb715, Sb716, Sb717, and Sb719 which denote time-series input signals of the signal lines that are connected to the terminals b713, b714, b715, b716, b717, and b719, respectively, illustrated in FIG. 21. Sb813 and Sb814 denote time-series input signals of the signal lines that are connected to the terminals b813 and b814, respectively, illustrated in FIG. 26.

Time periods t1 and t2 correspond to the time periods t3 and t4 illustrated in FIG. 23, and an initial state pixel signal is consecutively outputted in order of the pixel units b1-1 and b1-2. Subsequently, in the time period t3, the initial state signals are outputted sequentially from pixels for the predetermined number of rows in the pixel unit in the same column. During the time period of outputting an initial state signal of each of the pixels, a write signal for turning ON a write transistor of a corresponding address is inputted for performing the writing on the first storage circuit. For example, during the time period t1 in which the initial state signal of the pixel unit b1-1 is outputted, an ON pulse is transmitted to Sb713 and the write transistor b701 is brought into conduction, so that the initial state signal is written into the gate capacitance of the transistor b702. In the same manner as above, during the time period t2, the ON pulse is transmitted to Sb715 and the write transistor b705 is brought into conduction, so that the initial state signal is written into the gate capacitance of the transistor b706. This operation is repeated, and initial state signals of pixels for the predetermined number of rows are stored independently in the first storage circuit before the time period t3 ends.

Next, after the blanking period indicated by t4, an output signal of the pixel unit b1-1 is sequentially provided to the pixel output line b21 during the time periods t5a and t5b, followed by an output signal of the pixel unit b1-2 during the time periods t6a and t6b. In the same manner, the output signals are sequentially provided from the pixels of which the initial state signals are stored in the storage circuit during the time period t3. During a period of a light pixel signal from each of the pixels, the difference between the initial state signal and the light signal is calculated in the subsequent stage, that is, the first difference circuit b7-3, and the difference signal is written into the second storage circuit unit b8-1 which is a further subsequent stage. This operation will be described with reference to the light signal of the pixel unit b1-1. First, in the time period t4a immediately preceding the light pixel signal period t5a, a High pulse is provided to the signal Sb814 to bring the read transistor b713 into conduction, thereby reading the initial state signals stored in the time period t1 and providing the initial state signals to the output line b70. In addition, a High signal is provided to each of the Sb717 and b719 in order to bring the transistors b708 and b711 into conduction simultaneously with the start of the time period t4a so that the data is stored in the sample capacitor b709 of the difference circuit b7-3. After that, Sb717 stays in the High state until all of the light signals of the predetermined pixel signals are stored in the storage circuit of a subsequent stage. Meanwhile, Sb719 is disconnected after the storing of the initial state signals to the sample capacitor b709 is ended. Next, in order to write a pixel signal simultaneously with the start of the time period t5a, a High pulse is provided to the signal Sb713 and the transistor b701 is brought into conduction. Here, the transistors b703 and b708 are kept in the conducting state by the Sb714 and Sb717, respectively, and thus the pixel signal is read as it is by the read transistor b703 and provided to the difference circuit b7-3. Since Sb718 is set to Low in the difference circuit b7-3, the transistor b711 is already disconnected and the output line b71 is provided with the difference signal of the initial state signal and the pixel signal, which is proportional to the ratio of the capacitor b709 to the capacitor b710. Furthermore, during the time period t5a, Sb813 is provided with the High signal for bringing the write row selecting MOS transistor b801 of the second storage circuit b8-1 into conduction, and the difference signal of the initial state signal and the pixel signal is stored in the gate capacitance of the transistor b802.

At this time, the transistor b803 is set to be in the disconnection state; that is, Sb814 is set to be in the Low level, and thus power consumption of the transistor b802 is reduced.

After the difference between the initial state signal and the pixel signal which are provided from the pixel unit b1-1 is stored in the storage circuit b8-1 during the time period t5a, the operation of writing a difference signal regarding the pixel unit b1-2 into the storage circuit b8-2 is performed within the time period t6a by the same operation as the operation performed in the time period t5a, and subsequently the difference signal is stored sequentially in the storage unit for the pixels for the predetermined number of rows.

As described above, with a series of the pixel signal reading and the storage operation according to the present embodiment, it is possible to perform reading similar to the global shutter operation with which the pixel signals of substantially all of the pixels are read simultaneously, with significantly low power consumption and in the stable signal level having less variation in the capacitance. In addition, since a high voltage state of the pixel output is changed to a low voltage state in a storage operation according to the present embodiment, it is possible to reduce the applied voltage during the storage period and further reduce the power consumption.

As described above, in order to achieve the above-described third object, the solid-state image capturing device according to Embodiments 4 and 5 includes: a plurality of pixel units which are arranged in rows and columns and output electric signals according to the amount of received light; column signal lines provided for the respective columns of the pixel units; inverting amplifiers which are provided for the respective column signal lines and invert the polarity of electric signals provided from the respective column signal lines; and a first storage unit which includes a plurality of storage cells arranged in rows and columns and store the inverted electric signals provided from the inverting amplifiers. According to such a configuration, an electric signal with a higher voltage is more likely to be written into a memory with a low voltage. Since leak of the storage cell is proportional to an electric field intensity, writing with a lower voltage causes less leak and less deterioration in signals. Noise in images is more noticeable where the luminance is lower, and thus it is possible, with an image in which the electric signal is higher where the luminance is lower, to obtain a better image with less variation noise, by reducing the deterioration in signals due to the leak current in a portion with the low luminance.

Here, the first storage unit may include: the storage cells; output signal lines corresponding to the columns of the pixel units; and current supply transistors connected to the output signal lines, and each of the storage cells may include: the depletion mode field-effect transistor of which one of the drain and the source is connected to a power line or a ground line; a write switch transistor which is disposed between an output terminal of a corresponding one of the inverting amplifiers and the gate of the depletion mode field-effect transistor; and a read switch transistor which is disposed between a corresponding one of the output signal lines and the other of the drain and the source of the depletion mode field-effect transistor.

According to this configuration, the depletion mode field-effect transistor has the function as a storage cell for holding an analogue signal in the gate capacitance and the function as the source follower amplifier which outputs a voltage according to the analogue signal held in the gate capacitance, and thus it is possible to simplify the circuit configuration of the first storage unit, reduce the number of components and wiring resistance, and significantly reduce the power consumption for the entire chip. As a result, it is possible to reduce the amount of heat generation and reduce the dark current.

Here, the storage cell may, when the inverted electric signals are transmitted from a corresponding one of the inverting amplifiers, turn the write switch transistor temporarily ON in the state where the read switch transistor is OFF, to cause the gate capacitance to store the electric signals.

According to this configuration, when writing an electric signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

Here, the electric signal may include a reference signal provided from the pixel unit which is reset to a power supply voltage and a pixel signal according to the amount of received light, the inverted electric signal may include an inverted reference signal and an inverted pixel signal, and the storage cell, when the inverted reference signal is provided from a corresponding one of the inverting amplifiers, may cause the gate capacitance to store the inverted reference signal, by temporarily turning ON the write switch transistor in the state where the read switch transistor is OFF.

According to this configuration, when writing the reference signal, a current passing through the read switch transistor between the depletion mode field-effect transistor and the output signal line is removed. It is therefore possible to significantly reduce the power consumption required. In addition, it is possible to completely remove a parasitic drain current component of the depletion mode field-effect transistor when writing a reference signal, and thus the power consumption can be significantly reduced.

Here, the storage cell may further output the inverted reference signal stored in the gate capacitance to a corresponding one of the output signal lines, from the other of the drain and the source of the depletion mode field-effect transistor, by temporarily turning the read switch transistor ON in the state where the write switch transistor is OFF.

Here, the storage cell, when the inverted pixel signals is transmitted from a corresponding one of the inverting amplifiers, may output the inverted pixel signal from the other of the drain and the source of the depletion mode field-effect transistor, to the corresponding one of the output signal lines, by turning the write switch transistor temporarily ON in the state where the read switch transistor is OFF.

Here, the electric signal may include a reference signal provided from the pixel unit that is reset to a power supply voltage and a pixel signal according to the amount of received light, the inverted electric signal may include the inverted reference signal and the inverted pixel signal, and the storage cell, when the inverted pixel signal is provided from a corresponding one of the inverting amplifiers, may cause the gate capacitance to store the inverted pixel signal by temporarily turning ON the write switch transistor in the state where the read switch transistor is OFF.

Here, the storage cell may further provide the inverted pixel signal stored in the gate capacitance to a corresponding one of the output signal lines, from the other of the drain and the source of the depletion mode field-effect transistor, by temporarily turning the read switch transistor ON in the state where the write switch transistor is OFF.

It is to be noted that the depletion mode field-effect transistor may be a P channel type.

In addition, the method of driving the solid-state image capturing device according to the present invention is a method for the solid-state image capturing device which includes: a plurality of pixel units which are arranged in rows and columns and output electric signals according to the amount of received light; column signal lines provided for the respective columns of the pixel units; and a first storage unit which includes a plurality of storage cells arranged in rows and columns and stores the inverted electric signals provided from the inverting amplifiers. Each of the storage cells includes: the depletion mode field-effect transistor of which one of the drain and the source is connected to a power line or a ground line; a write switch transistor which is disposed between a corresponding one of the column signal lines and the gate of the depletion mode field-effect transistor; and a read switch transistor which is disposed between a corresponding one of the output signal lines and the other of the drain and the source of the depletion mode field-effect transistor. The method of driving the solid-state image capturing device includes: providing the electric signal from the pixel units to the column signal lines; inverting the polarity of the electric signal by the inverting amplifier; and storing the inverted electric signal into the gate capacitance by turning temporarily ON the write switch transistor in the state where the read switch transistor is OFF when a corresponding inverting amplifier outputs the inverted electric signal.

It is to be noted that, the solid-state image capturing devices according to Embodiments 2 to 5 may also operate in (1) the memory through mode, (2) the multi-frame holding mode, or (3) the mechanical shutter combination use mode which are described in Embodiment 1, or may operate with the combination of the operation modes of (1) to (3).

In addition, the solid-state image capturing devices according to Embodiments 2 to 5 may be applied to the camera (FIG. 9) described in Embodiment 1.

In addition, each of the transistors used in the present invention may be any one of the p type and the n type.

The solid-state image capturing element according to the present invention includes other embodiments that are obtained by combining given constituents in the above embodiment, modifications that are obtained by making various modifications that those skilled in the art could think of, to the present embodiment, within the scope of the present invention, and various devices which incorporate the solid-state image capturing element according to the present invention. For example, the present invention includes a movie camera which includes the solid-state image capturing element according to the present invention.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

Industrial Applicability

The solid-state image capturing element according to the present invention can be used for a digital camera, a high-end compact camera, and so on, as a solid-state image capturing element which includes a holding circuit for holding signals provided from the pixels with a small area.

The invention claimed is:

1. A solid-state image capturing element, comprising:
   a plurality of pixels arranged in rows and columns, each of the pixels outputting an electric signal corresponding to an amount of received light;
   a plurality of column signal lines each of which is disposed for a corresponding one of columns of the pixels and sequentially transfers the electric signal provided from the corresponding one of the columns of the pixels;
   a plurality of holding circuits each of which is disposed for a corresponding one of the column signal lines and holds the electric signal transferred via the corresponding one of the column signal lines; and
   a plurality of reading column lines,
   wherein each of the holding circuits includes a circuit element including an input capacitance, and holds the electric signal in the input capacitance,
   the circuit element is a holding transistor,
   the input capacitance is a gate capacitance of the holding transistor,
   each of the holding circuits includes:
      a first transistor which receives the electric signal from the corresponding one of the column signal lines;
      the holding transistor which holds the electric signal; and
      a second transistor which reads the electric signal from the holding transistor,
      the first transistor is connected to the corresponding one of the column signal lines at one of a source and a drain of the first transistor, and to a gate of the holding transistor at the other,
      the holding transistor is connected, at one of a source and a drain of the holding transistor, to one of a source and a drain of the second transistor,
      the second transistor is connected to a corresponding one of the reading column signal lines at the other of the source and the drain of the second transistor, and
      each of the holding circuits, when holding the electric signal in the holding transistor, holds the electric signal while amplifying the electric signal, by bringing the first transistor and the second transistor into conduction.

2. The solid-state image capturing element according to claim 1, further comprising a plurality of difference circuits each of which is connected to a corresponding one of the column signal lines and outputs a difference signal between the electric signal and a reset signal at a time when light is not received by the pixels.

3. A method of driving a solid-state image capturing element, the solid-state image capturing element including: a plurality of pixels arranged in rows and columns, each of the pixels outputting an electric signal corresponding to an amount of received light; a plurality of column signal lines each of which is disposed for a corresponding one of columns of the pixels and sequentially transfers the electric signal provided from the corresponding one of the columns of the pixels; and a plurality of holding circuits each of which is disposed for a corresponding one of the column signal lines, holds the electric signal transferred via the corresponding one of the column signal lines, and includes a first transistor which receives the electric signal from the corresponding one of the column signal lines; a holding transistor which holds the electric signal; and a second transistor which reads the electric signal from the holding transistor, the first transistor being connected to the corresponding one of the column signal lines at one of a source and a drain of the first transistor, and to a gate of the holding transistor at the other, the holding transistor being connected, at one of a source and a drain of the holding transistor, to one of a source and a drain of the second transistor, and the second transistor being connected to a corresponding one of reading column signal lines at the other of the source and the drain of the second transistor, the method of driving the solid-state image capturing element comprising causing each of the holding circuits, when holding the electric signal in the holding transistor, to hold the electric signal while amplifying the electric signal, by bringing the first transistor and the second transistor into conduction.

* * * * *